United States Patent
Barros et al.

(10) Patent No.: US 9,838,581 B2
(45) Date of Patent: *Dec. 5, 2017

(54) AUXILIARY LENS FOR MOBILE PHOTOGRAPHY

(71) Applicant: Moment Inc, Seattle, WA (US)

(72) Inventors: Marc Barros, Seattle, WA (US); Erik Hedberg, Sammamish, WA (US); Josh Baxley, Seattle, WA (US); Amanda Kirk, Seattle, WA (US); Bradley G. Castaneda, Puyallup, WA (US); Zachary Reed, Puyallup, WA (US); Steve McCallion, Portland, OR (US); Wesley Glen Wirth, Seattle, WA (US); Robert John Lincoln, Seattle, WA (US); Russell Hudyma, San Ramon, CA (US); Michael Thomas, Woburn, MA (US); Eric Davis, Bothell, WA (US); Arash Ghorbani, Auburn, CA (US)

(73) Assignee: Moment Inc, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,094

(22) Filed: Oct. 7, 2016

(65) Prior Publication Data
US 2017/0099419 A1    Apr. 6, 2017

Related U.S. Application Data

(63) Continuation of application No. 14/624,573, filed on Feb. 17, 2015, now Pat. No. 9,467,608.
(Continued)

(51) Int. Cl.
*H04N 5/225* (2006.01)
*G02B 7/14* (2006.01)
(Continued)

(52) U.S. Cl.
CPC ............ *H04N 5/2254* (2013.01); *G02B 7/02* (2013.01); *G02B 13/001* (2013.01); *G03B 17/14* (2013.01);
(Continued)

(58) Field of Classification Search
None
See application file for complete search history.

(56) References Cited

U.S. PATENT DOCUMENTS

| 5,036,343 A | 7/1991 | Yamanaka |
| 5,426,478 A | 6/1995 | Katagiri et al. |

(Continued)

FOREIGN PATENT DOCUMENTS

| EP | 2613448 A1 | 7/2013 |
| WO | 2012/096433 A1 | 7/2012 |

(Continued)

OTHER PUBLICATIONS

Non-Final Rejection, dated Nov. 9, 2016, for U.S. Appl. No. 14/624,571, filed Feb. 17, 2015.
(Continued)

*Primary Examiner* — W B Perkey
(74) *Attorney, Agent, or Firm* — SF Bay Area Patents, LLC; Andrew V. Smith

(57) ABSTRACT

An auxiliary optical assembly for a camera-enabled mobile device includes a removable lens assembly including a lens holder, a lens coupled to the lens holder, and a coupling interface. A lens attachment interface that is configured to stably couple to the mobile device, and that is configured in accordance with the coupling interface of the removable lens assembly to stably couple and align the removable lens along the optical path of the miniature camera module.

27 Claims, 50 Drawing Sheets

Related U.S. Application Data

(60) Provisional application No. 62/108,506, filed on Jan. 27, 2015.

(51) Int. Cl.
  *G02B 13/00* (2006.01)
  *G03B 17/14* (2006.01)
  *G02B 7/02* (2006.01)
  *H04N 5/235* (2006.01)

(52) U.S. Cl.
  CPC ......... *H04N 5/2252* (2013.01); *H04N 5/2256* (2013.01); *H04N 5/2257* (2013.01); *H04N 5/2353* (2013.01)

(56) References Cited

U.S. PATENT DOCUMENTS

| | | | |
|---|---|---|---|
| 7,612,997 B1 | 11/2009 | Diebel et al. | |
| 7,983,557 B2 | 7/2011 | Misawa | |
| 8,244,299 B1 | 8/2012 | Bishop | |
| 8,593,745 B2 | 11/2013 | O'Neill | |
| 8,843,177 B2 | 9/2014 | Mori et al. | |
| 9,071,671 B2 | 6/2015 | Guzman | |
| 9,319,501 B2 | 4/2016 | Huang | |
| 9,454,066 B2 | 9/2016 | O'Neill | |
| 9,467,608 B2 * | 10/2016 | Barros | H04N 5/2252 |
| 9,596,393 B2 * | 3/2017 | Barros | H04N 5/2254 |
| 9,729,770 B2 | 8/2017 | Barros et al. | |
| 9,781,319 B2 | 10/2017 | Barros et al. | |
| 2002/0000689 A1 | 1/2002 | Isogai et al. | |
| 2005/0270276 A1 | 12/2005 | Sugimoto et al. | |
| 2006/0124676 A1 | 6/2006 | Mastrosimone | |
| 2006/0233545 A1 | 10/2006 | Senba et al. | |
| 2007/0268371 A1 | 11/2007 | Misawa et al. | |
| 2008/0002968 A1 | 1/2008 | Arai | |
| 2008/0024643 A1 | 1/2008 | Kato | |
| 2008/0172708 A1 | 7/2008 | Perry et al. | |
| 2008/0271104 A1 | 10/2008 | Perry et al. | |
| 2008/0271105 A1 | 10/2008 | Perry et al. | |
| 2008/0276293 A1 | 11/2008 | Perry et al. | |
| 2009/0080153 A1 | 3/2009 | Richardson | |
| 2009/0089842 A1 | 4/2009 | Perry et al. | |
| 2009/0143099 A1 | 6/2009 | Kang | |
| 2009/0181729 A1 | 7/2009 | Griffin, Jr. | |
| 2009/0299813 A1 | 12/2009 | Cody et al. | |
| 2010/0253826 A1 | 10/2010 | Green et al. | |
| 2011/0018970 A1 | 1/2011 | Wakabayashi | |
| 2011/0317062 A1 | 12/2011 | Fujino | |
| 2012/0147193 A1 | 6/2012 | Tsai | |
| 2012/0236425 A1 | 9/2012 | O'Neill | |
| 2012/0274835 A1 | 11/2012 | Ogino | |
| 2012/0275025 A1 | 11/2012 | Parrill | |
| 2012/0282977 A1 | 11/2012 | Haleluk | |
| 2012/0320340 A1 | 12/2012 | Coleman, III | |
| 2013/0063554 A1 | 3/2013 | Green et al. | |
| 2013/0100336 A1 | 4/2013 | Shintani | |
| 2013/0127309 A1 | 5/2013 | Wyner et al. | |
| 2013/0130753 A1 | 5/2013 | Springer | |
| 2013/0177304 A1 | 7/2013 | Chapman | |
| 2013/0206614 A1 | 8/2013 | O'Neill et al. | |
| 2013/0267283 A1 | 10/2013 | Guzman | |
| 2013/0292288 A1 | 11/2013 | Willes | |
| 2013/0293731 A1 | 11/2013 | Kim | |
| 2014/0022434 A1 | 1/2014 | Morita | |
| 2014/0065948 A1 | 3/2014 | Huang | |
| 2014/0071547 A1 | 3/2014 | O'Neill et al. | |
| 2014/0078594 A1 | 3/2014 | Springer | |
| 2014/0103789 A1 | 4/2014 | Cox, III | |
| 2014/0132832 A1 | 5/2014 | Adams | |
| 2014/0171150 A1 | 6/2014 | Hurst et al. | |
| 2014/0226268 A1 | 8/2014 | O'Neill et al. | |
| 2014/0267882 A1 | 9/2014 | O'Neill | |
| 2014/0267891 A1 | 9/2014 | Adams | |
| 2014/0368731 A1 | 12/2014 | Hyers | |
| 2015/0002950 A1 | 1/2015 | O'Neill | |
| 2015/0015780 A1 | 1/2015 | Graham | |
| 2015/0049244 A1 | 2/2015 | Tokunaga | |
| 2015/0072744 A1 | 3/2015 | Huang | |
| 2015/0138701 A1 | 5/2015 | Sikka | |
| 2015/0177147 A1 | 6/2015 | Mangan | |
| 2015/0180527 A1 | 6/2015 | Fathollahi | |
| 2015/0222315 A1 | 8/2015 | O'Neill | |
| 2015/0293430 A1 | 10/2015 | O'Neill | |
| 2015/0326788 A1 | 11/2015 | Tsuge | |
| 2015/0355527 A1 | 12/2015 | Takahashi et al. | |
| 2015/0365573 A1 | 12/2015 | Kim et al. | |
| 2016/0014318 A1 | 1/2016 | Okabe | |
| 2016/0139493 A1 | 5/2016 | Johansson et al. | |
| 2016/0216477 A1 | 7/2016 | Barros et al. | |
| 2016/0219194 A1 | 7/2016 | Barros et al. | |
| 2016/0219197 A1 | 7/2016 | Barros et al. | |
| 2016/0219202 A1 | 7/2016 | Barros et al. | |
| 2016/0254837 A1 | 9/2016 | Rayner | |

FOREIGN PATENT DOCUMENTS

| | | |
|---|---|---|
| WO | 2014/043266 A1 | 3/2014 |
| WO | 2014/121116 A2 | 8/2014 |
| WO | 2016/122990 A2 | 8/2016 |
| WO | 2016/122990 A3 | 10/2016 |

OTHER PUBLICATIONS

Non-Final Rejection, dated May 20, 2016, for U.S. Appl. No. 14/624,568, filed Feb. 17, 2015.
Non-Final Rejection, dated Apr. 29, 2016, for U.S. Appl. No. 14/624,573, filed Feb. 17, 2015.
Notice of Allowance, dated Jun. 2, 2016, for U.S. Appl. No. 14/624,573, filed Feb. 17, 2015.
Corrected Notice of Allowance, dated Jun. 20, 2016, for U.S. Appl. No. 14/624,573, filed Feb. 17, 2015.
Non-Final Rejection, dated Sep. 20, 2016, for U.S. Appl. No. 14/624,577, filed Feb. 17, 2015.
PCT Invitation to Pay Additional Fees and, Where Applicable, Protest Fee, for PCT Application No. PCT/US2016/014652, International Filing Date: Jan. 25, 2016; Invitation dated Apr. 8, 2016, 2 pages.
PCT Notification of Transmittal of the International Search Report and the Written Opinion of the International Searching Authority, or the Declaration, for PCT Application No. PCT/US2016/014652, report dated Jul. 12, 2016, 18 pages.
Notice of Allowance, dated Apr. 5, 2017, for U.S. Appl. No. 14/624,577, filed Feb. 17, 2015.
Notice of Allowance, dated May 25, 2017, for U.S. Appl. No. 14/624,571, filed Feb. 17, 2015.
PCT Notification of Transmittal of Copies of International Preliminary Report on Patentability Chapter I, and International Preliminary Report on Patentability Chapter I, for PCT Application No. PCT/US2016/014652, report dated August 10, 2017, 8 pages.

* cited by examiner

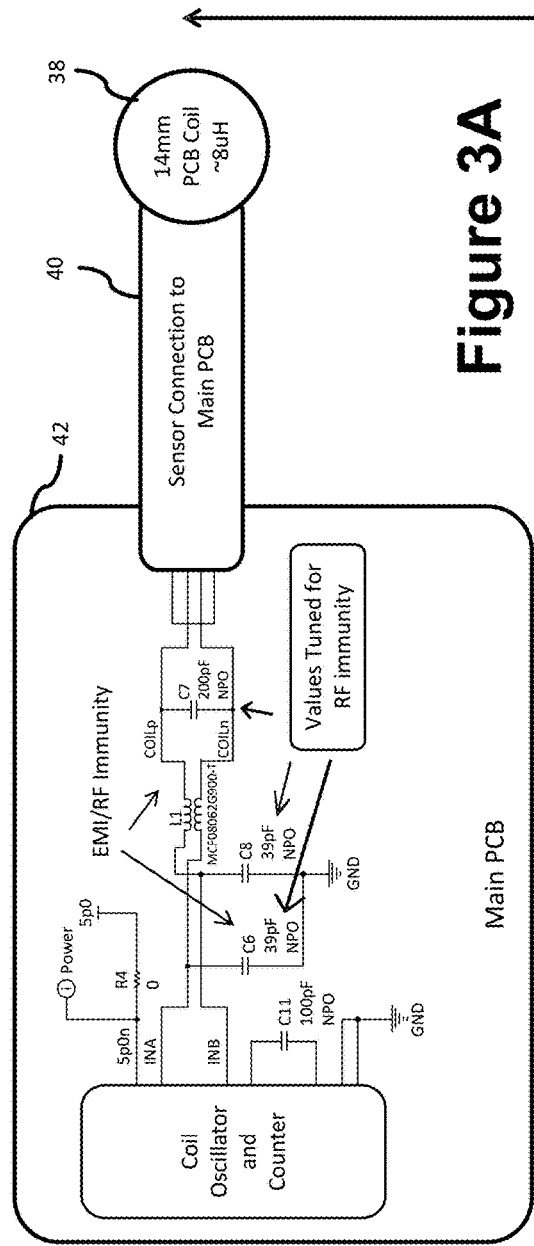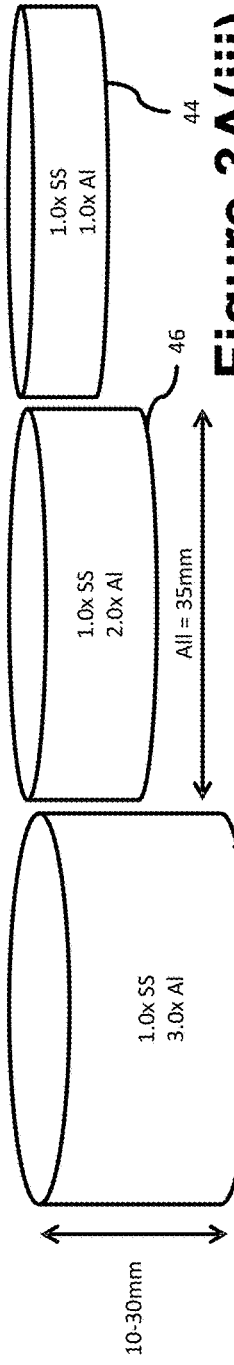

Top view of bayonet interface (phone side)

Bottom view of bayonet interface (lens)

Bayonet tab

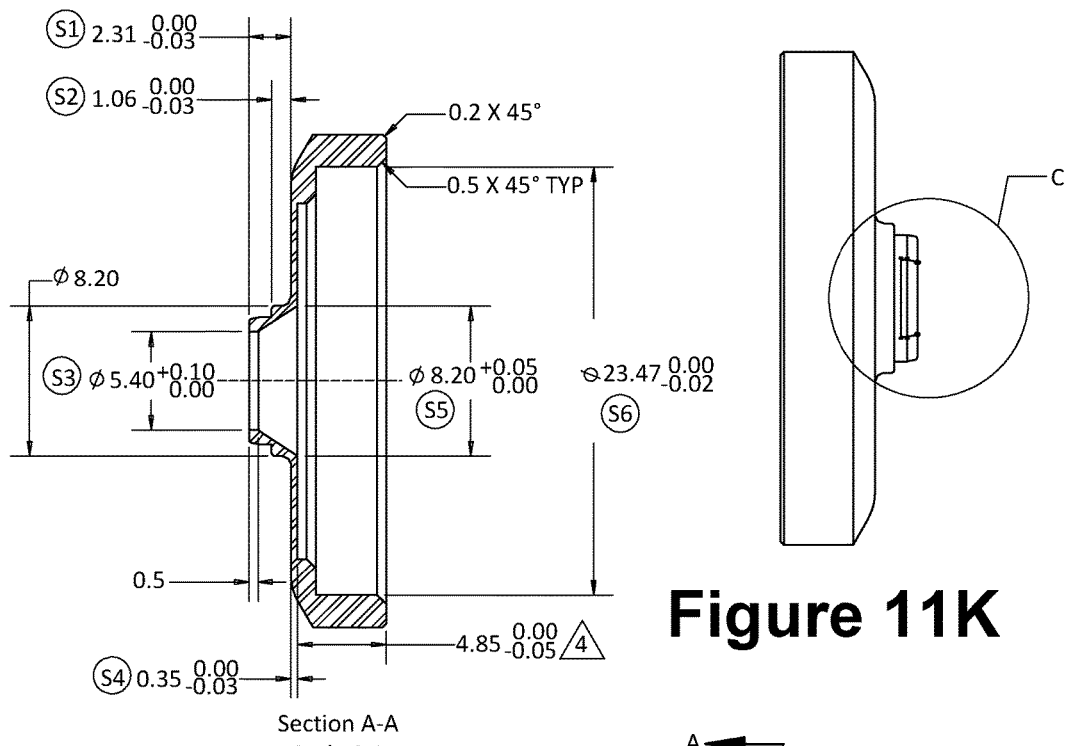
Figure 11J
Figure 11K
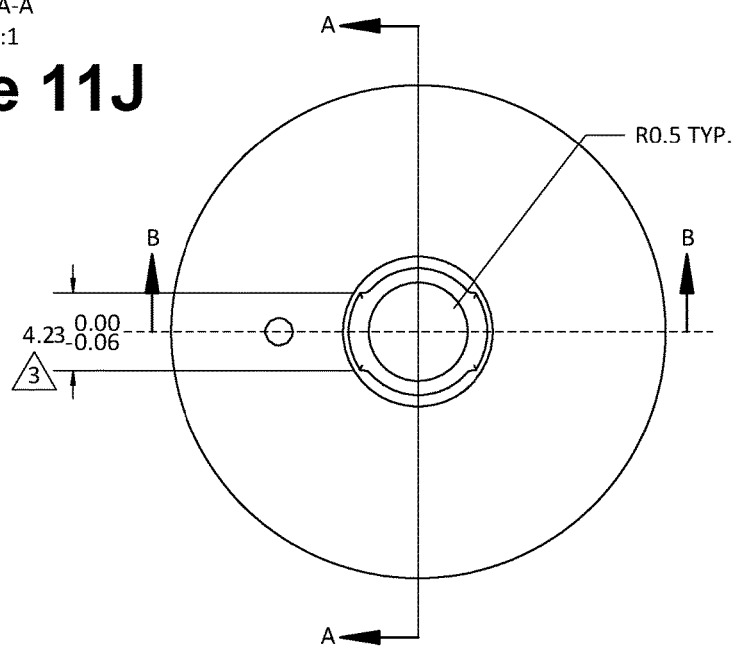
Figure 11L

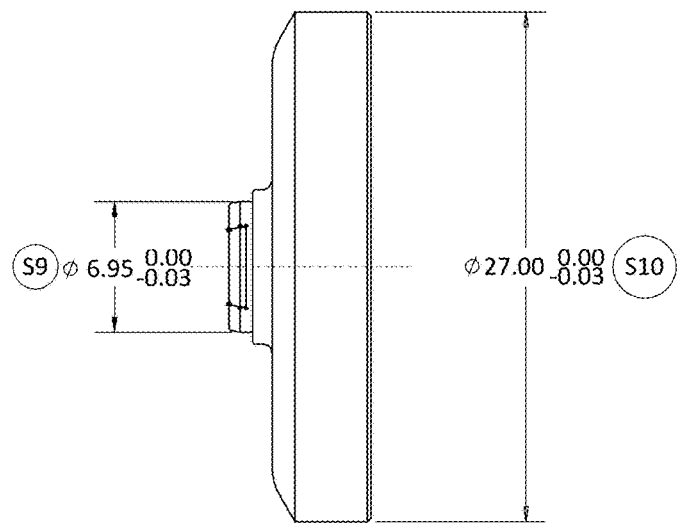
Figure 11M
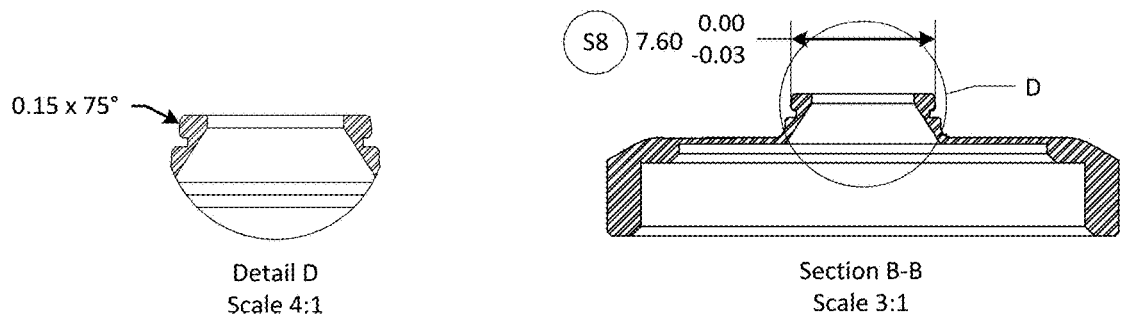
Detail D
Scale 4:1
Figure 11N
Section B-B
Scale 3:1
Figure 11O Cutout area for custom grip plate detail to be bonded

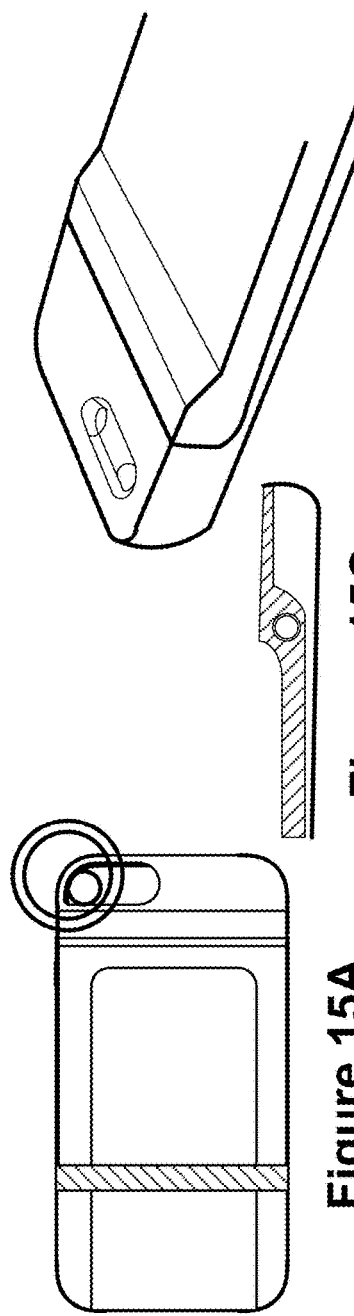
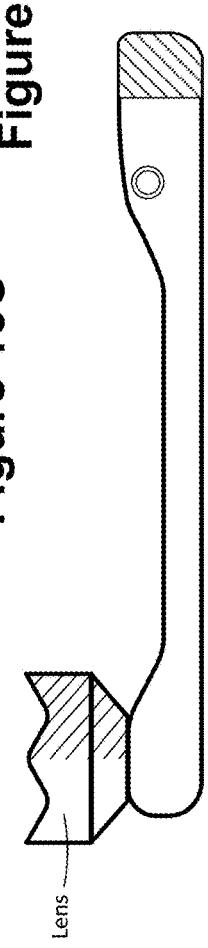
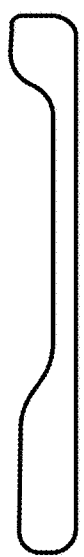
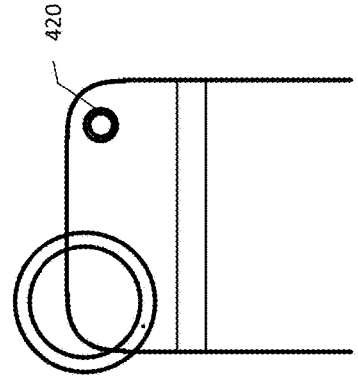
Figure 15A
Figure 15B
Figure 15C
Figure 15D
Figure 15E
Figure 15F
Figure 15G
Lens
420

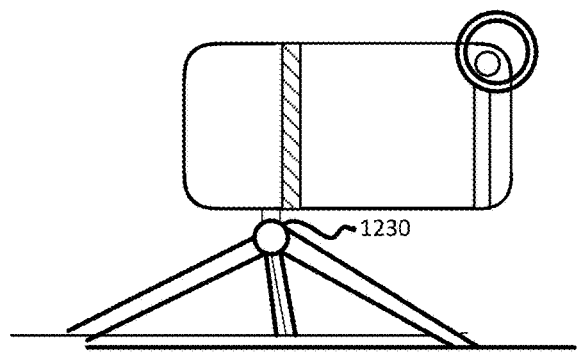
Figure 15H
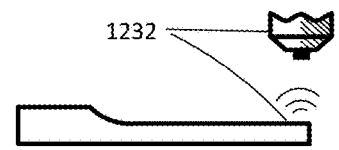
Figure 15I
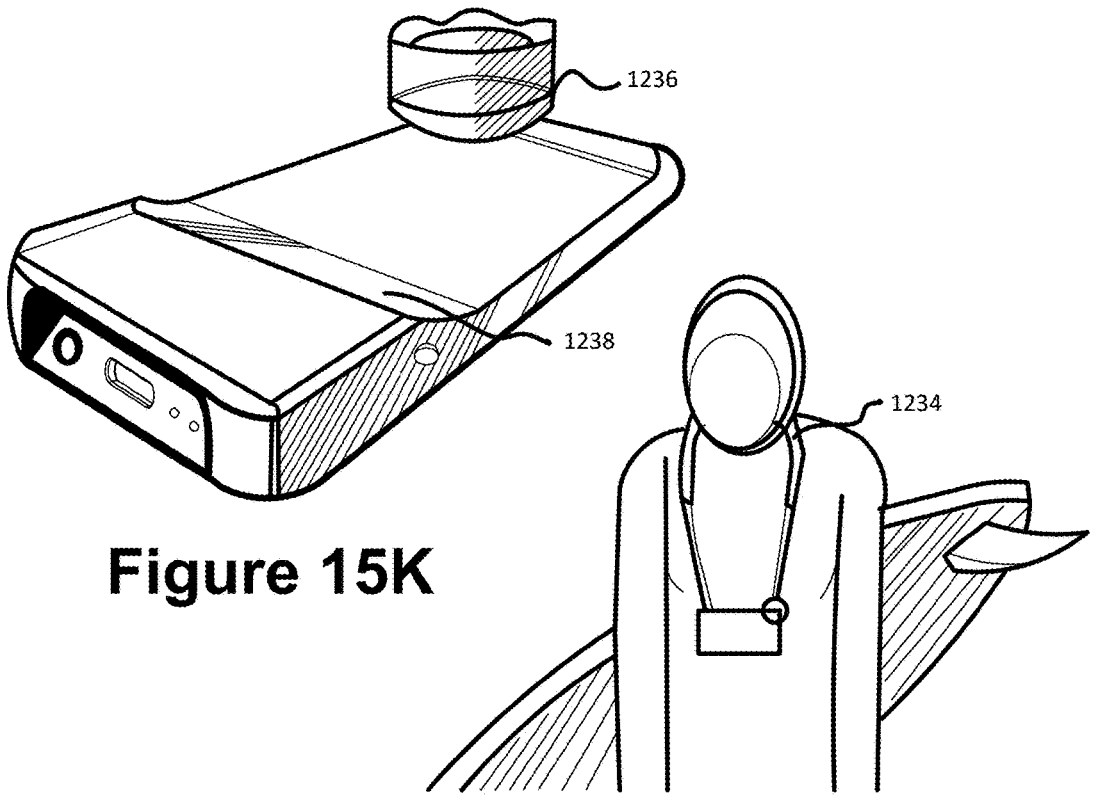
Figure 15K
Figure 15J

Section A-A

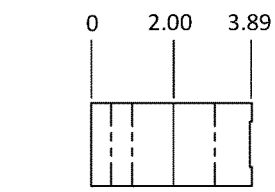
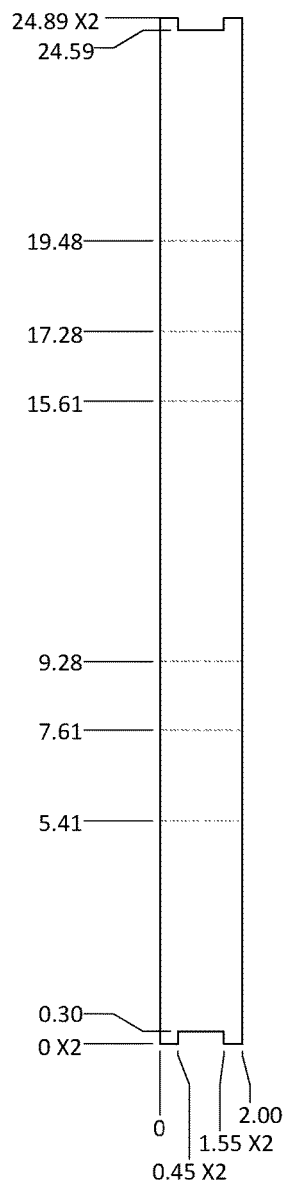
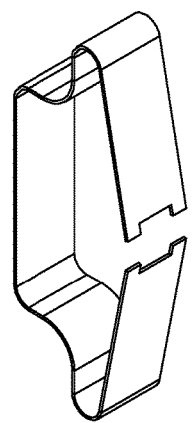
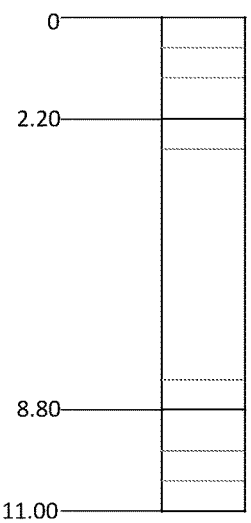
Figure 17A
Figure 17B
Figure 17C
Figure 17D

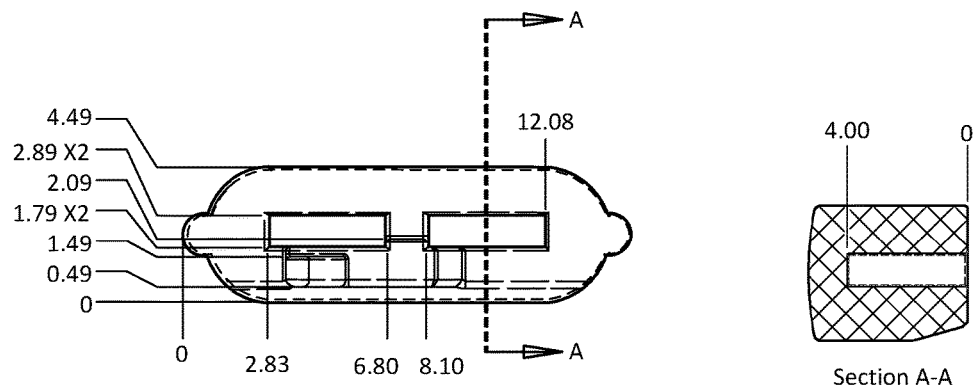
Figure 20A
Figure 20B
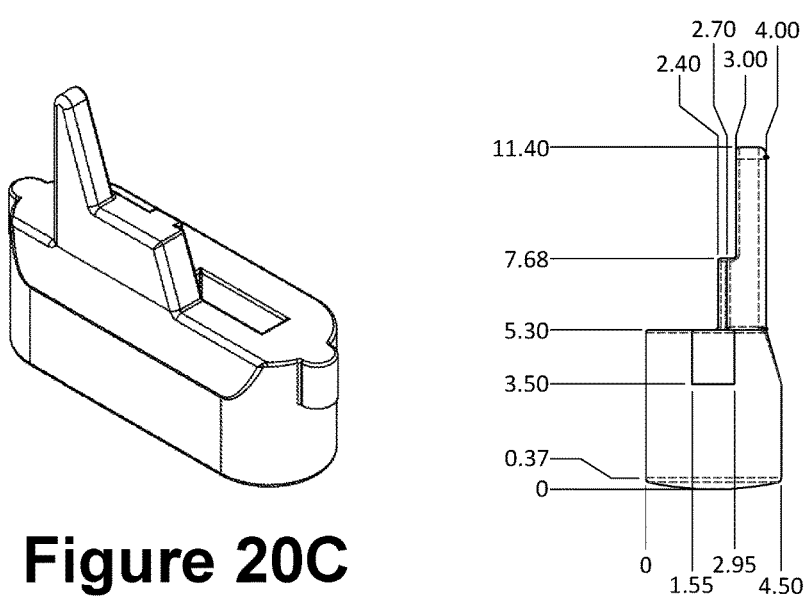
Figure 20C
Figure 20D

- Spring 2 replaces the compression of the rubber in Figure 24

Section A-A

Figure 35A
Figure 35B
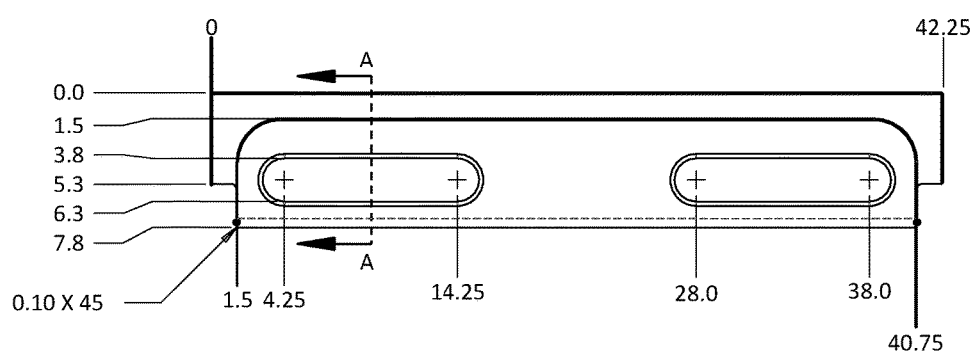
Figure 35C
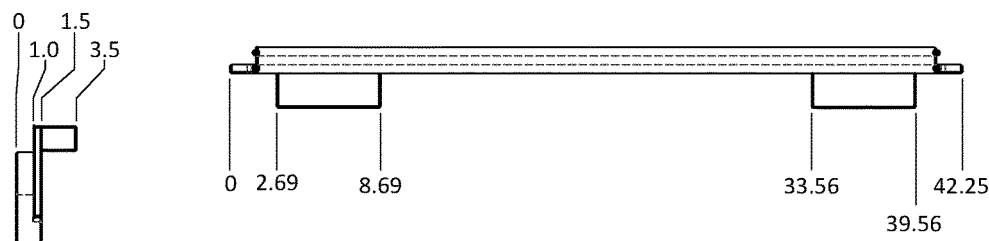
Figure 35D
Figure 35E Edge is not a uniform radius, follows curvature of iPhone profile - close to radii of 9.80mm X 2

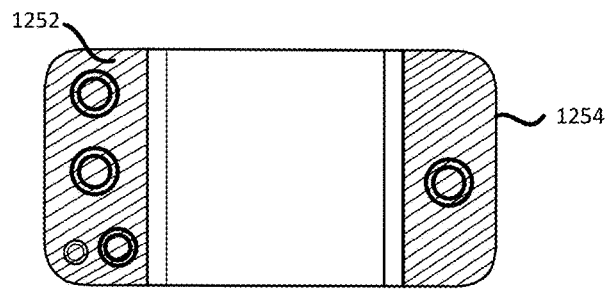
Figure 38A
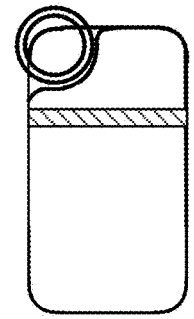
Figure 38B
Figure 38C
Figure 38D
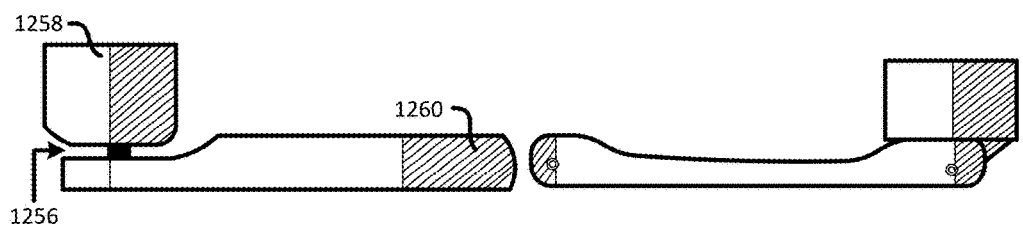
Figure 38E
Figure 38F
Figure 38G

AUXILIARY LENS FOR MOBILE PHOTOGRAPHY

PRIORITY AND RELATED APPLICATIONS

This application is a Continuation of U.S. patent application Ser. No. 14/624,573, filed Feb. 17, 2015, now U.S. Pat. No. 9,467,608; which claims priority to U.S. provisional patent application Ser. No. 62/108,506, filed Jan. 27, 2015; which is incorporated by reference, and which is related to one of four contemporaneously-filed applications by the same Applicant and Inventors that are entitled: An Integrated Multi-Functional Case for Mobile Photography, application Ser. No. 14/624,571; Smart Case for Mobile Photography, application Ser. No. 14/624,568; Auxiliary Lens for Mobile Photography, application Ser. No. 14/624,573, now U.S. Pat. No. 9,467,608; and A Mobile Device Case for Capturing Digital Images, application Ser. No. 14/624,577. Each of these priority and related applications is hereby incorporated by reference.

BACKGROUND

Embedded devices such as mobile phones, including Android, Apple and Samsung phones, are often equipped with miniature camera modules. These miniature camera modules typically include only a single fixed-focus lens and an image sensor. Some of these devices have software applications downloaded or otherwise stored on them that permit limited choices in pre-capture camera settings, such as exposure duration and flash setting, and some provide limited post-capture image editing capabilities designed to compensate for the inadequacy of the built-in optics. Image processing software is however incapable of providing real images of objects that are too close or too far from the device, or of scenes including multiple objects that require greater depths of field in order to capture them without intolerable amounts of defocus blur or of scenes with moving objects without excessive motion-related blur, among other imaging issues. It is therefore desired to be able to supplement the built-in optics of a miniature camera-enabled embedded device with one or more additional lenses or other optics.

Auxiliary lenses for mobile smartphones with camera modules are typically clipped onto the smartphone. These clip-on lenses put mechanical stresses on the smartphone directly along the optical path of the camera modules that can result in distortional stresses that can mechanically weaken the device and can distort the optical quality of captured images. Clip-on lenses are also unstable and often move laterally when smartphone precapture settings are being adjusted, during image capture and when the smartphone is being temporarily stored in a bag or pocket or on a table top. It is desired to have a way to attach an auxiliary lens to a mobile device in stable alignment with the optics of the built-in camera module.

Smartphones are used for capturing digital images in a variety of situations. In the past, a person operating a camera could not be in the picture because of the unwieldy nature of the camera and the camera-object distances typically involved in capturing an entire scene that may include multiple persons and perhaps background buildings or other objects. Some conventional cameras include a built-in delay to allow the camera operator to quickly duck into the scene that is based on a predetermined time duration or that uses face recognition techniques wherein image capture awaits a smiling camera operator to enter the scene. Either way, it is difficult to spontaneously, stably and accurately position and direct a camera to capture a picture without being held by a human operator. Today, "selfies" are more commonly made possible because smartphones and other mobile devices with built-in miniature camera modules are permit front-side display of the precapture image and these mobile devices are typically lightweight enough to hold in one hand while an image is captured. Nonetheless, it is desired to be able to more easily handle a mobile device during a one-handed image capture.

BRIEF DESCRIPTIONS OF THE DRAWINGS

FIG. 1 schematically illustrates a mobile camera system including a case coupled around a camera-enabled mobile phone, a lens attachment interface embedded within or integral with the case, a lens recognition sensor and processor contained within the case, and a lens coupled to the phone at the lens attachment interface and aligned along the optical path of the mobile camera system in accordance with certain embodiments.

FIG. 2A schematically illustrates a lens coupled to a lens attachment interface that is configured to be embedded or integrated within a case for a camera-enabled mobile phone and that is configured to detect and/or uniquely identify the attached lens using one or more Hall Effect sensors, in accordance with certain embodiments. For example, the lens holder of each type of lens may include a unique pattern of magnetic elements.

FIGS. 2B-2C illustrate examples a case including electrical components of Hall Effect sensors in accordance with FIG. 2A. A lens attachment interface cavity is defined in the case illustrated at FIGS. 2B-2C for embedding, stabilizing or otherwise coupling a lens attachment interface in position to receive a lens aligned along the optical path of a mobile camera system in accordance with certain embodiments.

FIGS. 3A-3B schematically illustrate a lens coupled to a lens attachment interface that is configured to be embedded or integrated within a case for a camera-enabled mobile phone and that is configured to detect and/or uniquely identify the attached lens using inductive sensing in accordance with certain embodiments.

FIG. 4 schematically illustrates a lens coupled to a lens attachment interface that is configured to be embedded or integrated within a case for a camera-enabled mobile phone and that is configured to detect and/or uniquely identify the attached lens using capacitive sensing in accordance with certain embodiments.

FIG. 5A schematically illustrates a lens coupled to a lens attachment interface that is configured to be embedded or integrated within a case for a camera-enabled mobile phone and that is configured to detect and/or uniquely identify the attached lens based on completion of a unique electrical circuit upon attachment of the lens at the lens attachment interface, in accordance with certain embodiments. For example, the lens holder of each type of lens may include a unique pattern of electrical contacts. An analog value is measurable with the circuit of FIG. 5A.

FIG. 5B schematically illustrates a lens coupled to a lens attachment interface that is configured to be embedded or integrated within a case for a camera-enabled mobile phone and that is configured to detect and/or uniquely identify the attached lens based on completion of a unique electrical circuit upon attachment of the lens at the lens attachment interface, in accordance with certain embodiments. For example, the lens holder of each type of lens may include a unique pattern of electrical contacts. A digital value is measurable with the circuit of FIG. 5B.

FIG. 6 schematically illustrates a lens coupled to a lens attachment interface that is configured to be embedded or integrated within a case for a camera-enabled mobile phone and that is configured to detect and/or uniquely identify the attached lens by reading a unique identification number that is stored in an integrated circuit that is integrated with the lens holder in accordance with certain embodiments.

FIG. 7 schematically illustrates a lens coupled to a lens attachment interface that is configured to be embedded or integrated within a case for a camera-enabled mobile phone and that is configured to detect and/or uniquely identify the attached lens using near field communication or radio frequency identification to read a unique tag embedded with each lens type in accordance with certain embodiments.

FIG. 8 schematically illustrates a lens coupled to a lens attachment interface that is configured to be embedded or integrated within a case for a camera-enabled mobile phone and that is configured to detect whether a lens is currently coupled to the lens attachment interface in accordance with certain embodiments. For example, the lens attachment interface may be configured to receive a lens having a micro-bayonet or other protrusion that closes a circuit when the lens is attached.

FIG. 9 schematically illustrates a lens coupled to a lens attachment interface that is configured to be embedded or integrated within a case for a camera-enabled mobile phone and that is configured to detect and uniquely identify a lens that is coupled to the lens attachment interface in accordance with certain embodiments. For example, the lens attachment interface may be configured to receive a lens having a micro-bayonet or other protrusion with detent features that are unique to each lens type in accordance with certain embodiments. For example, the detent features that are unique to each lens type may complete unique circuits such that a different voltage or current is measured depending on which lens type is attached at the lens attachment interface.

FIG. 10 is an exploded view of an example of a case that is configured to couple with a camera-enabled mobile phone or other embedded device in accordance with certain embodiments.

FIGS. 11A-11C schematically illustrate an example of a lens attachment interface co-mold in accordance with certain embodiments.

FIGS. 11D-11G schematically illustrate top, bottom, side and perspective views of a further example of a lens attachment interface in accordance with certain embodiments.

FIGS. 11H-11T schematically illustrate several views of an auxiliary lens holder that is designed to couple stably at a lens attachment interface in accordance with FIGS. 11D-11G of a functional mobile device case in accordance with certain embodiments.

FIG. 12A-12D schematically illustrate an example of a case for coupling with a mobile phone or other embedded device in accordance with certain embodiments.

FIG. 13A-13C schematically illustrate an example of a lens attachment interface in accordance with certain embodiments.

FIG. 14 schematically illustrates a cutaway view of an exemplary camera-enabled mobile device case and lens attachment interface in accordance certain embodiments.

FIGS. 15A-15G schematically illustrate examples of camera-enabled mobile device cases in accordance with certain embodiments.

FIG. 15H schematically illustrate a tripod accessory in accordance with certain embodiments.

FIG. 15I schematically illustrates a wireless communication feature between the mobile device case and an attachable auxiliary lens in accordance with certain embodiments.

FIG. 15J schematically illustrate a camera strap attachment in accordance with certain embodiments.

FIG. 15K schematically illustrates a mobile phone case coupled around a mobile device that includes an installed camera module and an attached auxiliary lens and camera style grip for enhanced image capturing capability in accordance with certain embodiments.

FIGS. 16A-16D schematically illustrate an example of a main PCB cover portion of a case in accordance with certain embodiments.

FIG. 17A illustrates a metallic component before it is bent to form a detent spring for a shutter button for a camera-enabled mobile device case in accordance with certain embodiments.

FIGS. 17B-17F illustrate a detent spring for a shutter button for a camera-enabled mobile device case in accordance with certain embodiments.

FIGS. 19A-19D schematically illustrate a shutter button mechanism assembly for a camera-enabled mobile device case in accordance with certain embodiments.

FIGS. 20A-20G schematically illustrate a shutter button for a camera-enabled mobile device case in accordance with certain embodiments.

Figures 21A, 21B:
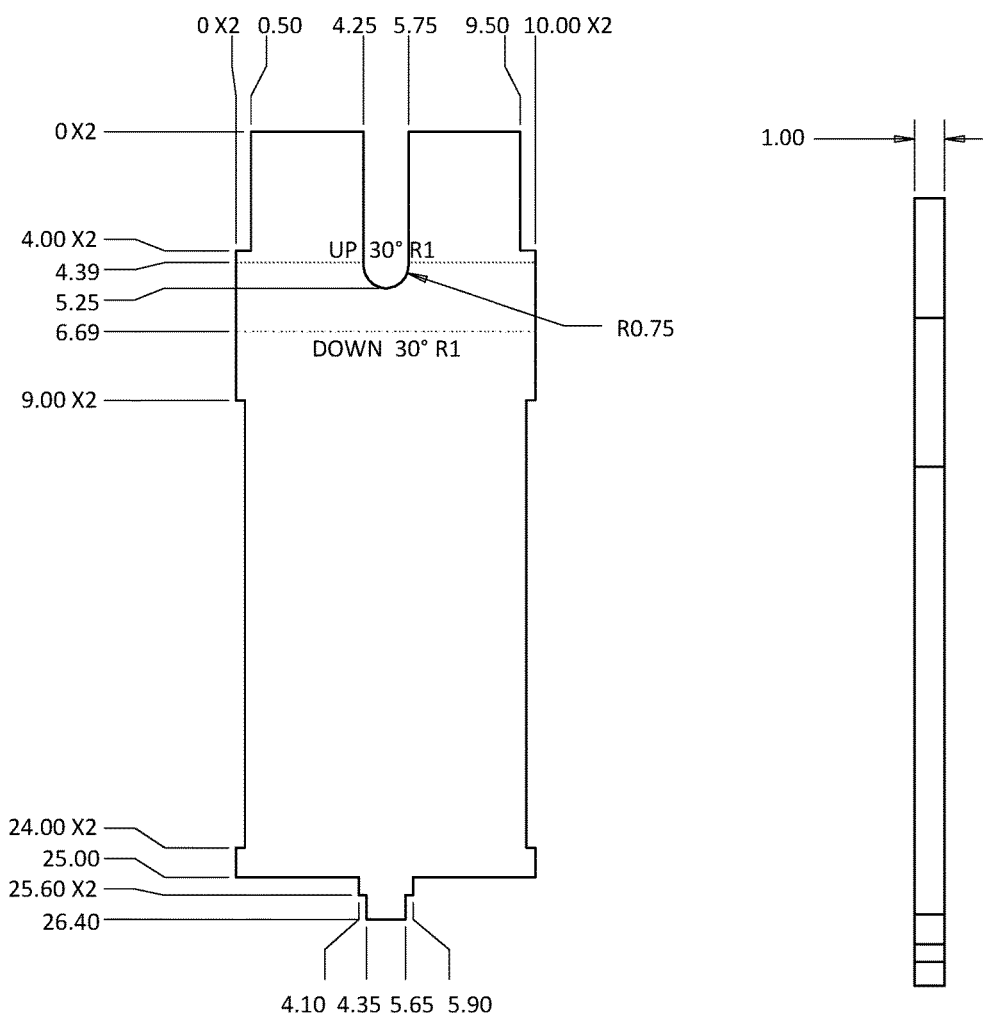
Figure 21C:
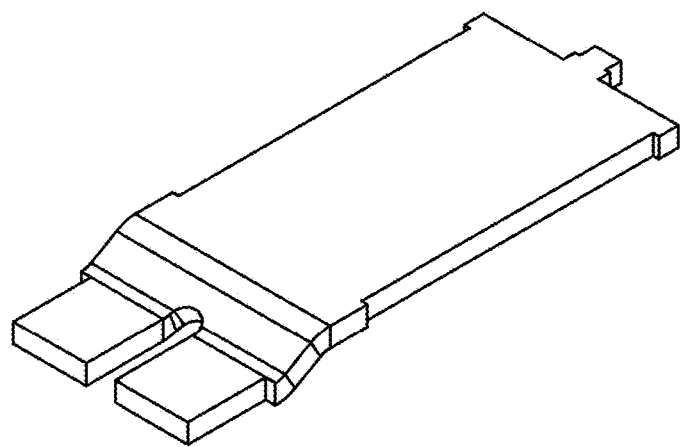

FIGS. 21A-21C schematically illustrate a mechanism attaching shutter button and spring for a camera-enabled mobile device case in accordance with certain embodiments.

Figure 22A:
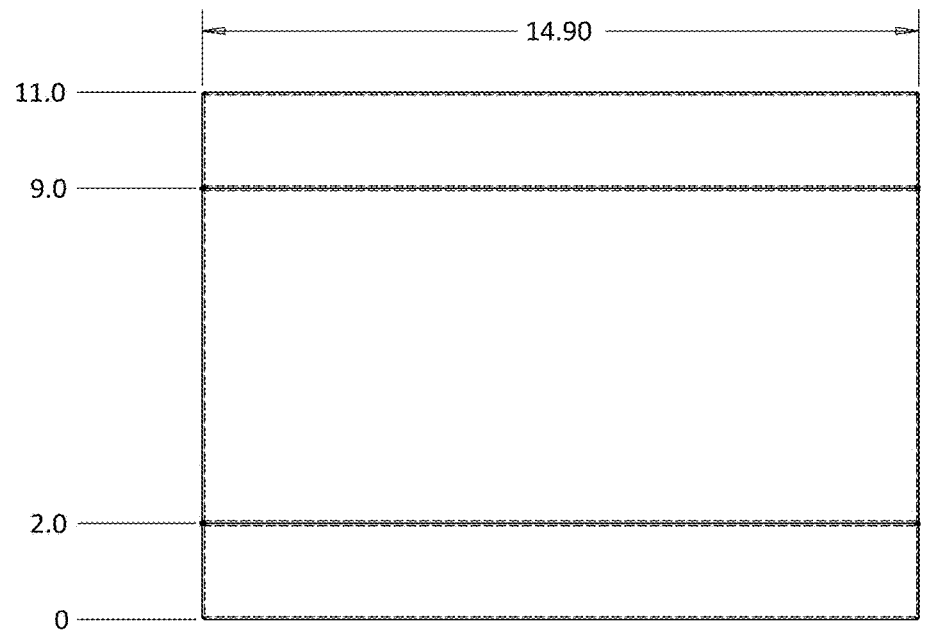
Figure 22B:
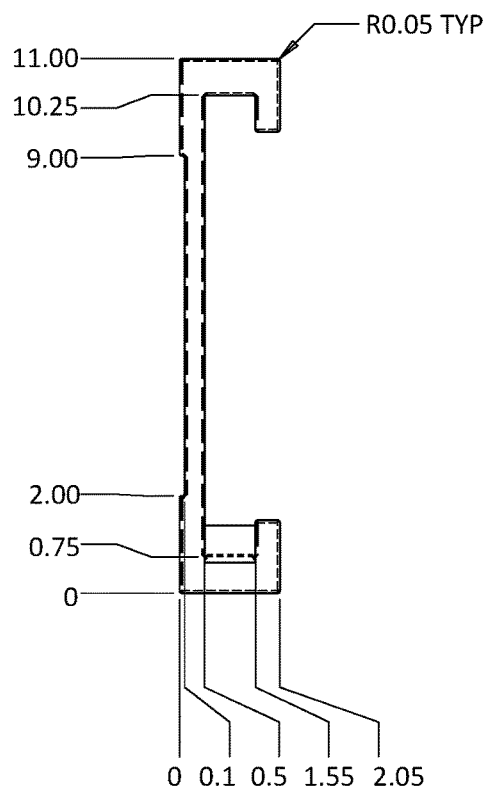
Figure 22C:
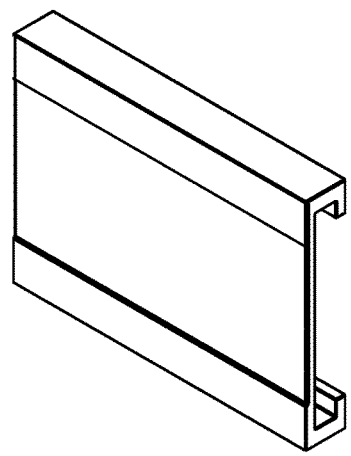

FIGS. 22A-22C schematically illustrate a friction slider for a shutter button mechanism for a camera-enabled mobile device case in accordance with certain embodiments.

FIGS. 23-28 schematically illustrate examples of alternative shutter button mechanisms for camera-enabled mobile device cases in accordance with certain embodiments.

Figure 28:
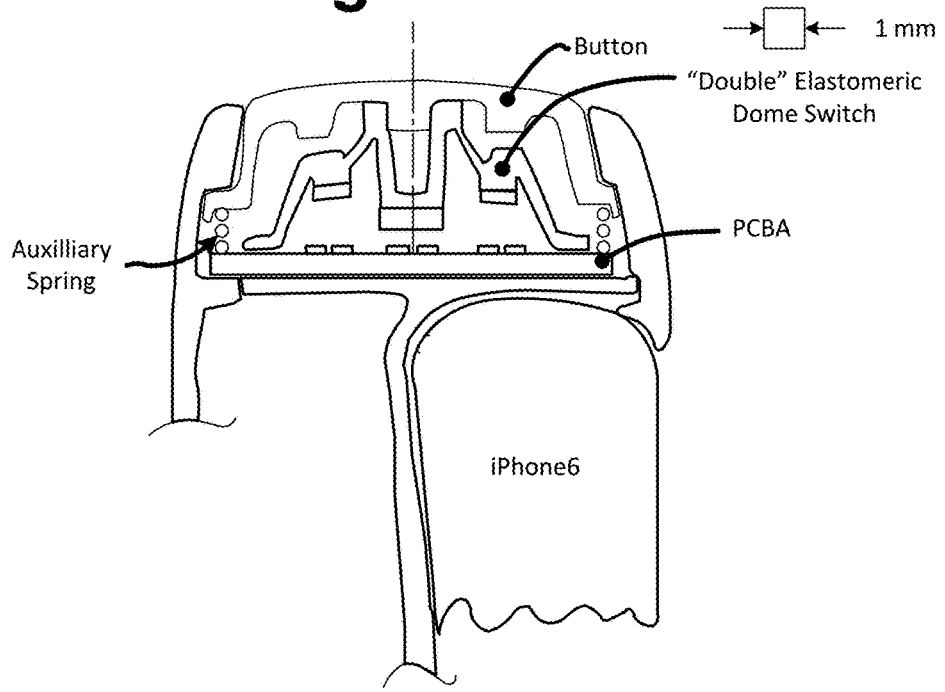
Figure 29:
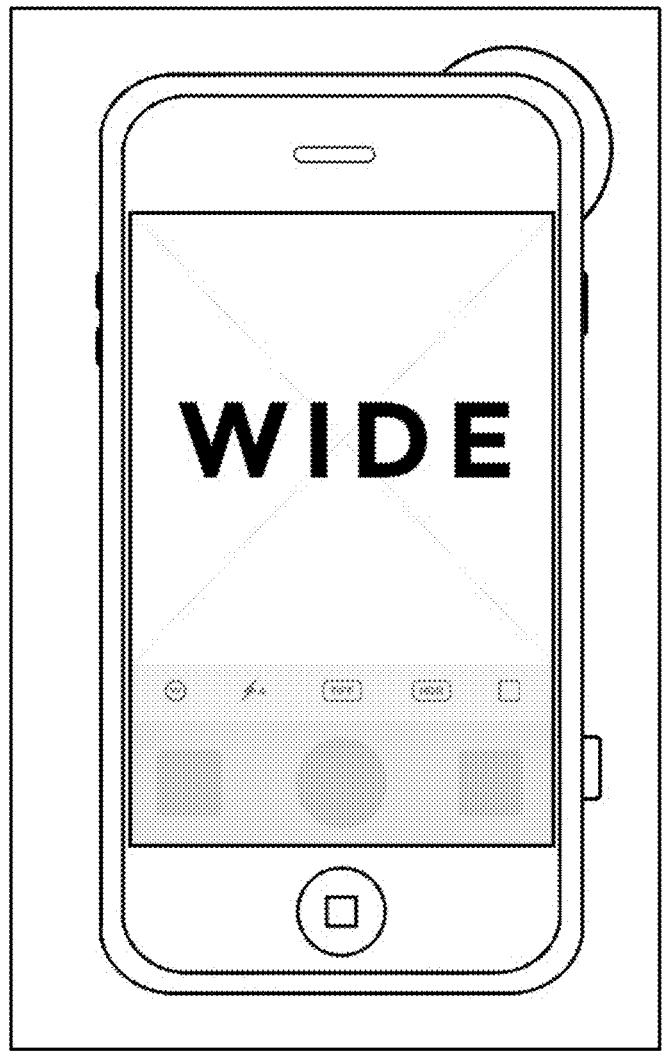
Figure 30:
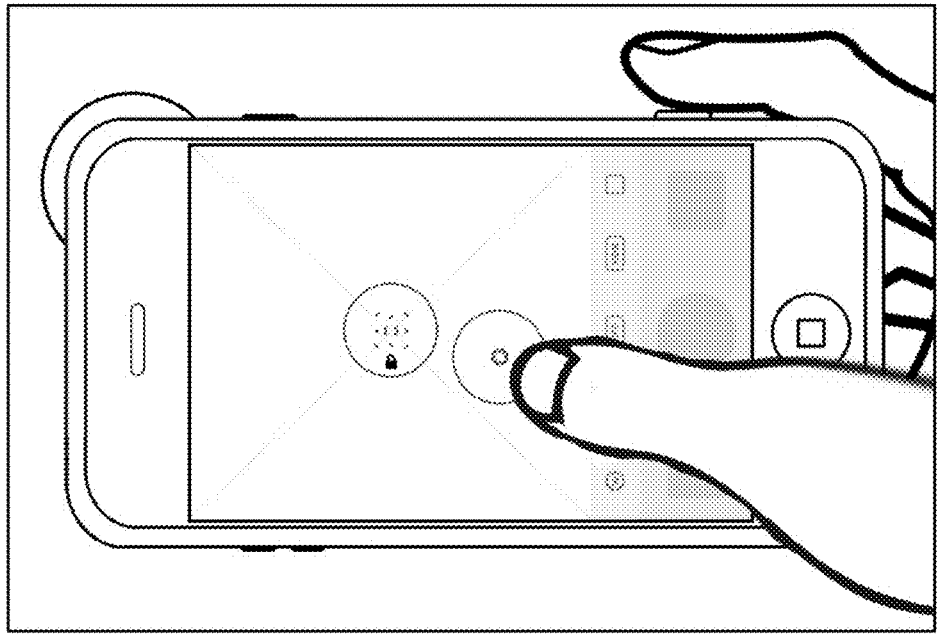
Figure 31:
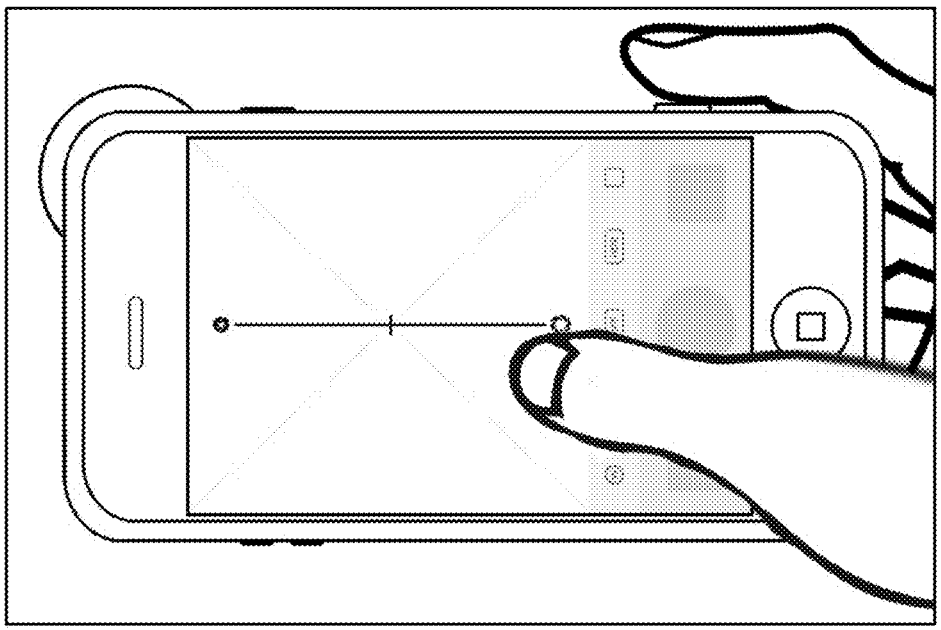
Figure 32:
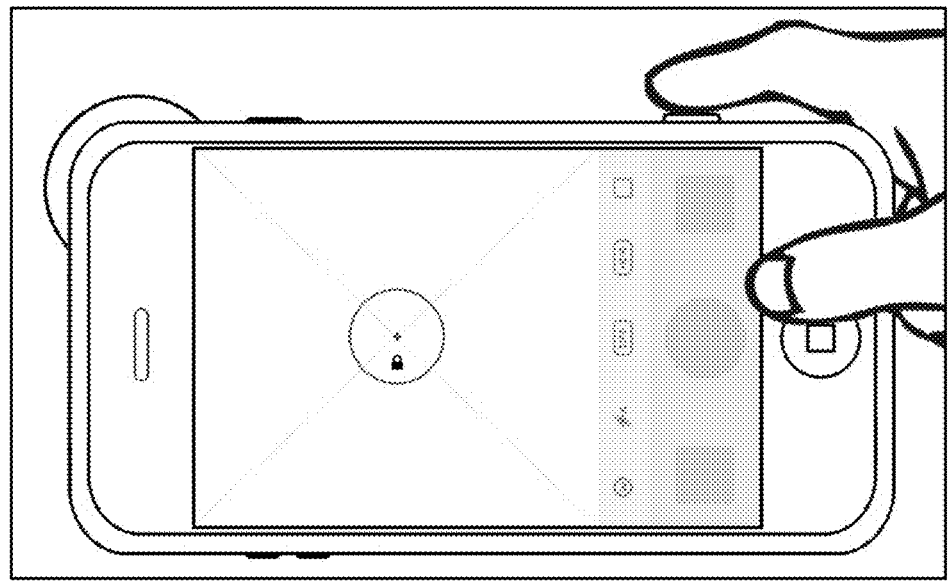
Figure 33:
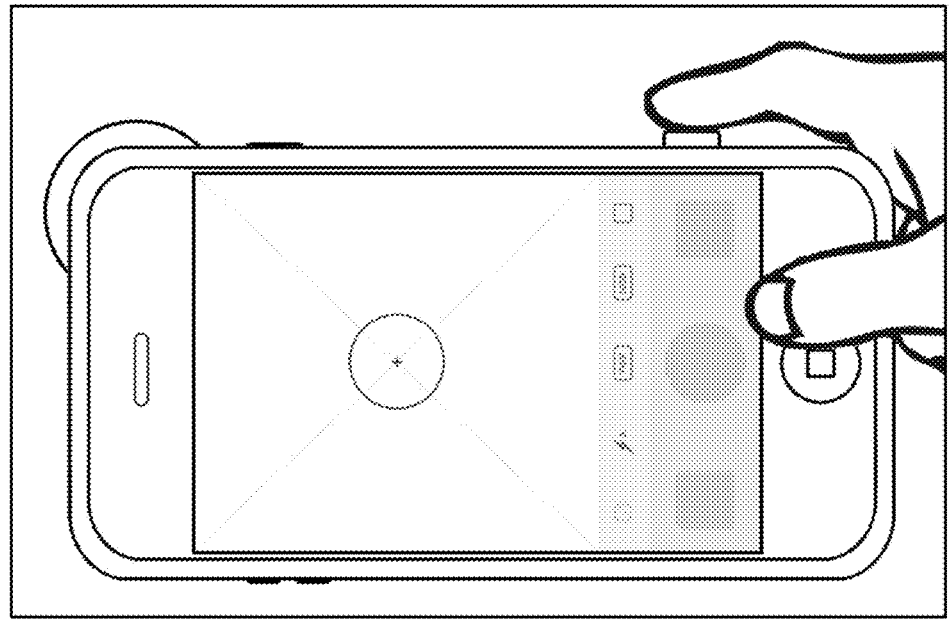
Figure 34A:
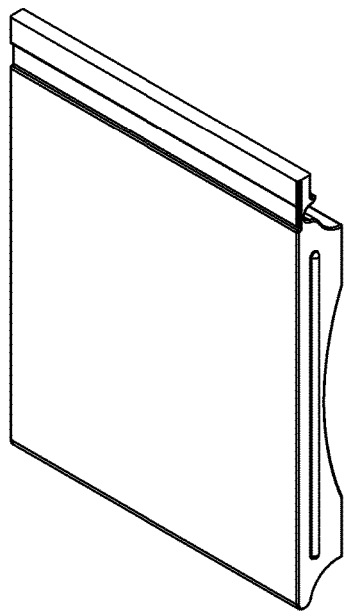
Figure 34B:
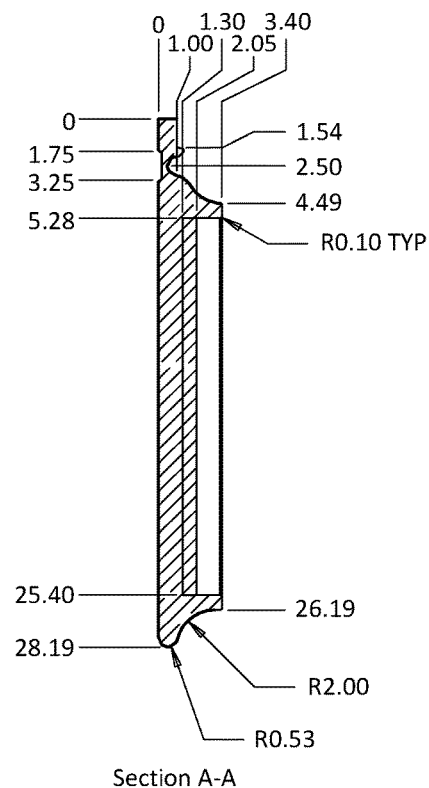
Figure 34C:
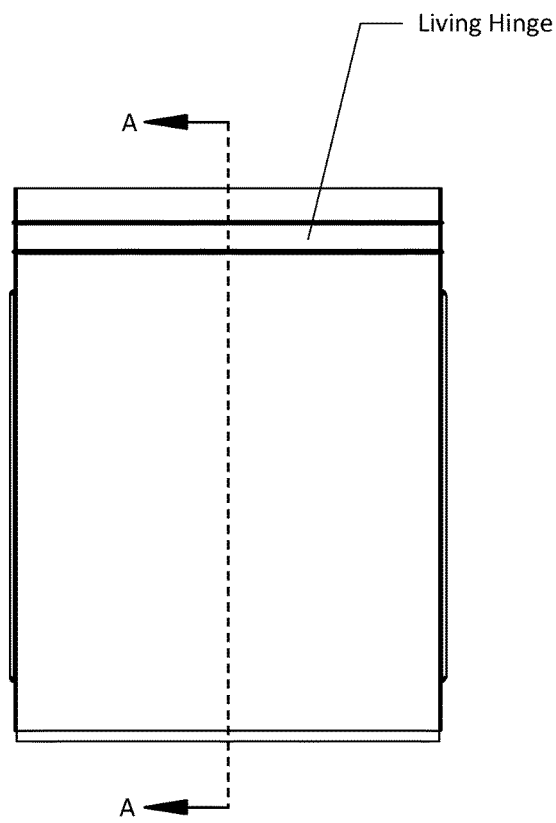
Figure 34D:
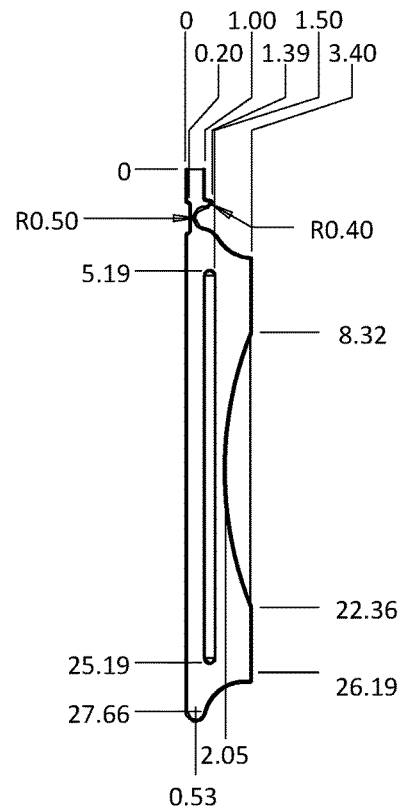
Figure 34E:
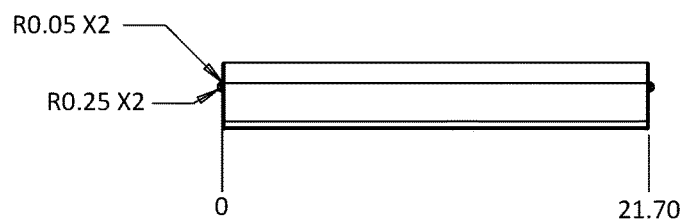
Figure 36A:
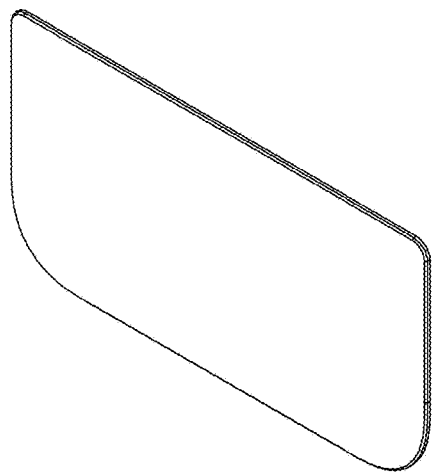
Figure 36C:
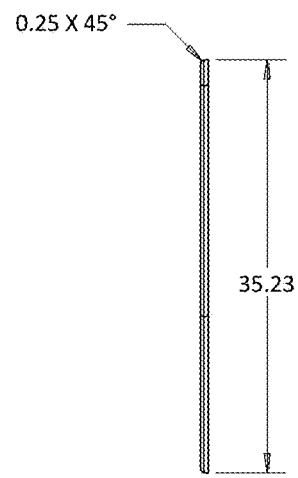
Figure 36B:
Figure 36D:
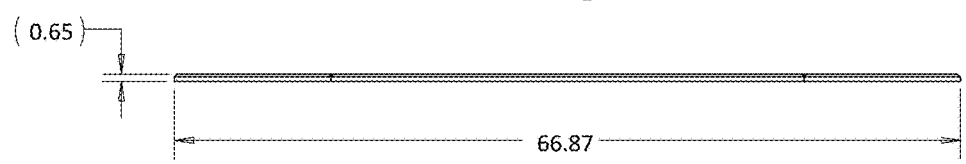

FIGS. 29-33 illustrate screen shots of graphics generated based on programming and data gathered by components of a camera-enabled mobile device case in accordance with certain embodiments. For example, FIG. 29 illustrates wide angle lens recognition, and FIGS. 30-31 illustrate touch screen lighting and exposure adjustment while the shutter button illustrated by the examples illustrated at FIGS. 10 and 17A-28 is half-pressed as in FIG. 32. FIG. 33 illustrates a full pressed shutter button for image capture in accordance with certain embodiments.

FIGS. 34A-34E schematically illustrate a battery door for a camera-enabled mobile device case in accordance with certain embodiments.

FIGS. 35A-35E schematically illustrate a camera strap attachment for a camera-enabled mobile device case in accordance with certain embodiments.

FIGS. 36A-36D schematically illustrate a custom grip case for a camera-enabled mobile device case in accordance with certain embodiments.

Figure 37A:
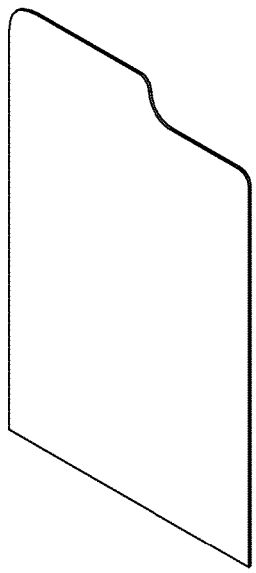
Figure 37B:
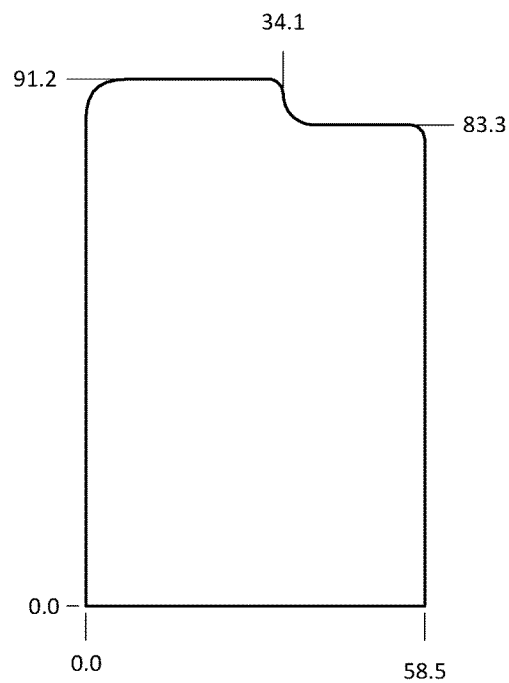
Figure 37C:
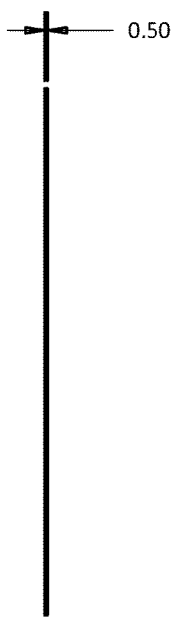

FIGS. 37A-37C schematically illustrate an inner cushion/lining of a camera-enabled mobile device case in accordance with certain embodiments.

FIGS. 38A-38G schematically illustrate a camera-enabled mobile device case configured to couple with a lens in accordance with certain embodiments.

Figure 39A:
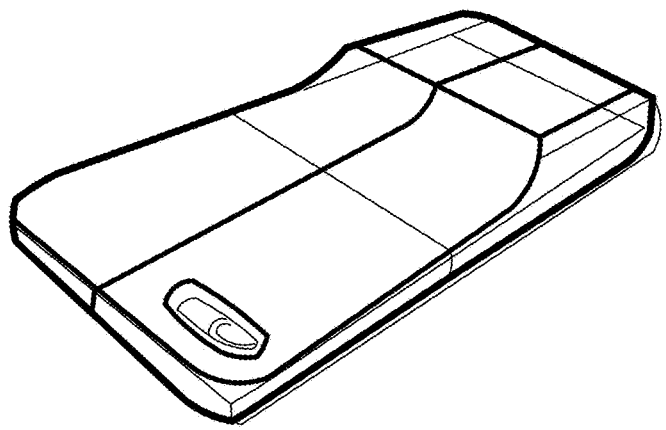
Figure 39B:
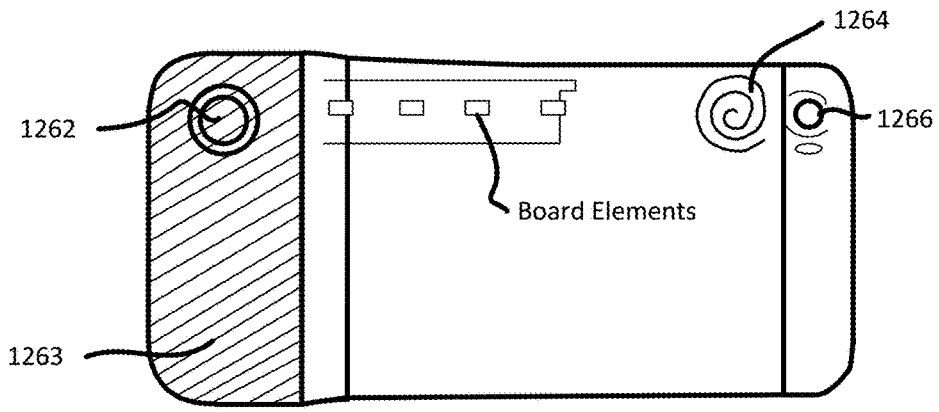
Figure 39C:
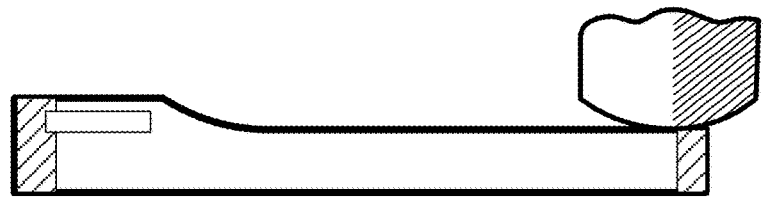

FIGS. 39A-39C schematically illustrate a camera-enabled mobile device case configured to couple with a lens in accordance with certain embodiments.

Figure 40:
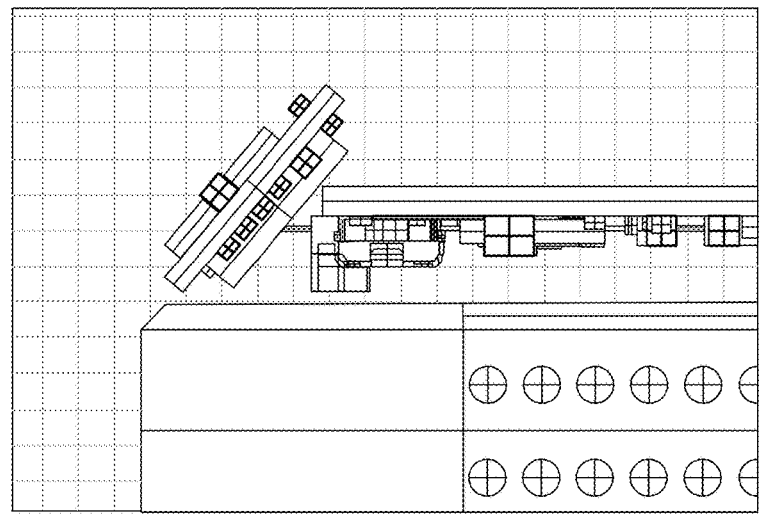
Figure 41:
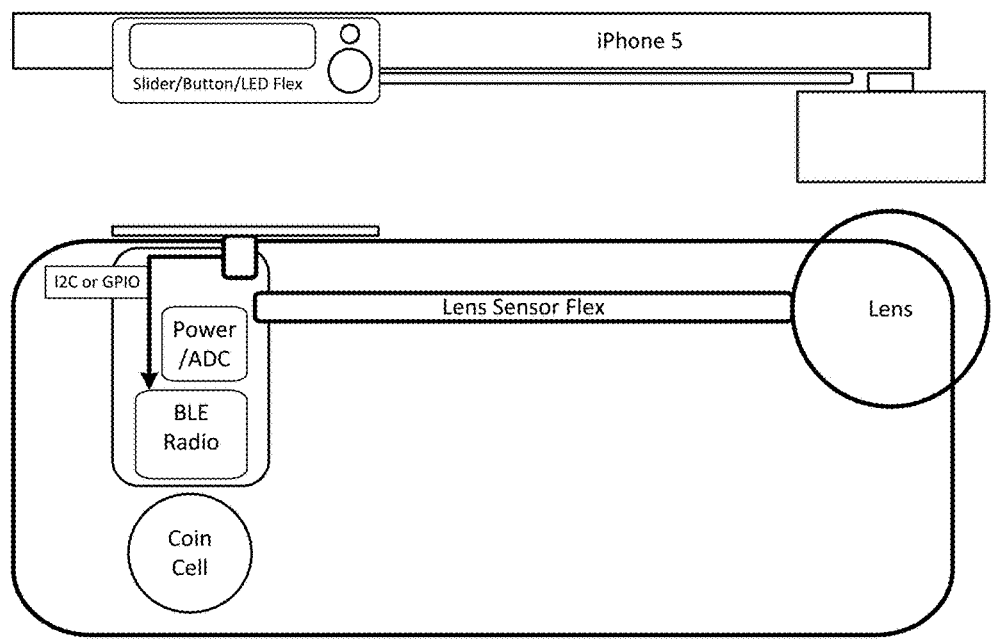
Figure 42:
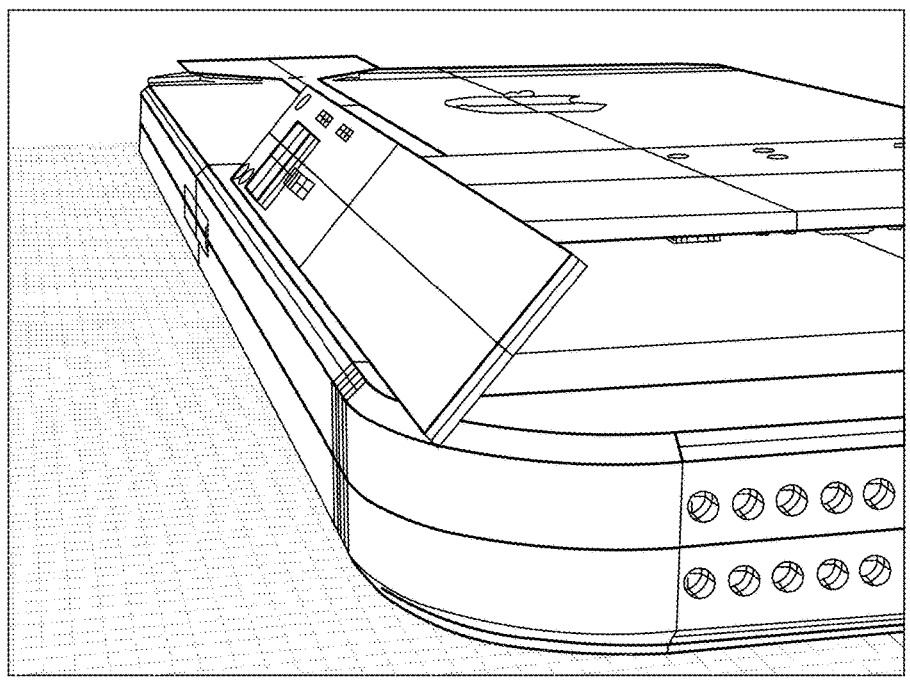

FIGS. 40-42 schematically illustrate a capacitive touch slider for a camera-enabled mobile phone device case in accordance with certain embodiments.

DETAILED DESCRIPTIONS OF THE EMBODIMENTS

A mobile camera system is provided herein that includes a camera-enabled mobile device, a case and a removable lens assembly. The mobile device includes a miniature camera module embedded within the mobile device including a built-in lens and an image sensor for capturing digital images. A mobile device processor is configured for processing the digital images. A mobile device display is configured for viewing the digital images. The case is configured to be coupled around the camera-enabled mobile device. A lens attachment interface is embedded within or integral with the case. The removable lens assembly is configured to be coupled to the lens attachment interface in stable alignment along the optical path of the miniature camera module. A case shutter button mechanism is configured for actuating the miniature camera module of the mobile camera system. A case processor and electrical circuitry embedded within the case are configured to detect the presence of the removable lens that is coupled to the lens attachment interface. A lens recognition sensor that is coupled to the case processor and electrical circuitry is configured to identify the removable lens as being configured in accordance with a particular one of multiple lens types.

The removable lens assembly may include a lens holder, or attachment thereto, having embedded therein one or more magnetic elements. The lens recognition sensor may include one or more Hall sensors disposed in accordance with the one or more magnetic elements for measuring a Hall current, Hall voltage or a related quantity having a value that differs for each of the multiple lens types sufficient to uniquely identify the removable lens as a particular one of the multiple lens types. The magnetic elements may include approximately same or similar magnetic properties and disposed in different binary configurations depending on lens type.

The lens recognition sensor may include one or more conductive coils. The removable lens assembly may include a lens holder, or attachment thereto, disposed in accordance with the one or more conductive coils and having a different amount of conducting material for each of the multiple lens types sufficient to uniquely identify the removable lens as a particular one of the multiple lens types when an induced magnetic field is measured by the lens recognition sensor. The conducting material of each type of lens may include an approximately same or similar charge density and a different volumetric amount of material.

The lens recognition sensor may include a capacitance reference plate. The removable lens assembly may include a lens holder, or attachment thereto, disposed in accordance with the capacitance reference plate such as to form a capacitor and complete a RC circuit having a different value of capacitance for each of the multiple lens types sufficient to uniquely identify the removable lens as a particular one of the multiple lens types when one or both of a charge time or a decay time is measured for the RC circuit. The composition of the lens holder, or attachment thereto, of each type of lens may include an approximately same or similar electrical material and a different volumetric amount of material. The composition of the lens holder, or attachment thereto, of each type of lens may include an approximately same or similar electrical material and a different volumetric shape.

A removable lens assembly may include a lens holder, or attachment thereto, that has one or more electrical lens holder contacts. The lens recognition sensor may include one or more sensor contacts disposed in accordance with the one or more electrical lens holder contacts for completing a circuit having a measurable electrical value that differs for each of the multiple lens types sufficient to uniquely identify the removable lens as a particular one of the multiple lens types. The electrical lens holder contacts may be disposed in different binary configurations depending on lens type.

A removable lens assembly may include a lens holder, or attachment thereto, including an integrated circuit (IC) that has an unique identifier that differs for each type of the multiple lens types. The lens recognition sensor may include an IC reader circuit that is configured to read the unique identifier from the IC. The removable lens assembly may include a coupling interface that is configured to couple with the lens attachment interface and to complete the IC reader circuit when the removable lens assembly is coupled to the case. The coupling interface may include a micro-bayonet interface.

A removable lens assembly may include a lens holder, or attachment thereto, including a near field communication (NFC) or radio frequency identification (RFID) tag, or both, that is unique for each type of the multiple lens types. The lens recognition sensor may include a NFC reader circuit or a RFID reader circuit, or both, that is configured to read the NFC or RFID tag.

A removable lens assembly may include a coupling interface that is configured to couple with the lens attachment interface and may include a detent configuration to complete a lens sensor circuit when the removable lens assembly is coupled to the case. A compete lens sensor circuit in this embodiment has a measurable electrical value that differs based on the detent configuration for each of the multiple lens types sufficient to uniquely identify the removable lens as a particular one of multiple lens types.

A removable lens assembly may include a physical characteristic that differs from that of other lens types of the multiple lens types and that is measurable by the lens recognition sensor to uniquely identify the removable lens assembly as a particular one of multiple lens types.

A removable lens assembly may include a lens type identification means that is measurable by the lens recognition sensor to uniquely identify the removable lens assembly as a particular one of multiple lens types.

The multiple lens types may include wide angle and telephoto lens types.

A mobile device case is provided in accordance with certain embodiments for coupling around a mobile device that includes a miniature camera module. A case housing is configured to securely couple around at least a portion of the periphery of the camera-enabled mobile device.

A case processor and electrical circuitry are embedded within the case and configured to detect the presence of the removable lens coupled stably in optical alignment with the miniature camera module. The case is configured to define therein a lens attachment aperture shaped both to permit light from an object to be captured as a digital image to travel along the optical path of the miniature camera module to a built-in image sensor of the miniature camera module of the mobile device. The lens attachment aperture defined in the case is also configured to facilitate stable coupling of a removable lens in optical alignment with the miniature camera module. A case shutter button mechanism is configured for actuating the miniature camera module of the mobile camera system. A lens recognition sensor is coupled to the case processor and electrical circuitry to identify the removable lens assembly as being configured in accordance with a particular one of multiple lens types.

A removable lens assembly may be configured to couple stably in alignment along the optical path of the miniature camera module. The removable lens assembly and case may be configured in accordance with any of several embodiment described herein that are configured for recognition of lens type.

An auxiliary optical assembly is also provided for a mobile device that includes a miniature camera module. A removable lens assembly of the auxiliary optical assembly includes a lens holder, a lens coupled to the lens holder, and a coupling interface. A lens attachment interface of the auxiliary optical assembly is configured for coupling to the mobile device, and is configured in accordance with the coupling interface of the removable lens assembly to stably couple and align the removable lens along the optical path of the miniature camera module.

The lens attachment interface may be configured to stably couple coaxially with a lens attachment aperture of a mobile device case that is coupled around the mobile device.

The lens attachment interface may comprise a mobile device case that is coupled around the mobile device. In accordance with this embodiment, the case may include one or more of the case features described herein. For example, the case may include a lens recognition sensor configured to automatically recognize a specific one of multiple removable lenses each having different optical properties. The case may include a processor and electrical circuitry that is programmable by a software application in accordance with a lens recognition process, selectable pre-capture settings or post-capture image editing or combinations thereof. The case may include a case shutter button for actuating the miniature camera module of the mobile camera system, comprising a half-press feature for adjusting precapture settings and a full-press feature for capturing an image.

The case may have an ergonomic case design that balances auxiliary lens weight and other case components for single-handed precapture adjustment and image capture. A single finger may be used with a capacitive slider feature to scroll through precapture menu items, select certain items, adjust certain precapture settings and/or capture an image.

The lens attachment interface may be configured for adhesive coupling to the mobile device.

The coupling interface of the removable lens assembly may have a micro-bayonet design for rotatable coupling with the lens attachment interface.

Another mobile camera system is provided herein in accordance with certain embodiments. A camera-enabled, mobile device that includes a miniature camera module embedded within the mobile device may include a built-in lens and an image sensor for capturing digital images. A mobile device processor may be configured for processing the digital images. A mobile device display is configured for viewing the digital images. A case is configured to be coupled around the camera-enabled mobile device. A lens attachment interface is embedded within or integral with the case, or the case is configured in accordance with a lens attachment interface that is coupled directly to the mobile device. A removable lens is configured to be coupled to the lens attachment interface and stably aligned along the optical path of the miniature camera module.

A case processor and electrical circuitry are embedded within the case that are configured to detect the presence of the removable lens that is coupled to the lens attachment interface. A case shutter button mechanism is configured for actuating the miniature camera module of the mobile camera system, and includes a half-press feature for adjusting precapture settings and a full-press feature for triggering capture of an image.

The case shutter button mechanism may include a case shutter button and a detent mechanism coupled between the case shutter button and an image capture button of the mobile device. The detent mechanism may be configured to facilitate half-press motion of the case shutter button when finger pressed by a camera user and to inhibit full-press motion of the case shutter button during adjustment of one or more precapture settings by the camera user prior to image capture.

Half-press motion may include depressing and latching the image capture button of the mobile device. Half-press motion may include triggering a precapture settings adjustment process. The precapture setting adjustment process may include exposure duration adjustment.

The case may include one or more auxiliary light sources, and the precapture setting adjustment process may include selecting an illumination condition for the one or more auxiliary light sources. The selecting of the illumination condition may include adjusting lighting intensity by programming the mobile device to trigger illumination of an object during image capture with a selected subset of the one or more auxiliary light sources. The selecting of the illumination condition may include adjusting lighting direction by programming the mobile device to trigger illumination of an object during image capture with a selected subset of the one or more auxiliary light sources.

The mobile device may include one or more flash light sources. The precapture setting adjustment process may include selecting an illumination condition for the one or more flash light sources.

Full-press motion may include releasing the image capture button of the mobile device and triggering an image capture process.

The detent mechanism may include a detent spring and a detent spring holder.

The detent mechanism may include a friction slider and spring-bearing mechanism attachment button configured for slidable coupling with the friction slider upon actuation of the case shutter button.

The detent mechanism may include a spring mechanism and a multiple position snap dome. The spring mechanism may include a wave spring disposed between the case shutter button and the snap dome. The spring mechanism may include a mechanical spring disposed between the case shutter button and the snap dome. The spring mechanism may include a snap dome shutter button, a first spring disposed between the case shutter button and the snap dome shutter button, and a second spring disposed between the snap dome shutter button and the snap dome. The spring mechanism may include an elastomeric dome switch disposed between inner and outer subsections of the mobile phone case. The spring mechanism may include an elastomeric dome switch disposed between the case shutter button and the snap dome.

The spring mechanism may include a double elastomeric switch.

Another mobile device case is provided herein for coupling around a mobile device that includes a miniature camera module. The case housing is configured to securely couple around at least a portion of the periphery of the camera-enabled mobile device. A case processor and electrical circuitry embedded within the case are configured to detect the presence of the removable lens coupled stably in optical alignment with the miniature camera module. The case is configured to define therein a lens attachment aperture shaped both to permit light from an object to be captured as a digital image to travel along the optical path of the miniature camera module to a built-in image sensor of the miniature camera module of the mobile device, and to facilitate stable coupling of a removable lens in optical alignment with the miniature camera module. A case shutter button mechanism is configured for actuating the miniature camera module of the mobile camera system, and includes a half-press feature for adjusting precapture settings and a full-press feature for triggering capture of an image.

The case shutter mechanism may be configured in accordance with any of the embodiments described herein.

The lens attachment aperture may be shaped to stably couple a lens attachment interface with the case.

The lens attachment aperture may be shaped to integrally include a lens attachment interface.

A lens recognition sensor may be configured to automatically recognize a specific one of multiple removable lenses each having different optical properties.

A software application may be configured for programming the case processor in accordance with selectable pre-capture settings and/or post-capture image editing or both.

A lens attachment interface may be configured for coupling an auxiliary lens in stable alignment along the optical path of the miniature camera module of the mobile camera system. The auxiliary lens may include a micro-bayonet design for rotatable coupling with the lens attachment interface.

The case may have an ergonomic design that balances auxiliary lens weight with the case processor and electrical circuitry at approximately a grip location for singled-handed precapture adjustment and image capture.

Another mobile camera system is provided herein in accordance with certain embodiments. The system includes a camera-enabled, mobile device; including a miniature camera module embedded within the mobile device that has a built-in lens and an image sensor for capturing digital images. A mobile device processor is configured for processing the digital images, and a mobile device display is configured for viewing the digital images. A case is coupled around the camera-enabled mobile device. A removable lens assembly includes a lens holder, a lens coupled to the lens holder, and a coupling interface. A lens attachment interface is embedded within or integral with the case or coupled directly to the mobile device, and is configured in accordance with the coupling interface of the removable lens assembly to stably couple and align the removable lens along the optical path of the miniature camera module. A case processor and electrical circuitry are embedded within the case and are configured to detect the presence of the removable lens that is coupled to the lens attachment interface. A case shutter button mechanism is configured for actuating the miniature camera module of the mobile camera system.

The coupling interface of the removable lens assembly may include a bayonet tab. The lens attachment interface may include a detent portion that at least partially defines a lens attachment cavity that is shaped in accordance with the bayonet tab of the removable lens assembly to stably couple and align the removable lens along the optical path of the miniature camera module of the mobile device.

The bayonet tab may have an oblong shape. The lens attachment interface may include a detent that defines an oblong cavity having a short dimension that is smaller than the long dimension of the bayonet tab such that the oblong cavity is penetrable by the bayonet tab at a first relative orientation while the bayonet tab stably couples within the oblong cavity in a second relative orientation.

The bayonet tab may have a rectangular shape.

The lens attachment interface may define a circular cavity in a first plane while the detent overlaps the circular cavity in a second plane that is spaced-apart from the first plane along the optical path.

The lens attachment cavity may include a lens attachment portion and a flash portion adjacent to a lens attachment portion to permit light from a mobile device flash to illuminate an object to be imaged. The lens attachment portion of the lens attachment cavity may be defined in a first plane that is spaced further from an image sensor of the miniature camera module than a second plane within which the flash portion of the lens attachment cavity is defined.

The case may define a case cavity around the optical path of the miniature camera module that accommodates the coupling of the removable lens at the lens attachment interface. The case cavity may also be shaped, at a flash portion adjacent to a lens attachment portion, to permit light from a mobile device flash to illuminate an object to be imaged.

The lens holder of the removable lens assembly may define a cavity around the optical path of the miniature camera module to permit light from an object being imaged to reach an image sensor of the miniature camera module. The coupling interface of the removable lens assembly also defines a cavity around the optical path of the miniature camera module to permit light from an object being imaged to reach an image sensor of the miniature camera module. The cavities of the coupling interface and lens holder are approximately coaxial with the optical paths of the miniature camera module and removable lens.

Another mobile device case is provided in accordance with certain embodiments for coupling around a mobile device that includes a miniature camera module. A case housing is configured to securely couple around at least a portion of the periphery of the camera-enabled mobile device. A case processor and electrical circuitry embedded within the case that are configured to detect the presence of the removable lens coupled stably in optical alignment with the miniature camera module. The case is configured to define therein a lens attachment aperture shaped both to permit light from an object to be captured as a digital image to travel along the optical path of the miniature camera module to a built-in image sensor of the miniature camera module of the mobile device, and to facilitate stable coupling of a removable lens in optical alignment with the miniature camera module. A case shutter button mechanism is configured for actuating the miniature camera module of the mobile camera system. A lens attachment interface is embedded within or integral with the case or is coupled directly to the mobile device, and is configured in accordance with the lens attachment aperture and a coupling interface of a removable lens assembly to stably couple and align the removable lens assembly along the optical path of the miniature camera module. The coupling interface of the removable lens assembly and the lens attachment interface may be configured for bayonet coupling or otherwise in accordance with any of several embodiments described herein.

Another auxiliary optical assembly is provided herein for a mobile device that includes a miniature camera module. A removable lens assembly of the auxiliary optical assembly includes a lens holder, a lens coupled to the lens holder, and a coupling interface. A lens attachment interface of the auxiliary optical assembly is configured in accordance with the mobile device to stably couple to the mobile device, and in accordance with the coupling interface of the removable lens assembly to stably couple and align the removable lens along the optical path of the miniature camera module.

The lens attachment interface may be configured for adhesive coupling to the mobile device.

The lens attachment interface may be shaped in accordance with a shape of the mobile device.

The lens attachment interface may also be sized in accordance with a size of the mobile device.

The lens attachment interface may define an aperture that is coaxially configured in accordance with an optical path of a miniature camera module of the mobile device.

The coupling interface of the removable lens assembly may include a bayonet tab. The lens attachment interface may include a detent portion that at least partially defines a lens attachment cavity that is shaped in accordance with the bayonet tab of the removable lens assembly to stably couple and align the removable lens along the optical path of the miniature camera module of the mobile device.

The bayonet tab may be configured in with an oblong and/or curved shape in accordance with any of several removable lens embodiments and lens attachment interface embodiments described herein. A case may be configured in accordance with the coupling interfaces of the removable lens and lens attachment interface as described in various embodiments herein.

Another mobile camera system is provided in accordance with certain embodiments. A camera-enabled, mobile device of the system includes a miniature camera module including a built-in lens and an image sensor for capturing digital images. A mobile device processor is configured for processing the digital images, and a mobile device display is for viewing the digital images. A case housing is coupled around the camera-enabled mobile device. The case has a center of gravity approximately at an image capture grip location of the case housing. A lens attachment interface is embedded within or integral with the case, or attached directly to the mobile device.

A removable lens is coupled to the lens attachment interface and stably aligned along the optical path of the miniature camera module. A case shutter button mechanism is configured for actuating the miniature camera module of the mobile camera system.

The case shutter button mechanism may be configured for user actuation of a half-press feature for calling a precapture settings menu and also for user actuation of a full-press feature for triggering capture of an image. The case shutter button mechanism may be configured for one-handed user actuation of both the precapture settings menu and the triggering capture of an image. The case shutter mechanism may be configured to display the precapture settings menu on a touch screen interface of the mobile device.

The case shutter button mechanism may include a capacitive touch slider coupled with the case and configured for user actuation of a precapture settings menu and for triggering capture of an image. The case shutter button mechanism may be configured for one-handed user actuation of both the precapture settings menu and triggering capture of an image. The case shutter mechanism may be configured to receive one or two finger taps for triggering one or the other of the user actuation of the precapture settings menu and triggering capture of an image. The case shutter mechanism may be configured to receive one or both of finger or thumb slide inputs for adjusting one or more values within the precapture settings menu.

The capacitive touch slider may include an elongated touch plate disposed at a grip end of the mobile phone case at an acute angle to a plane of the mobile phone case. The capacitive touch slider may include an elongated touch plate disposed at a grip end of the mobile phone case opposite the miniature camera module and the removable lens.

The case housing may have coupled therein a case battery, a case processor and electrical circuit components at a grip end of the case housing. The case processor and electrical circuit components may be configured to detect the presence of the removable lens that is coupled to the lens attachment interface. The case processor and electrical circuit components may be configured to identify the removable lens as a specific lens type. The electrical circuit components may include a Bluetooth radio.

The case housing may define a removable lens recess configured to accommodate lens integration along the optical path of the miniature camera module.

The lens attachment interface may be configured for coupling a removable lens in stable alignment along the optical path of the miniature camera module of the mobile camera system including a micro-bayonet design for rotatable coupling.

A case processor may be embedded within the case housing and a software application may be configured for programming the case processor in accordance with selectable pre-capture settings and/or post-capture image editing or both.

An ergonomic case design may be configured to balance auxiliary lens weight and other case components at approximately a grip location for singled-handed precapture adjustment and image capture. The case housing may define a removable lens recess that is configured to both accommodate lens integration along the optical path of the miniature camera module and balance at least some auxiliary lens weight in a second dimension.

Another mobile device case is provided in accordance with certain embodiments for coupling around a mobile device that includes a miniature camera module. A case housing is configured to securely couple around at least a portion of the periphery of the camera-enabled mobile device. A case processor and electrical circuitry embedded within the case are configured to detect the presence of the removable lens coupled stably in optical alignment with the miniature camera module. The case is configured to define therein a lens attachment aperture shaped both to permit light from an object to be captured as a digital image to travel along the optical path of the miniature camera module to a built-in image sensor of the miniature camera module of the mobile device, and to facilitate stable coupling of a removable lens in optical alignment with the miniature camera module. A case shutter button mechanism is configured for actuating the miniature camera module of the mobile camera system.

The lens attachment aperture may be shaped to stably couple a lens attachment interface with the case.

The lens attachment aperture may be shaped to integrally include a lens attachment interface.

The mobile device case may be further configured in accordance with any of several embodiments described herein.

Several embodiments of mobile camera devices, mobile camera device cases, lens attachment interfaces for mobile camera devices and/or mobile camera device cases, half-press/full-press shutter buttons for mobile camera devices and functional mobile camera device cases, and software applications, accessories and other features are described below herein with reference to FIGS. 1-42 of the drawings. Various features are illustrated in the several example embodiments that are illustrated in multiple subsets of the drawings.

Several embodiments of mobile camera devices, mobile camera device cases, lens attachment interfaces for mobile camera devices and/or mobile camera device cases, half-press/full-press shutter buttons for mobile camera devices and functional mobile camera device cases, and software applications, accessories and other features are described below herein with reference to FIGS. 1-42 of the drawings. Various features are illustrated in the several example embodiments that are illustrated in multiple subsets of the drawings.

FIGS. 1-10 particularly illustrate examples of lens detection and recognition methods and devices including non-contact and direct electrical contact techniques. That is, example embodiments are described below and illustrated in the drawings whereby specific lens types, of multiple selectably removable mobile lens types each having different optical properties, are recognizable and discernible automatically by electronics and software embedded within the mobile camera device case. In some embodiments, the lenses, lens holders and/or one or more features of the lens attachment interfaces of the lenses and mobile device cases are configured to facilitate lens recognition. Example techniques involve the use of one or more Hall effect sensors, inductive or capacitive sensors, and/or direct electrical connections.

Figures 1, 2A:
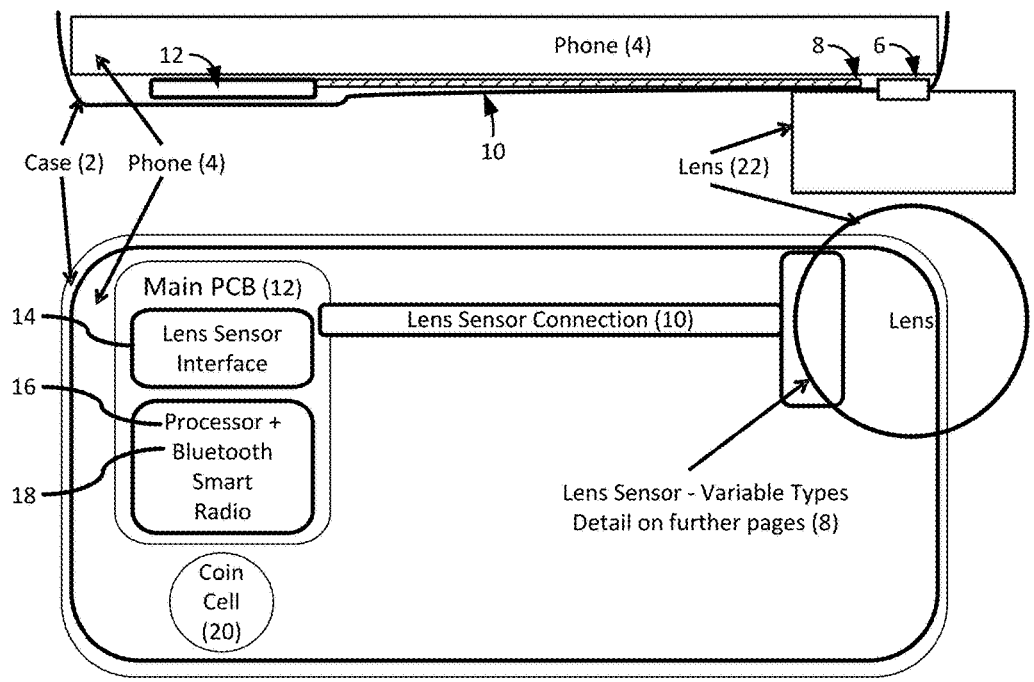

FIG. 1 schematically illustrates a mobile camera system including a case 2 coupled around a camera-enabled mobile phone 4 or other embedded mobile camera device 4. A lens attachment interface 6 is coupled to, removably attached to, embedded within or formed integrally with the case 2.

A lens recognition sensor (8) is signal connected, electrically by lens sensor connection 10, and/or wirelessly by Bluetooth, RF and/or IR or other wireless technique, to a main printed circuit board (PCB) 12, which includes a lens sensor interface 14 and a processor 16. The main PCB 12 optionally includes a Bluetooth smart radio 18. The example case 2 illustrated at FIG. 1 includes a battery 20 which may be any of several types such as a coin cell as shown.

A lens 22 is shown in FIG. 1 coupled along the optical path of a miniature camera module (not shown in FIG. 1) that is an installed component of the phone 4. The lens 22 is coupled to the case 2 and phone 4 at the lens attachment interface 6 in stable alignment with a lens and image sensor of the embedded miniature camera module of the mobile camera system.

Lens Detection and Recognition

Lens recognition can be thought of as involving both lens detection and lens type identification.

Lens detection permits that device to know that a lens that has been specially-designed to couple with a case equipped with lens recognition components or a standardized lens has been attached and not a foreign object or a lens that uses a non-conforming interface.

Figure 2B:
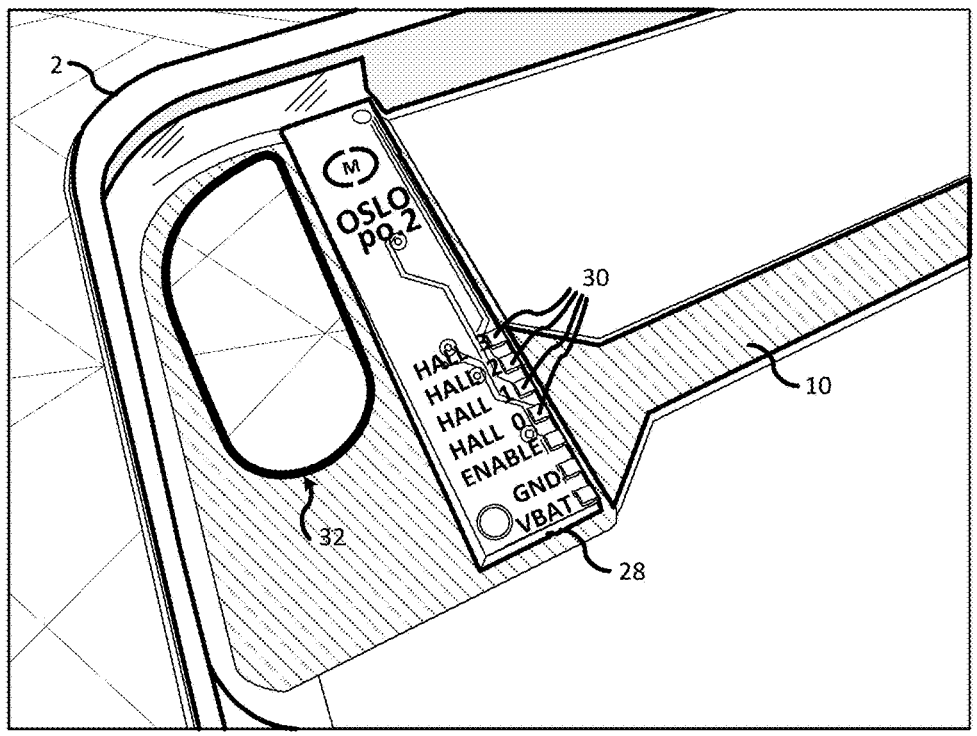
Figure 2C:
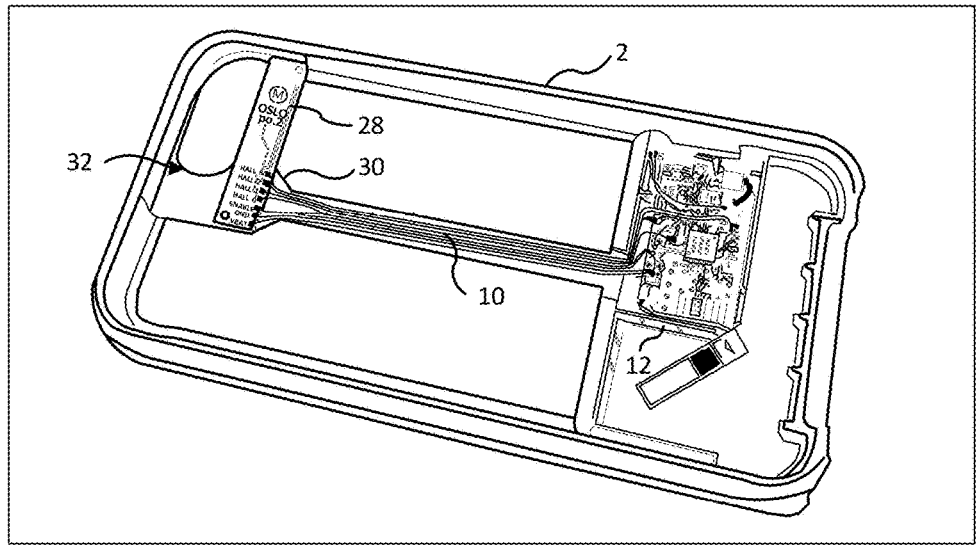

FIGS. 2A-2C illustrate a magnetic field sensing lens recognition technique. A precisely placed magnet 24 or subset of magnets 24 or array of magnets 24 are built-into the lens 22 illustrated at FIG. 2A, or lens holder or an attachment to the lens 22 or lens holder. The lens sensor 28 in this embodiment, which is built-into the mobile camera device case 2 (see FIG. 1) along with a lens sensor connection 10 to a main PCB 12, includes a Hall-effect sensor 30 or array of Hall-effect sensors 30. In the example of FIG. 2A, there are four Hall-effect sensors 30 that each either detect magnetic field or don't depending on whether the lens 22 includes a magnet at the location associated with the particular Hall sensor 30 of the array of sensors 30.

If there are no magnets, the Hall sensors will measure 0000. If there are four magnets, the Hall sensors will measure 1111. If the specific lens 22 includes one of four magnets, the Hall sensors will measure 1000, 0100, 0010 or 0001 depending on which of the four locations that the magnet is placed. If the lens 22 has two of four magnets, the Hall sensors will measure 1100, 1010, 1001, 0110, 0101 or 0011 depending on which two of the four locations that the magnets are disposed at. If there are three magnets, the Hall sensors will measure 1110, 1101, 1011, or 0111 depending which of the four locations does not have a magnet placed there. In all, 16 different lens types can be identified using the four Hall sensors and the binary method described and illustrated in this example. Note that the sensors can also measure the opposite polarity, for example with one magnet the measurement could be 0111, 1011, 1101, 1110. Multiple lenses containing a unique combination of magnets can be detected (presence) and differentiated (uniquely identified).

FIGS. 2B-2C alternatively illustrate a case 2 including a Hall sensor interface 28 including four Hall sensors 30, and a lens sensor connection 10 to a main PCB 12. A lens attachment interface cavity 32 is defined in the case 2 of each of FIGS. 2B-2C. The lens attachment interface cavity 32 is configured in shape and location to permit stable coupling of a lens attachment interface 6 (not shown in FIGS. 2B-2C, but see FIGS. 10-11 and 13-14) to the case 2 so that a lens 22 may be coupled in stable alignment with the miniature camera module embedded in the mobile camera device, e.g., an iPhone, Android or Samsung phone or other smart phone, embedded device or camera device.

FIG. 3A illustrates an example of a device that uses an inductive sensing lens recognition technique. The technique involves creating eddy currents in the metal lens holder body or attachment to the lens holder and measuring the strength of the induced magnetic field using a tuned coil lens sensor 38 in the connected case (not shown in FIG. 3A, but see FIGS. 1, 2B-2C and 10). The tuned coil sensor 38 is connected by a sensor connection 40 to a main PCB 42. An example tuned coil sensor 38 includes: 18 turns, 2 layers, 0.25 mm sp, 1 oz. Cu, 7 mil tr/sp, and has a fixed target distance of ~2 mm, and a coil that is 100% covered but offset 8 mm, and is a 14 mm PCB coil at ~8 µH. An example sensor connection 40 includes long coil traces on top and solid ground plane on bottom. An example main PCB 42 includes 4 layer PCB, coil traces on top and solid ground on layer 2. Each of multiple lens types will produce a unique induced magnetic field magnitude depending on the properties of the lens holder.

In the example illustrated at FIG. 3A, three lens types are shown as FIGS. 3A(i)-3A(iii) that each have a same amount of stainless steel, but different amounts of anodized aluminum. In this example, the density of anodized aluminum is the same in each of lens holders 44, 46 and 48, illustrated at FIGS. 3A(i)-3A(iii), respectively, while lens holder 46 includes twice as much anodized aluminum as lens holder 44 and lens holder 48 includes three times as much anodized aluminum as lens holder 44, because lens holder 44 has a height of 10 mm, lens holder 46 20 mm, and lens holder 48 30 mm.

Figure 3B:
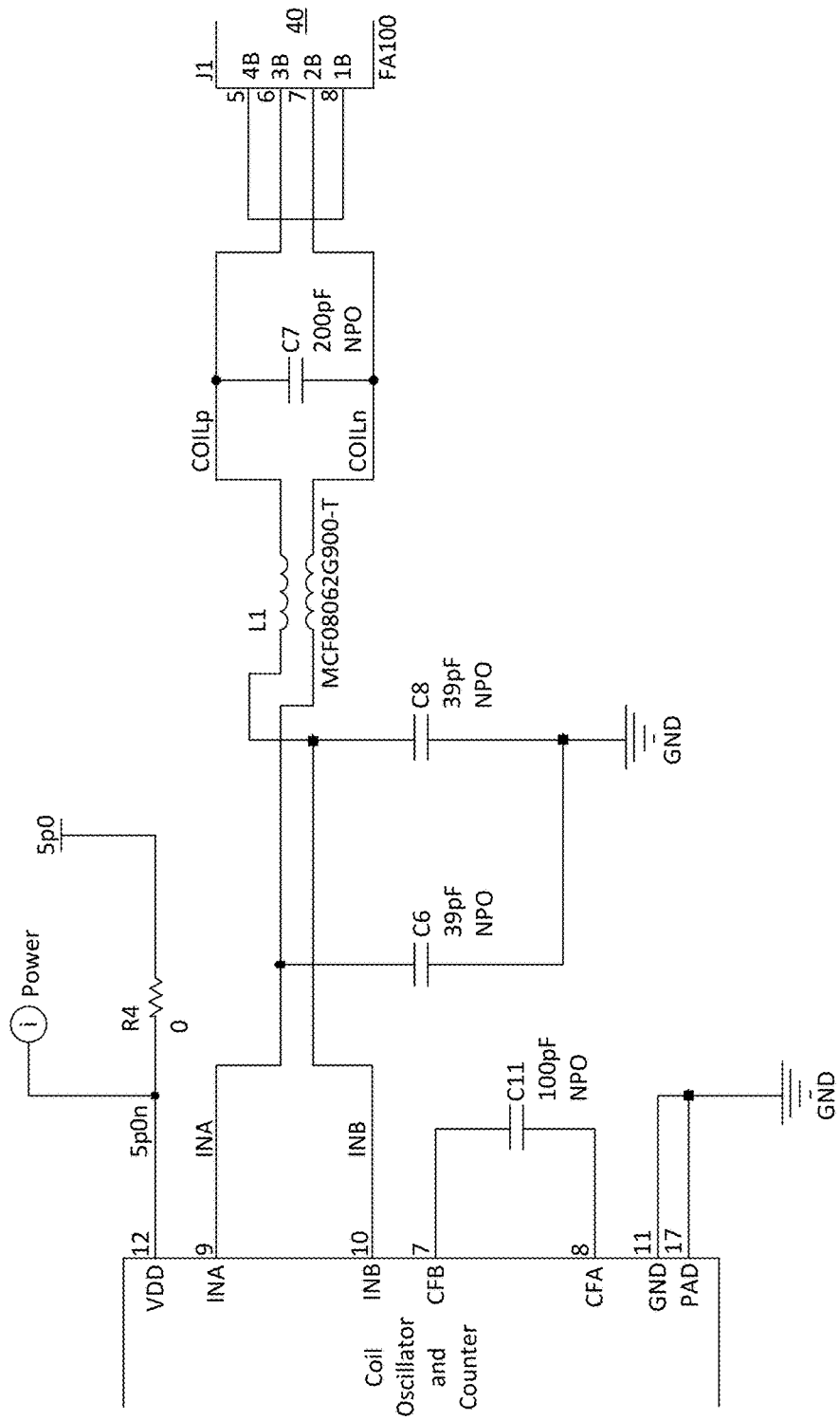

FIG. 3B illustrates a specific electrical circuit example of the inductive sensing lens recognition technique of the embodiment illustrated at FIG. 3A.

Figure 4:
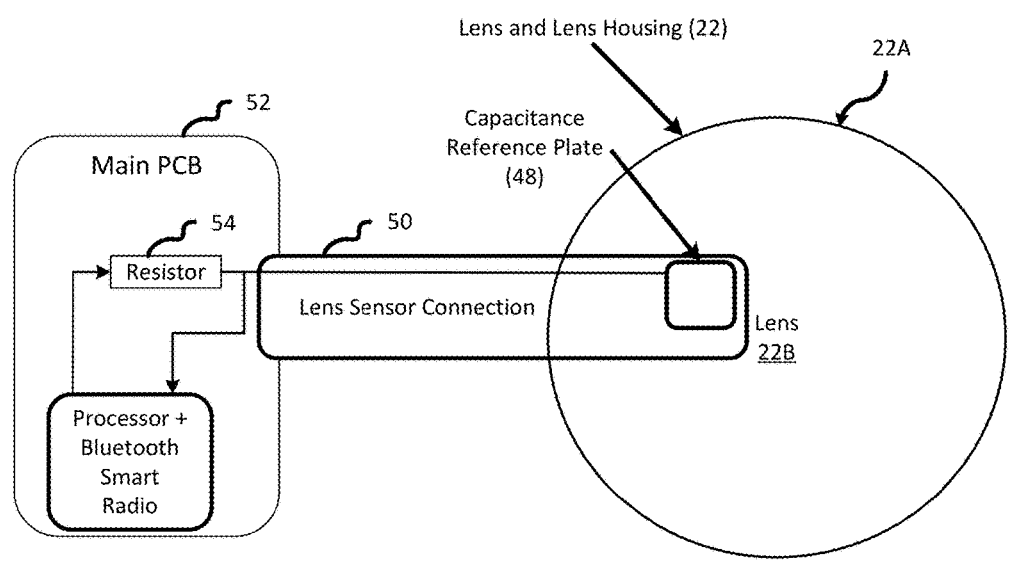

FIG. 4 illustrates an example of a device that uses a capacitive sensing lens recognition technique. A capacitive sensing technique is provided in this example embodiment by using the lens body 22A as a capacitor plate and measuring the RC decay time and frequency response when driven by the connected case. A capacitance reference plate 48 is connected by a lens sensor connection 50 to a main PCB 52. The plate 48, connection 50 and PCB 52 are embedded within a case ((not shown in FIG. 4, but see FIGS. 1, 2B-2C and 10). When a lens 22 is attached to the case that includes a lens housing 22A and lens optic 22B, the lens housing 22A and lens optic 22 function as a capacitor plate 22A and dielectric 22B, respectively, wherein the capacitance reference plate 48 completes the capacitive circuit element. A RC circuit includes a resistor 54. When power is applied to the RC circuit, the charge and decay times depend on the capacitance of the lens capacitor formed by the lens 22 and reference plate 48 which differs depending on which lens type is attached, thereby identifying the attached lens type.

In the example of FIG. 4, when a lens and lens housing (22) are attached to a mounting plate 48, the capacitance formed by the lens housing 22A and capacitance reference plate 48 changes such that the current flowing through the resistor 54 on the main PCB 52 takes a different amount of time to charge the change in capacitance. Multiple lenses representing different capacitance values can be detected (presence) and differentiated (uniquely identified) based on the time of charge and decay.

Figure 5A:
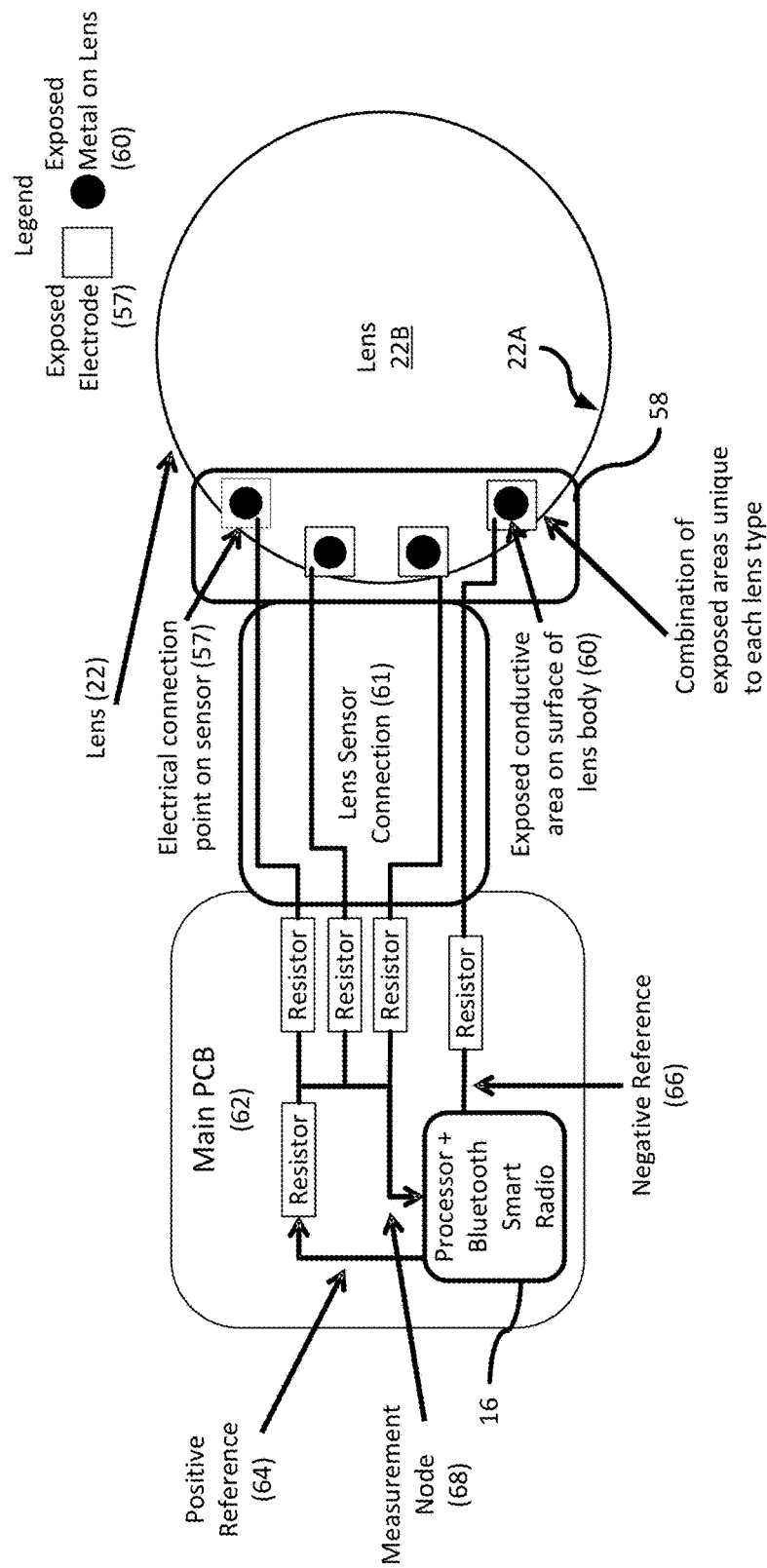

FIG. 5A illustrates an example of a device that uses electrical connections between exposed electrodes 57 on a lens sensor interface 58 and exposed electrodes 60 on a lens 22 or lens holder 22A or attachment to a lens holder 22A. A direct electrical connection technique is provided in this embodiment that utilizes the conductive properties of the lens body 22A to complete an electrical circuit to be measured by the connected case. In this example wherein the lens sensor interface 58 includes four electrodes 57, eight (8) unique combinations of connected and non-connected electrodes 57 permit discernment by the processor 16 of the main PCB 62 of eight different lens types, as follows:

If there are no connections between lens sensor interface electrodes 57 and lens holder electrodes 60, the PCB 62 will measure a specific electrical quantity associated with the 000 configuration, where "0" represent no connection and "1" represents a connection. If there are three connections, the PCB 62 will measure a specific electrical quantity associated with the 111 configuration. An electrical circuit example is illustrated within the main PCB 62 in FIG. 5A, including a configuration of resistors and a defined positive reference 64, negative reference 66, and measurement node 68. Each type of lens 22 has an electrode 60 that contacts the negative reference 66. If the specific lens 22 includes an electrode 60 that contacts one of the three electrodes 57 that are not the negative reference 66 when the lens 22 is attached to the case (not shown in FIG. 3A, but see FIGS. 1, 2B-2C and 10), the PCB 62 will measure an electrical quantity unique to the 100, 010, or 001 contact configurations depending on which of the three locations that the contact is made. If the lens 22 has two contacts of three the PCB 62 will measure an unique electrical quantity corresponding to which of the 110, 101, or 011 contact configurations where the two contacts are made. If there are three contacts made when the lens 22 is coupled to the case, the PCB 62 will measure an electrical quantity that depends on which of the 111 contact configurations is made. In all, 8 different lens types can be identified using the three contacts 57 that read a unique configuration of up to four electrodes 60 for each lens type, and the binary adder method described and illustrated in this example.

FIG. 5A illustrates an analog method of identification where the voltage at the measurement node is a binary sum of each connection point present at the lens. In certain embodiments, the analog voltage is fed to an analog to digital converter and quantified to determine the unique lens type.

Figure 5B:
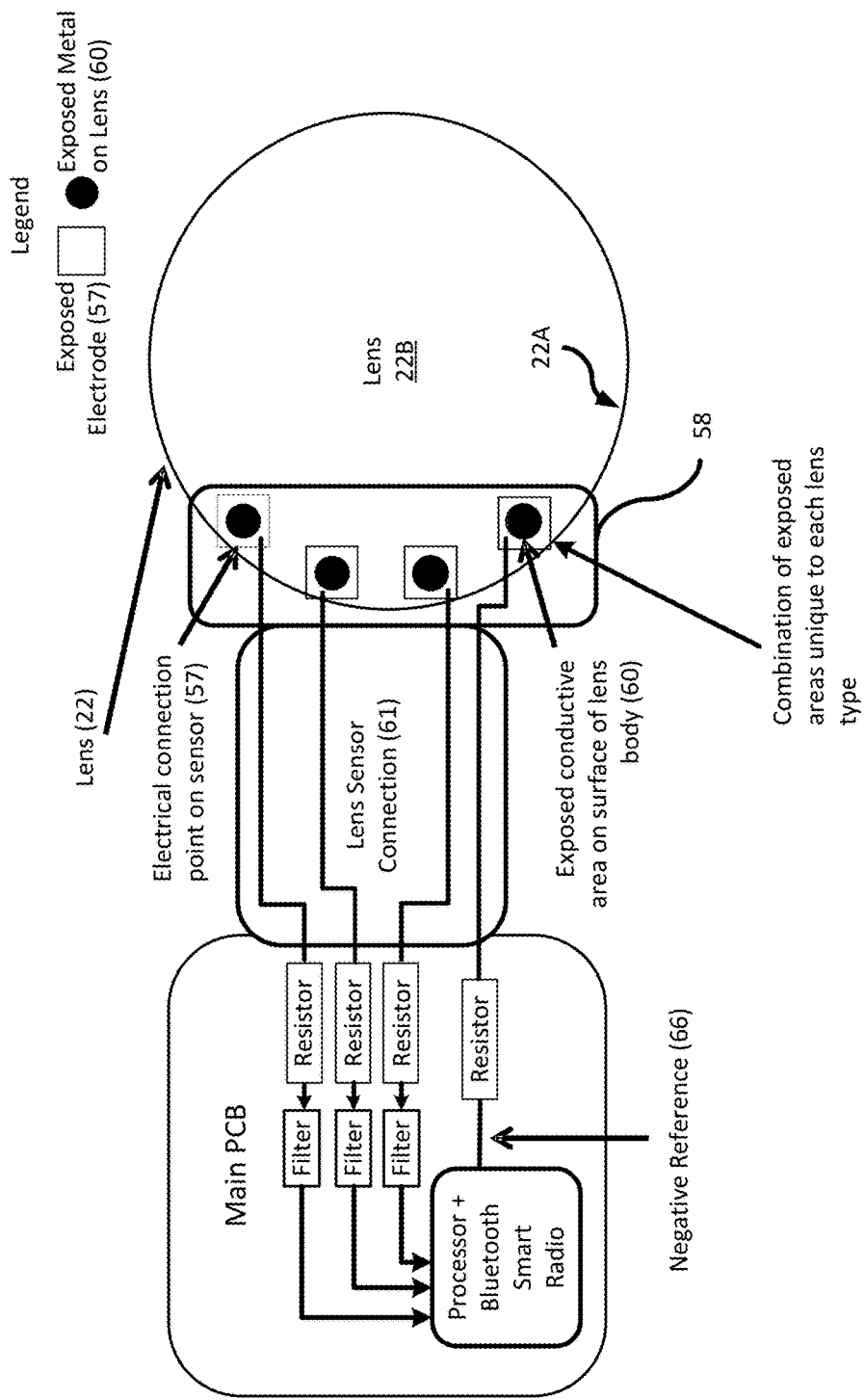

FIG. 5B schematically illustrates a digital method of identification where each lens connection point represents a '1' or '0'. The presence or absence of connection points at the lens forms a unique digital binary code to determine the unique lens type.

The filter block in FIG. 5B includes a combination of resistors and capacitors to reduce noise that may be coupled to the system from various sources.

In the example of FIG. 5A, an electrical connection is made between exposed conductive points on the lens body and the sensor. Current then flows from the positive reference through each sensor connection point back to the negative reference. The created voltage at the measurement node will be unique to each lens type. Multiple lenses having a different number of connection points can be detected (presence) and differentiated (uniquely identified) based on the voltage at the measurement node.

In the example of FIG. 5B, an electrical connection is made between exposed conductive points on the lens body and the sensor. Current then flows from the microprocessor pin through each sensor connection point back to the negative reference. The created voltage at each microprocessor pin is indicative of a connection point on the lens. Multiple lenses having a different number of connection points can be detected (presence) and differentiated (uniquely identified) based on the binary combination of connections.

Figure 6:
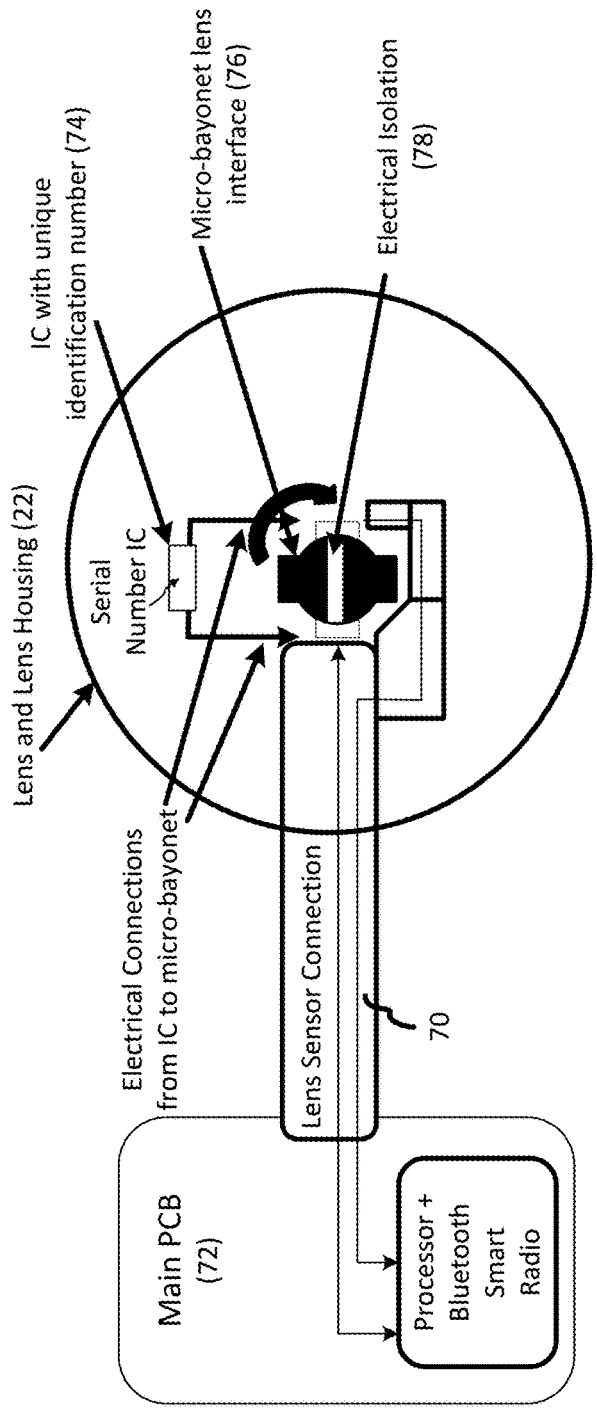

FIG. 6 illustrates an example of embedded components, including a lens sensor connection 70 and main PCB 72 of a mobile camera device case that reads the lens type from a unique identifier provided by an integrated circuit 74 or other readable technique. In this embodiment, a direct electrical connection provides a lens recognition technique by using an integrated circuit 74 in or attached to the lens 22 that contains an identification number that is read electrically by the PCB 72 of a connected case. Each lens type has a different unique identifier that is readable by the PCB 72. A circuit may be formed when a lens 22 is coupled into stable alignment with the miniature camera module of the mobile camera device at a lens attachment interface that is coupled with or integral with a mobile device case that is itself coupled around the mobile device. In this embodiment, a micro-bayonet lens interface 76 is illustrated that includes an electrical isolation portion 78, such that a IC read circuit is completed when the lens 22 is stably coupled to a lens attachment interface (not shown in FIG. 6, but see FIGS. 10-11 and 13-14) upon rotation of the lens and attachment between the micro-bayonet interface 76 of the lens 22 and the lens attachment interface that is coupled to or integral with the mobile device case (not shown in FIG. 6, but see FIGS. 1, 2B-2C and 10).

In the example of FIG. 6, an integrated circuit 74 containing a unique ID is embedded in each lens. An electrical connection is established via the micro-bayonet interface 76 allowing the main PCB 72 to read the unique value. The unique ID read from the lens 22 allows a lens 22 to be detected (presence) and differentiated (uniquely identified) based on the ID value.

Figure 7:
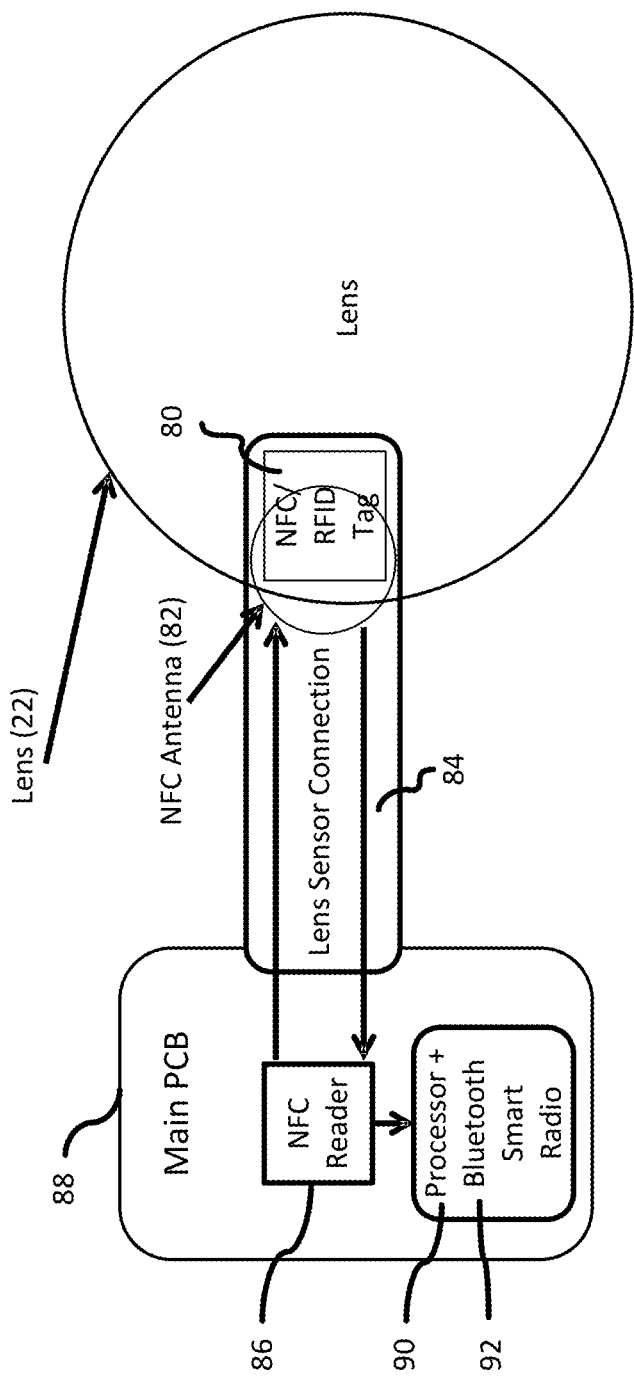

FIG. 7 illustrates another lens recognition technique that utilizes Near Field Communication (NFC) by using a field-powered radio frequency (RFID) tag (80) in or attached to the lens 22 that contains an identification number that is read by the connected case or the phone NFC radio and passed to the processor. A NFC Antenna 82 reads the RFID tag 80 and is connected by lens sensor connection 84 to a NFC reader 86 of a main PCB 88, that also includes a processor 90 and Bluetooth smart radio 92, that are built-into a mobile device case (not shown in FIG. 6, but see FIGS. 1 and 2B-2C) that is configured such that an auxiliary lens may be coupled thereto in stable alignment with a miniature camera module of a mobile device.

In the example of FIG. 7, near field communication (NFC or RFID) tag 80 containing a unique ID is embedded in each lens 22. An NFC/RFID tag reader 86 generates a field to power the tag 80 allowing the main PCB 88 to read the unique value stored in the NFC tag 80. The unique ID read from the lens tag allows a lens 22 to be detected (presence) and differentiated (uniquely identified) based on the ID value.

Figure 8:
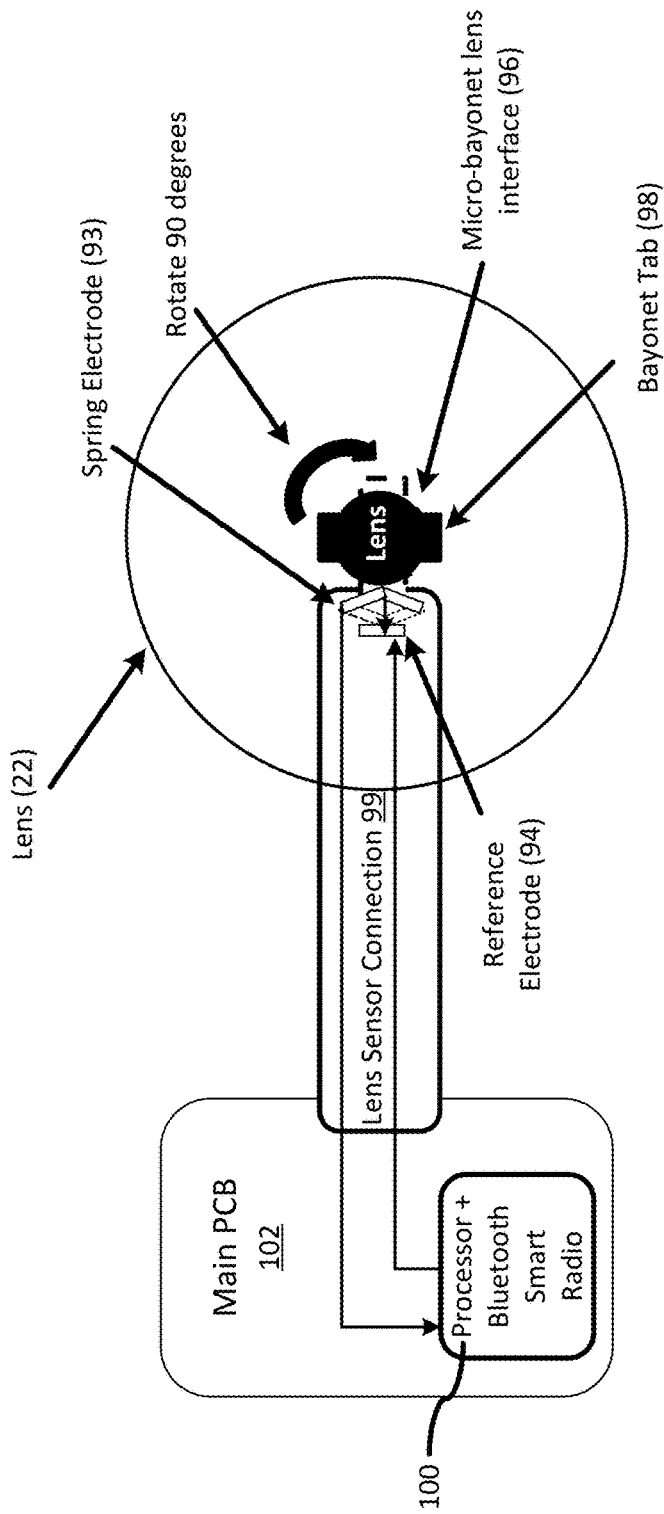

FIG. 8 schematically illustrates a technique for detecting whether conforming or standardized lens has been coupled to a mobile device case and aligned with an optical path of an embedded camera module. In the example illustrated at FIG. 8, an electrical spring connection is made between a spring electrode 93 and a reference electrode 94. When a conforming or standardized lens 22, e.g., including micro-bayonet 96 or other such lens interface that includes a tab 98 is coupled to a lens sensor interface of a mobile device case, the tab 98 serves to compress a spring 93 that makes contact with a reference electrode 94 and completes an electrical circuit to be detected by a processor 100 of a PCB 102 embedded within a connected case. In the example of FIG. 8, when the micro-bayonet 96 is rotated 90° into place, the bayonet tab 98 pushes the spring electrode 93 into its compressed position. The spring 93 when compressed completes a circuit that allows current to flow from the reference electrode 94. When the micro-bayonet 98 is unrotated and removed the spring 93 relaxes and the circuit is broken. When the current flows in the circuit, the lens 22 is detected (presence).

Figure 9:
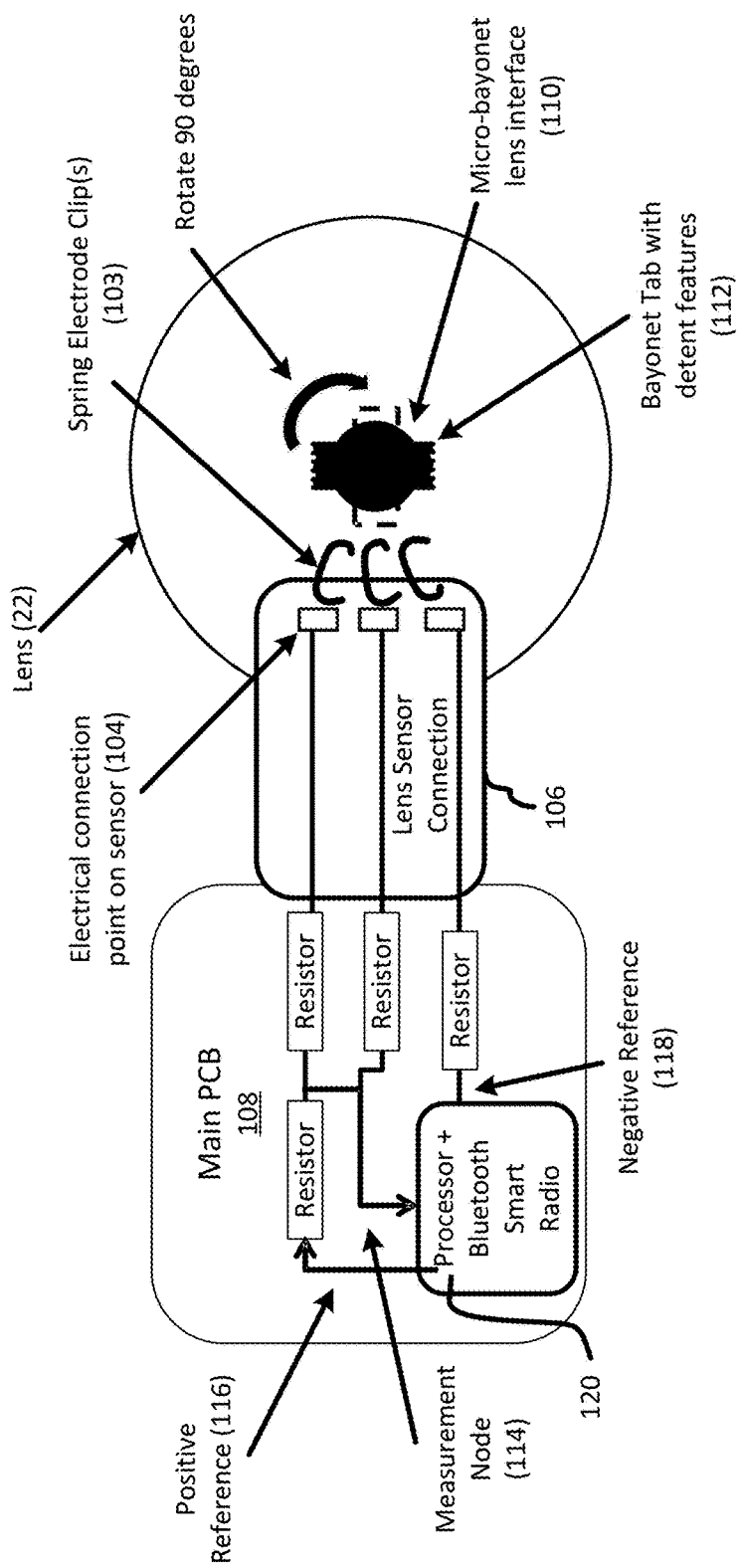

FIG. 9 schematically illustrates a technique for detecting whether conforming or standardized lens has been coupled to a mobile device case and aligned with an optical path of an embedded camera module, and identifying which of multiple lens types has been attached. The lens recognition technique that is illustrated at FIG. 9 in accordance with an example embodiment utilizes an electrical clip 104 that connects with bayonet tab detents 112 configured uniquely to identify the lens type and the conductive properties of the metal spring clips 104 to complete an electrical circuit to be measured by the connected case. In the example illustrated at FIG. 9, an electrical spring connection is made between one of multiple spring electrode clips 103 and an electrical connection point 104 on a lens sensor connection 106 that completes a circuit in a Main PCB 108.

In the example of FIG. 9, the micro-bayonet tabs 112 have detents machined at distinct intervals. The absence or presence of a detent feature is unique to each lens type. When the micro-bayonet 110 is rotated 90° into place, the bayonet tab 112 pushes features on a custom clip 103 into place such that the absence of a detent causes the clip 103 to make contact with an exposed electrode 104 on the sensor interface circuit 106. When the clip 103 makes contact with the electrode 104, current then flows from the positive reference through each clip connection point 104 back to the negative reference 118. The created voltage at the measurement node 114 will be unique to each lens type. Multiple lenses 22 having a different detent pattern can be detected (presence) and differentiated (uniquely identified) based on the voltage at the measurement node 114.

When a conforming or standardized lens 22 of a specific lens type, e.g., including a micro-bayonet interface 110 or other such lens interface that includes a tab 112 including detent features that are unique to the specific lens type of the lens 22 that is coupled to the mobile device case that includes an embedded lens sensor connection 106 and PCB 108, the tab 98 serves to make electrical contact with a unique combination of the spring electrode clips 103 and completes an unique electrical circuit on the PCB, e.g., including the resistors, the measurement node 114 and the positive reference 116 and the negative reference 118 shown schematically in FIG. 9. An unique electrical quantity is measured and matched by processor 120 to a specific lens type of a lens 22 that is currently connected to the mobile device case and aligned with its integrated miniature camera module.

Figure 10:
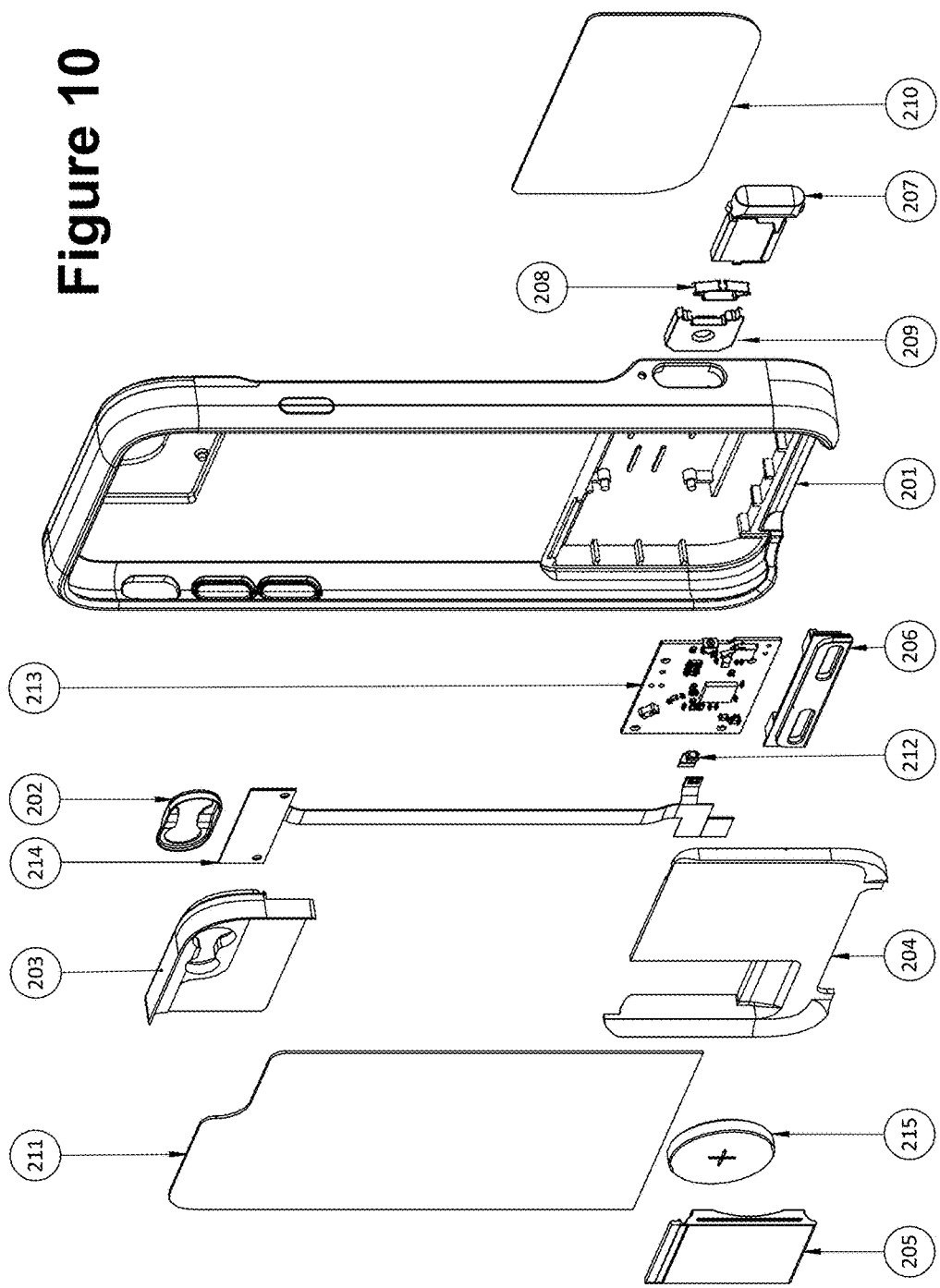

FIG. 10 is an exploded view of an example of a case assembly that is configured to couple around a camera-enabled mobile phone, such as an iPhone, or an Android or Samsung smart phone, or other embedded device that includes an installed camera module in accordance with certain embodiments. The case assembly of the example embodiment of FIG. 10 includes an overmold 201 that may be formed from polycarbonate with TPU/silicone or another material such as any standard mobile device case material. The case assembly of FIG. 10 further includes a lens attachment interface 202, a mount interface overmold 203, a main PCB cover 204, a battery door 205 and battery 215, and a camera strap attachment 206.

A half-press/full-press image capture shutter button is also illustrated in the example embodiment of FIG. 10 including a button mechanism assembly 207, a detent spring 208 and detent spring holder 209. Further example embodiments of the half-press/full-press shutter button are illustrated at FIGS. 17A-28.

FIG. 10 further illustrates a custom grip plate 210, and an inner cushion/lining 211 of an example case assembly. A white plastic LED 212 is also illustrated at FIG. 10.

Electrical circuits 213 and 214 are illustrated at FIG. 10 schematically. Some examples of these circuits 213 and 214 have been discussed with reference to FIGS. 1-9 as electric circuit and/or wireless components of a PCB 12, 42, 52, 62, 72, 88, 102, 108, lens sensor connection 10, 40, 50, 61, 70, 84, 99, 106 and lens sensor interface 8, 28, 38, 48, 58, 70, 82, 99, 103 as set forth in several non-limiting examples.

Lens Attachment Interface

Lens attachment interface integration with a case is provided in certain embodiments by a custom designed stamped metal micro-bayonet interface detail co-molded into the material of the case. In other embodiments, a custom designed stamped metal micro-bayonet interface is adhered to the case using a mount plate that is designed and configured to be adhered to back or inside of phones/devices using adhesive or magnetic material.

Figure 11A:
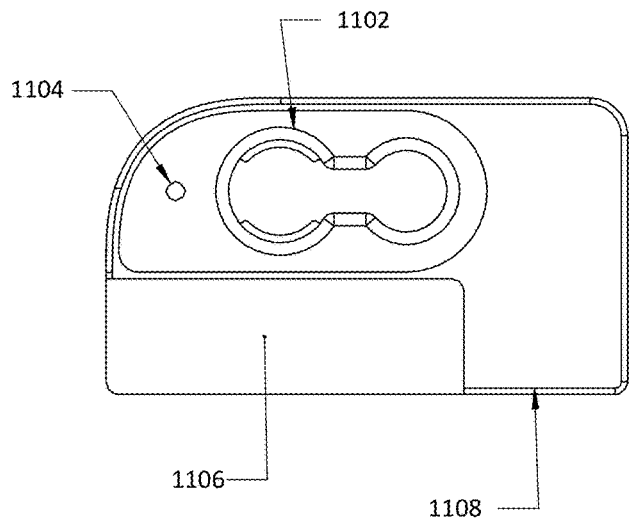
Figure 11B:
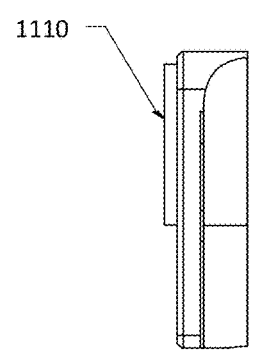
Figure 11C:
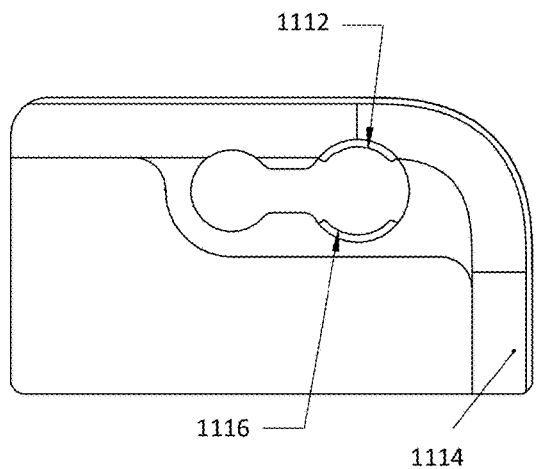
Figure 11D:
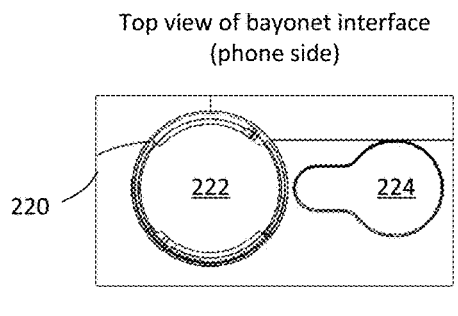
Figure 11E:
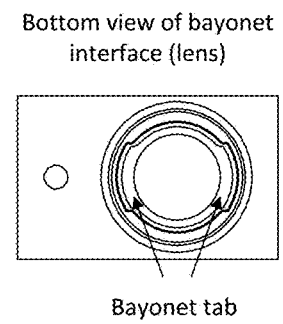
Figure 11F:
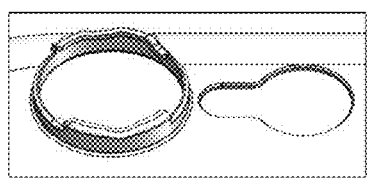
Figure 11G:
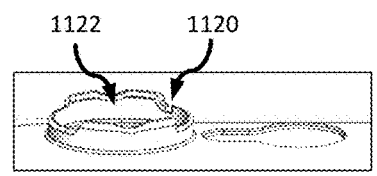
Figure 11H:
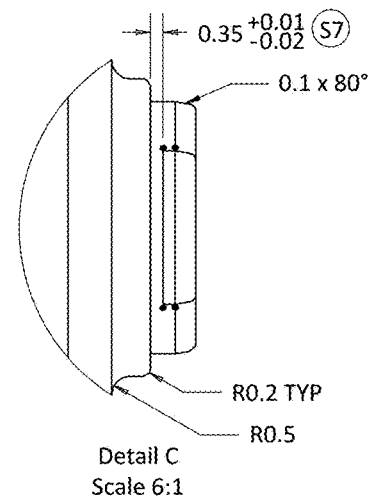
Figure 11I:
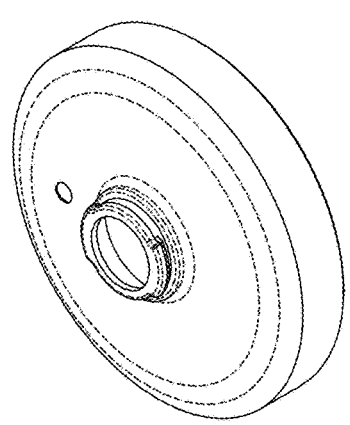
Figure 11P:
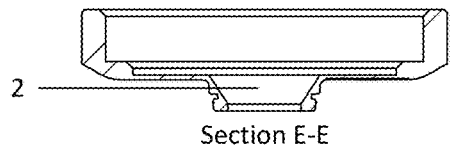
Figure 11Q:
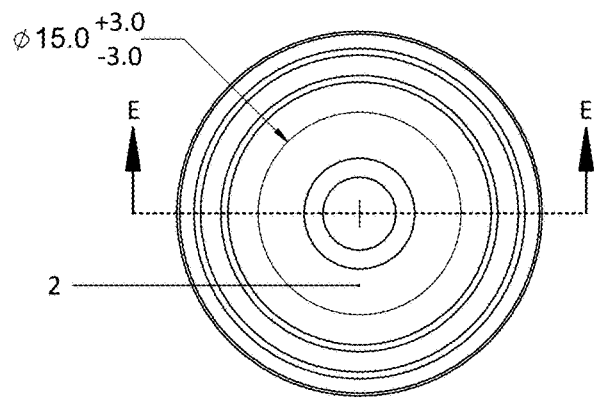
Figure 11R:
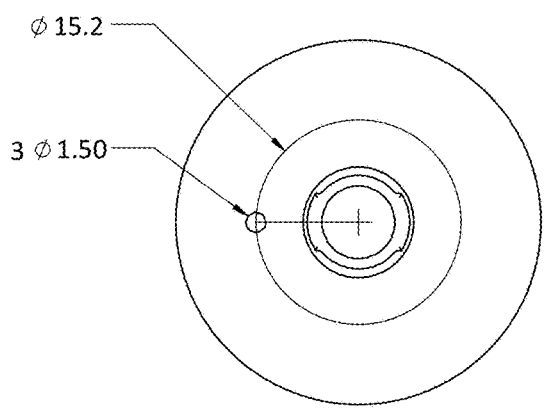
Figure 11S:
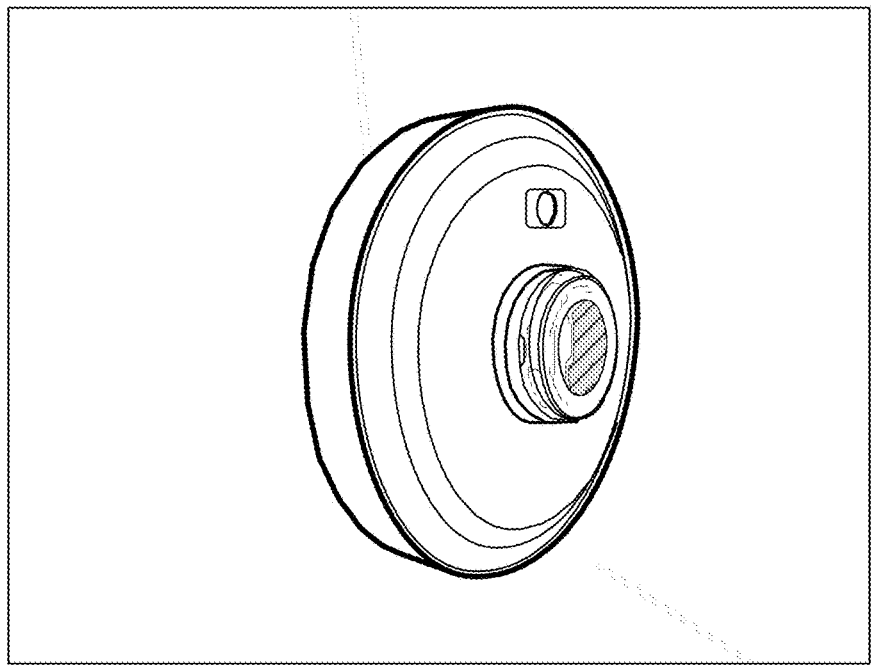
Figure 11T:
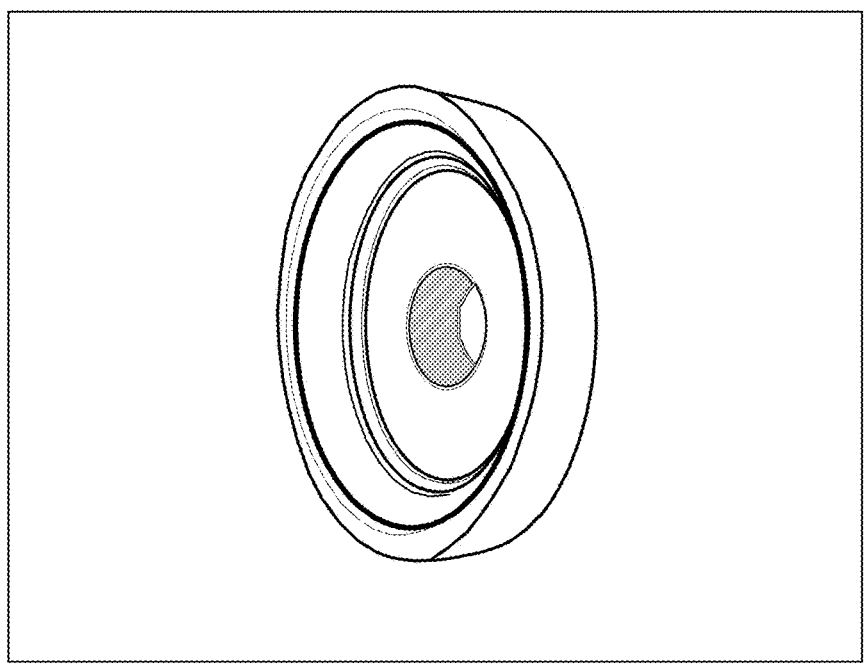

FIGS. 11A-11C schematically illustrates examples of a lens attachment interface co-mold in accordance with certain embodiments. In the example of FIG. 11A, a chamfered edge 1102 is designed to look clean from the top angle and to help guide the lens into place for easy attachment. A molded in depression 1104 acts as an alignment dot for when attaching lens. An area 1106 covers the flex sensor PCB. Detail 1108 is meant to look clean as if it was molded into place or is same curvature as inside case of shell. In the example of FIG. 11B, a surface 1110 is flush with the front of the phone case. In the example of FIG. 11C, a stamped mount interface 1112 is visible a small amount. This feature 1112 is clear to ensure lens can attach properly. The surface 1114 matches curvature of inside of phone case, and matches iPhone 6 curvature. Mount interface 1116 is a shape of the rest of the mount interface can be re-designed to ensure optimal co-molding design and conforms to Apple case design specification. The material may be polycarbonate (MT-11006) or TPU/TPE (MT-11005). The example of FIG. 11A-11C may be co-molded into full case or is a secondary attachment and adhered in place FIGS. 11D-11G illustrate top, bottom, side and perspective views of another example lens attachment interface in accordance with certain embodiments that may be co-molded with a mobile device case, or designed for stable coupling between the mobile device and a firmly installed case. In the example of FIG. 11D which schematically illustrates a top view of a bayonet interface (phone side), bayonet tabs drop into place of phone interface side. In the example of FIG. 11F, bayonet tabs rotate 90° and interfere with the detent of the stamped plate to create pressure and hold the lens into place, hitting the final position of the stamped interface which stops rotation. In the example of FIG. 11G, a stamped stop 1120 of mount plate and stamped interface detent 1122 are schematically illustrated. FIGS. 11H-11T illustrate several views of an auxiliary lens holder that is designed to couple with the auxiliary lens attachment interface of FIGS. 11D-11G. In the example of FIGS. 11H-11T, the material may be 17-4 annealed stainless steel which may be fully hardened, and surfaces may be matte black. FIGS. 11A-11T are described in additional detail below with reference to example auxiliary lens embodiments.

The combination of the microbayonet tabs and the lens attachment interface permits that microbayonet feature of an auxiliary lens to penetrate the plane of the lens attachment interface cavity in a first orientation and then to stably couple the lens to the lens attachment interface and mobile device case when rotated 90 degrees to a second orientation. The rotation need not be 90 degrees, but may be a smaller angle between some minimum and 90 degrees and even beyond 90 degrees to some maximum before the tabs again line up with the interface cavity making it detachable. The lens may be positioned onto the case with the bayonet tabs penetrated through the lens attachment cavity, and then may be rotated, or alternatively, translated, to overlap the bayonet tabs with detent features of the lens attachment interface of stably couple the auxiliary lens into position along the optical path of the camera module of the mobile device.

Figure 12A:
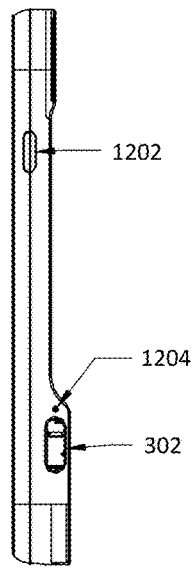
Figure 12B:
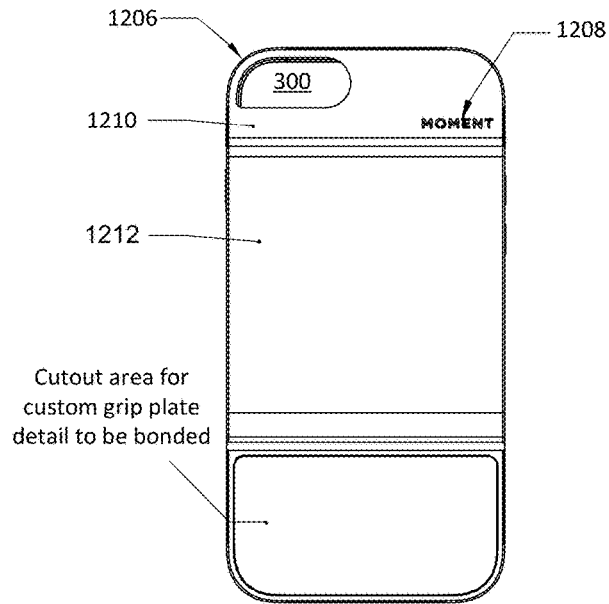
Figure 12C:
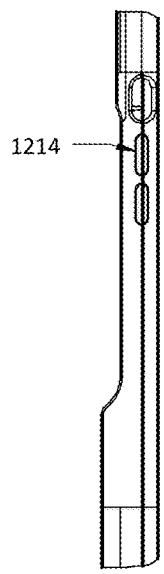
Figure 12D:
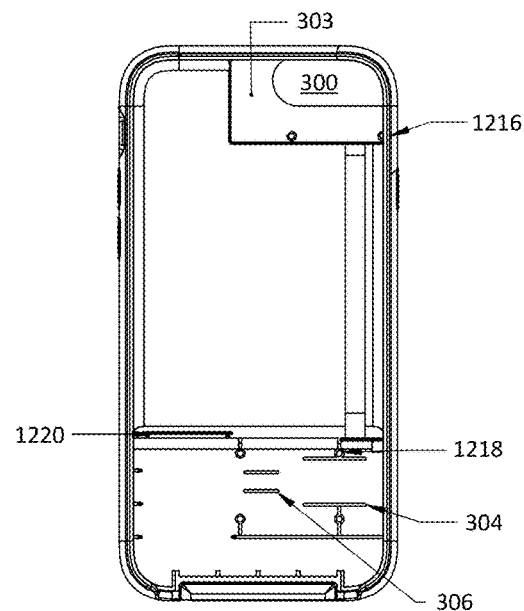

FIG. 12A-12D schematically illustrates an example of a case for coupling with a mobile phone or other embedded device in accordance with certain embodiments. An aperture 300 in the case illustrated at FIGS. 12B and 12D is designed to accommodate the stable coupling of a separate lens attachment interface such as element 202 of FIG. 10 or any of the lens attachment interfaces illustrated schematically at FIGS. 13A-13C and 14. FIG. 12A illustrates a cutout 302 for a half-press/full-press shutter button, e.g., including a slight chamfer around the slot 302 on overmolded material. In the example side view illustrated schematically in FIG. 12A, a button access 1202 is shown designed into overmold material, and a hole 1204 for a LED is shown with slight chamfer around hole in overmold material. In the example rear view shown schematically in FIG. 12B, a curvature 1206 of the case matches a curvature of an iPhone 6. A MOMENT word mark 1208 is schematically illustrated in FIG. 12B as being identified 0.2 mm-0.25 mm deep and polished in cavity. In the example of FIGS. 12A-12D, the shell material 1210 may be white polycarbonate, the overmold material 1212 may be jet black TPU/silicone. In the example of FIG. 12C, a button access 1214 designed into overmold material is schematically illustrated.

FIG. 12D illustrates an area 303 for detail that covers a flex PCB lens recognition sensor such as any of those described in the examples provided at FIGS. 1-9. The detail may be molded into the case or secondary assembled and bonded into place. The area 303 also has a stamped mount interface co-molded into. FIG. 12D also shows a locating point 1216 for a flex PCB and a locating point 1218 for a main PCB. A locating feature 1220 is also illustrated schematically in FIG. 12D. FIG. 12D also shows an example of a molded guide 304 for the shutter button mechanism or another button mechanism of the mobile device. Another molded guide 306 is shown in FIG. 12D for a spring holder that is used to facilitate proper tension in the spring and button assembly of the half-press/full-press shutter button that is illustrated by the examples of FIGS. 17A-28.

Figure 13A:
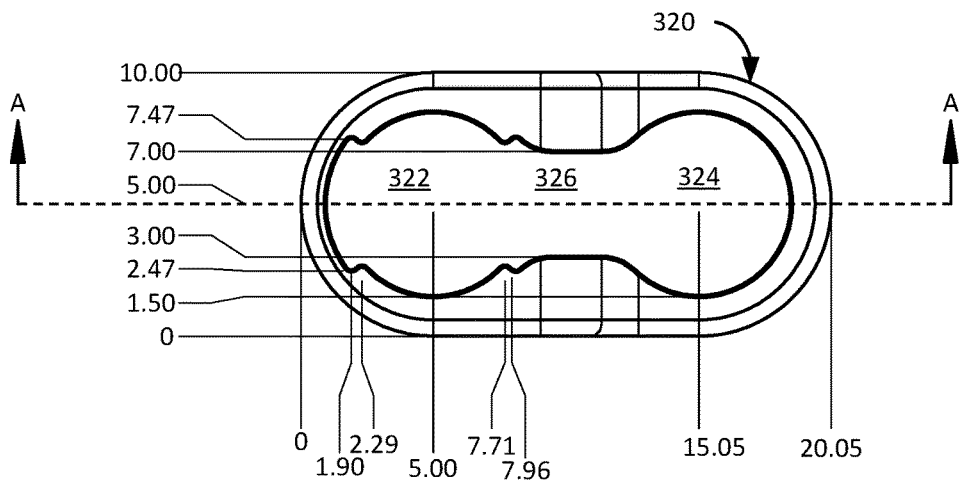
Figure 13B:
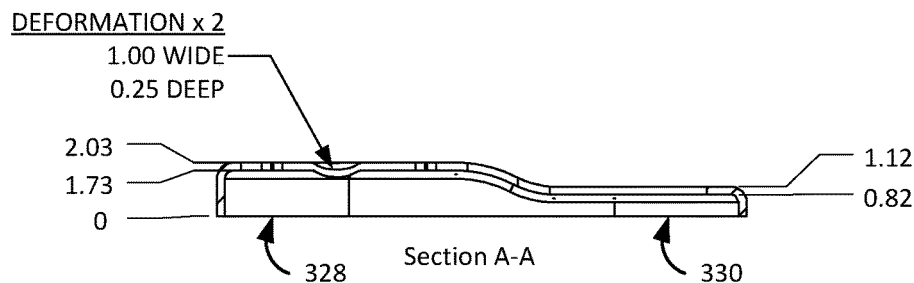
Figure 13C:
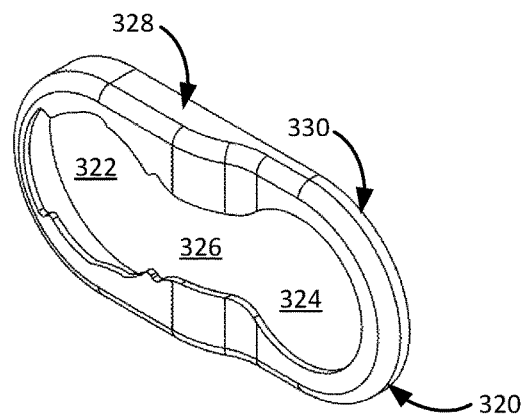

FIG. 13A-13C schematically illustrates an example of a lens attachment interface in accordance with certain embodiments. The lens attachment interface 320 of FIGS. 13A-13C defines a lens mount cavity 322 that accommodates a microbayonet feature of an auxiliary lens, and flash cavity 324 that permits a built-in flash of a mobile device to illuminate an object to be imaged without being blocked by the lens attachment interface 320. In this embodiment, a narrow region 326 connects the two cavities 322 and 324 such that the regions 322, 324 and 326 together define a single cavity having a barbell shape with detent lens coupling features in at least one of the circular or elliptical end regions of the cavity. In other embodiments, two or three distinct cavity regions may be defined in an alternative lens attachment interface, e.g., such as that illustrated at FIGS. 11D-11G and FIG. 14.

FIGS. 13B-13C illustrate a lens attachment interface 320 having a thick end 328 and a thin end 330. The different thicknesses of the regions 328 and 330, and the existence of the narrow region 326, permit an auxiliary lens to be translated into position after penetration of cavities 324 and 326 at the thin end 330 to the thick end 328 before or after rotation of the auxiliary lens into stable coupling with the lens attachment interface 320 over the cavity 322 that is approximately centered on the optical path of the camera module of the mobile device. In the example of FIGS. 13A-13C, the thickness of the plate 320 may be 30 gauge, and the material may be 17-4 stainless steel, fully hardened, and the color may be PVD coating black, then electrochemical coloring. The plate 320 may be configured with deburr and break edges up to 0.2 and without sharp edges.

Figure 14:
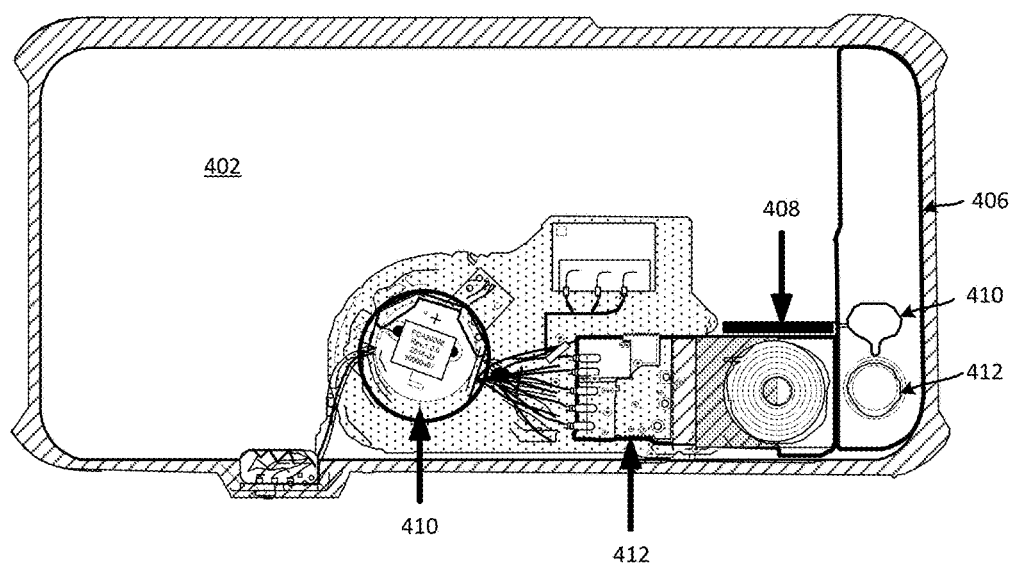
Figure 16A:
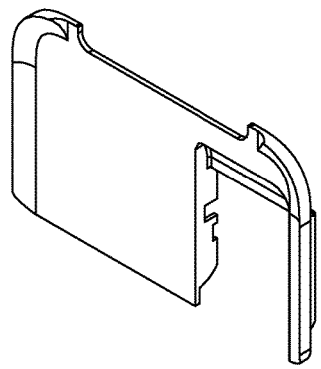
Figure 16B:
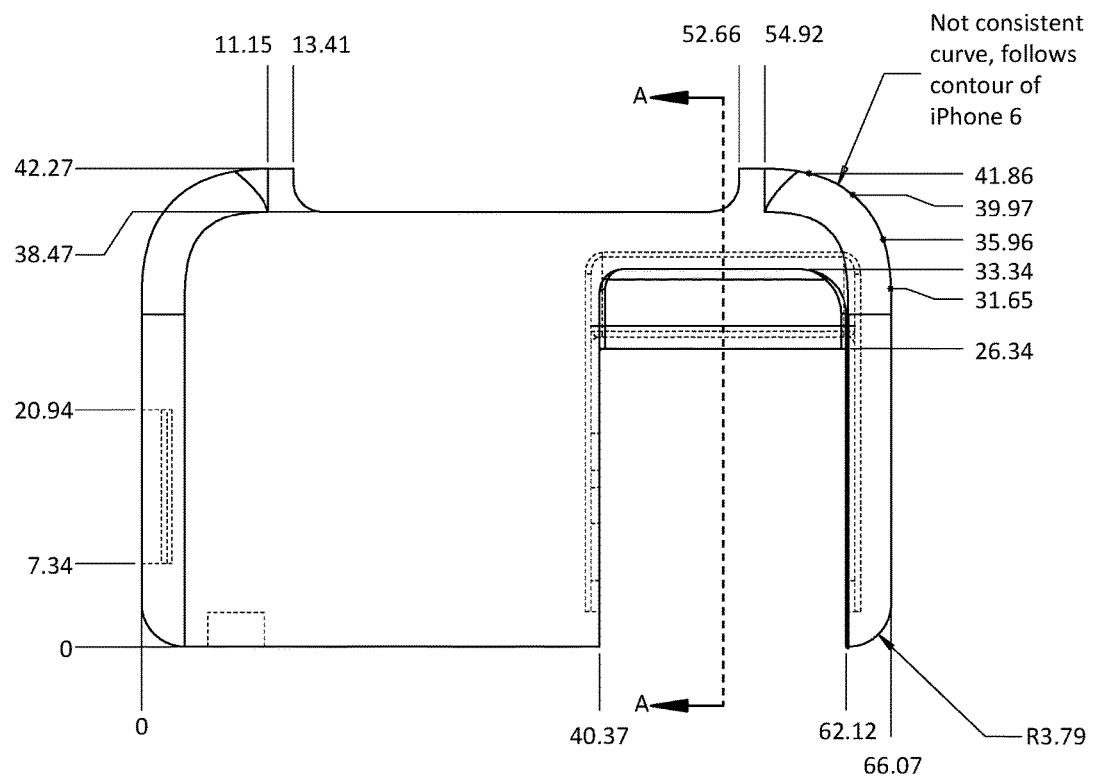
Figure 16C:
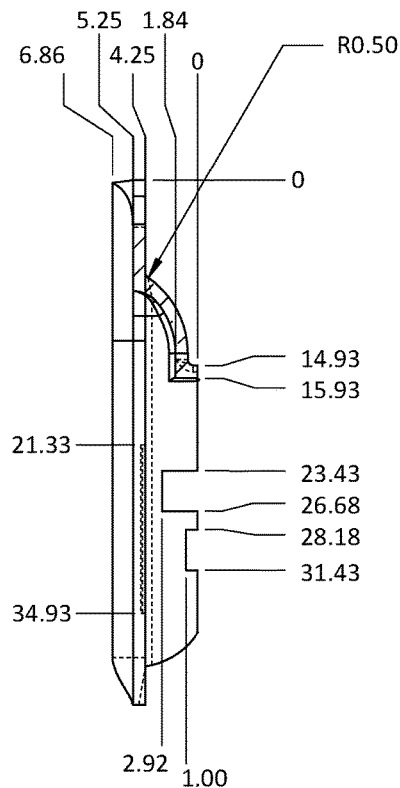
Figure 16D:
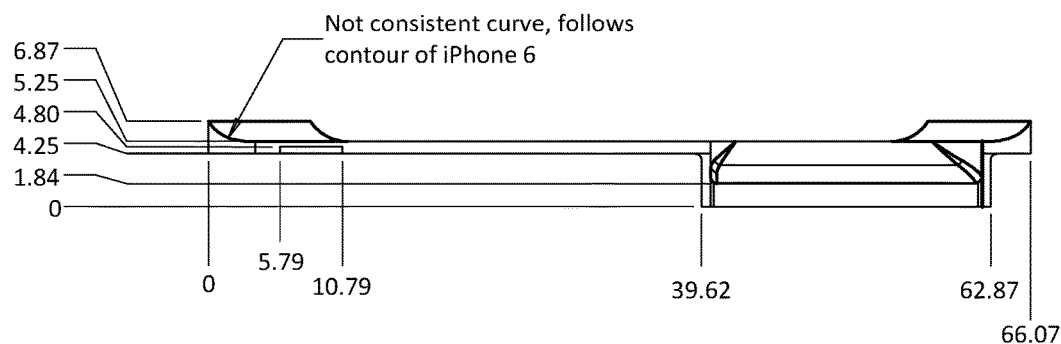
Figure 17E:
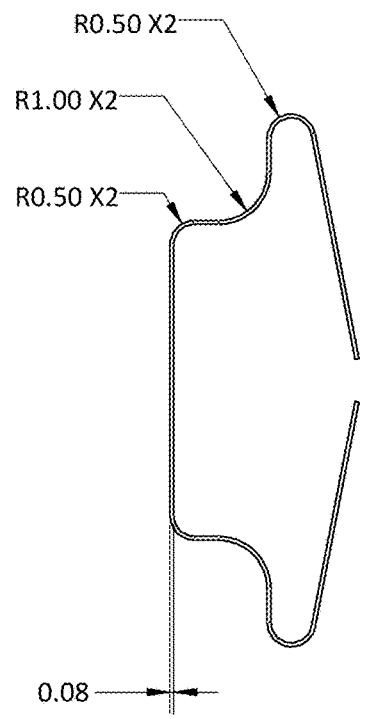
Figure 17F:
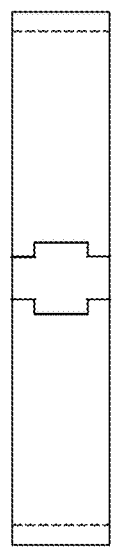
Figure 18A:
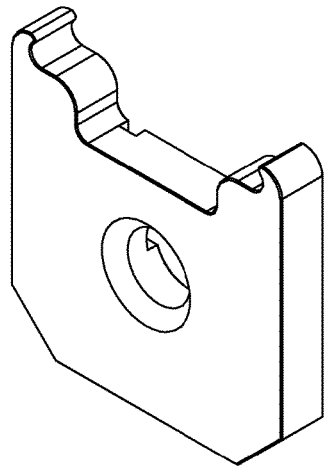
FIGS. 18A-18F illustrate a detent spring holder for use with the detent spring of FIGS. 17B-17F for a shutter button for a camera-enabled mobile device case in accordance with certain embodiments.
Figure 18B:
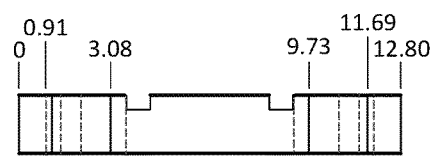
Figure 18C:
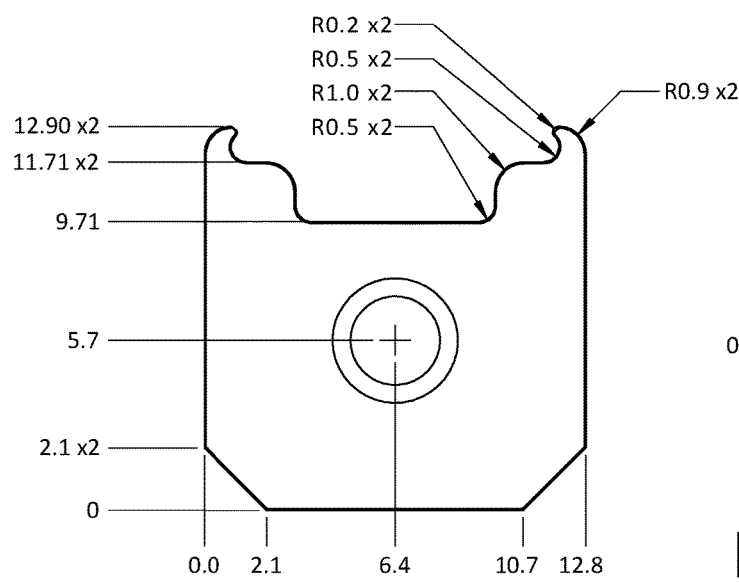
Figure 18D:
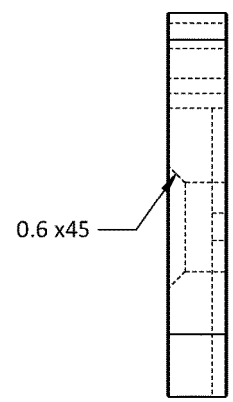
Figure 18E:
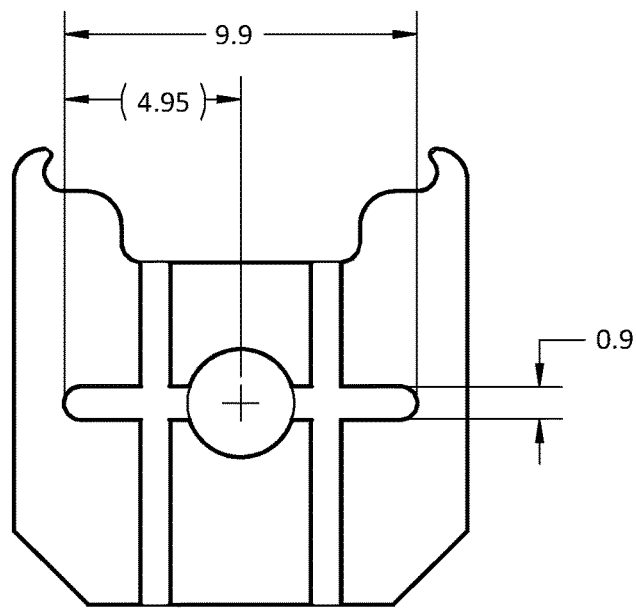
Figure 18F:
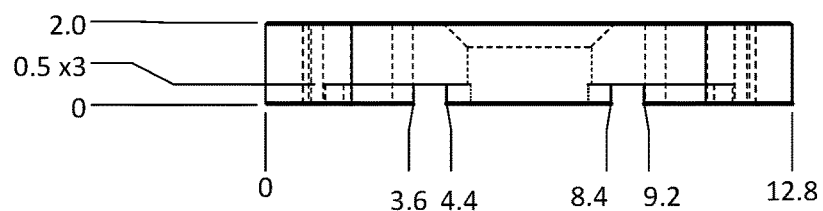

FIG. 14 schematically illustrates a cutaway view of an exemplary camera-enabled mobile device case 402 and lens attachment interface 406 in accordance certain embodiments. A lens attachment interface 406 fits stably into a pocket in the case 402 in this embodiment. The interface 406 may alternatively be molded into the case 402. The interface 406 includes an elongated shape that conforms approximately in length with the length of the short side of a rectangular mobile device such as a smartphone made by Apple, Samsung, LG other Android manufacturer.

The interface 406 includes aperture 410 and aperture 412. Aperture 410 is sufficiently elongated that a slightly smaller elongated microbayonet feature of an auxiliary lens may penetrate the aperture 410 when the long axes are aligned, and serves to stably couple the auxiliary lens to the case 402 after rotation by 90 degrees more or less. The auxiliary lens includes magnets or electrical contacts or an IC or other readable lens type identifier such that the lens sensor 408 (see, e.g., FIGS. 1-9) can perform a measurement to be analyzed by a processor 410 on a connected printed circuit board 412 to determine the lens type and custom image setting, processing and editing processes and applications to be used in accordance with the determined lens type.

FIG. 15G illustrates the lens attachment interface 406 of the example of FIG. 14 may include a metal plate 420 such that an attached magnet 420 may hold the interface 406 in place at the long end of an example mobile device (e.g., iPhone) where the miniature camera module is located.

FIGS. 15H-15K schematically illustrate a case for picture takers that is handable, mountable, connected and the new shooter with Bluetooth and proprietary lens sensor technology. FIG. 15H schematically illustrates a tripod 1230 mountable for long exposure time lapse function on OS8. FIG. 15I schematically illustrates talk 1232 between a lens and a case. FIG. 15J schematically illustrates a quick release compatible strap 1234. FIG. 15K schematically illustrates an integrated lens mount 1236 and a camera style grip 1238.

FIGS. 16A-16D schematically illustrate an example of a main PCB cover portion of a case in accordance with certain embodiments. The material may be polycarbonate. The color may be jet black. The finish may be mold tech finish number MT-11006.

In certain embodiments, Bluetooth control of certain features is provided, including shutter control, focus, exposure, lighting, power, and other pre-capture settings and post-capture editing control that have been described elsewhere herein. In addition, certain embodiments include features described at US published application no. US2012/0282977, which is incorporated by reference.

Half-Press/Full-Press Shutter Button

A half-press/full-press shutter button in accordance with certain embodiments includes half-press touch-screen functionality. That is, while the shutter button is held in half-press mode, touch screen control functions are accessible and/or burst mode and/or video may be enabled. Half-press also enables certain pre-capture features such as lighting and exposure adjustment, flash options, auto-focus, face detection/tracking focus or manual focus selection, and image size, scene mode, ISO, white balance, color effect, timer, geotagging and shutter sound options, as well as normal, high dynamic range, panorama, continuous shot and portrait options, and time catch shot selection, as well as a voice shutter option. Any subset of these features may be enabled while the shutter button is being held in half-press mode. FIGS. 17A-28 illustrate several example half-press/full-press button embodiments, including various mechanical and electrical features.

FIGS. 17A-28 schematically illustrate example embodiments of a custom designed mechanism to enable actuation of an electro-mechanical interface for adjusting pre-capture settings and capturing digital images. Each implementation has a custom design to actuate two different switches with one tactile button (button); one for half press (e.g., focus and expose image and other pre-capture settings, see above) and the second for full press (capture image). The logical functions of the two switches are defined in software and thus are not tied specifically to focus, expose, other pre-capture settings, and image capture. These may be referred to as full press and half press.

In certain embodiments, a stamped metal spring is used with a case having a button that actuates half press and full press switches on a PCB. There is a metal stamped detail adhered to the button. In this embodiment a HDPE detail is used to decrease friction of the button mechanism. In addition, this embodiment may include a stamped metal spring and stamped spring holder.

FIG. 17A illustrates a metallic component before it is bent to form a detent spring for a shutter button for a camera-enabled mobile device case in accordance with certain embodiments.

FIGS. 17B-17F illustrate a detent spring for a shutter button for a camera-enabled mobile device case in accordance with certain embodiments. In the example of FIGS. 17A-17F, the dimensions are in millimeters. The material may be 0.8 mm thick beryllium-copper alloy 25, fully hardened slowly to ensure no distortion.

FIGS. 18A-18F illustrate a detent spring holder for use with the detent spring of FIGS. 17B-17F for a shutter button for a camera-enabled mobile device case in accordance with certain embodiments. In the example of FIGS. 18A-18F, the dimensions are in millimeters. The color, material and finish may be black, polycarbonate/delrin and smooth surface with no uneven machine marks, respectively.

Figure 19A:
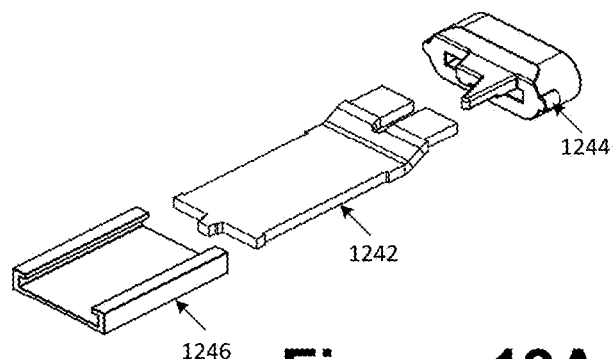
Figure 19B:
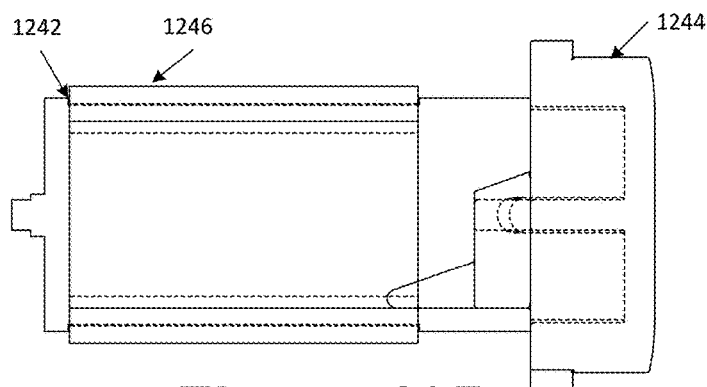
Figure 19C:
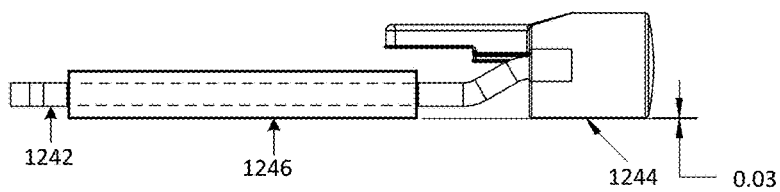
Figure 19D:
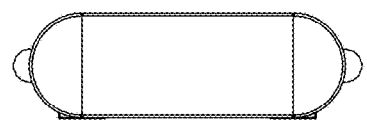
Figures 20E, 20F:
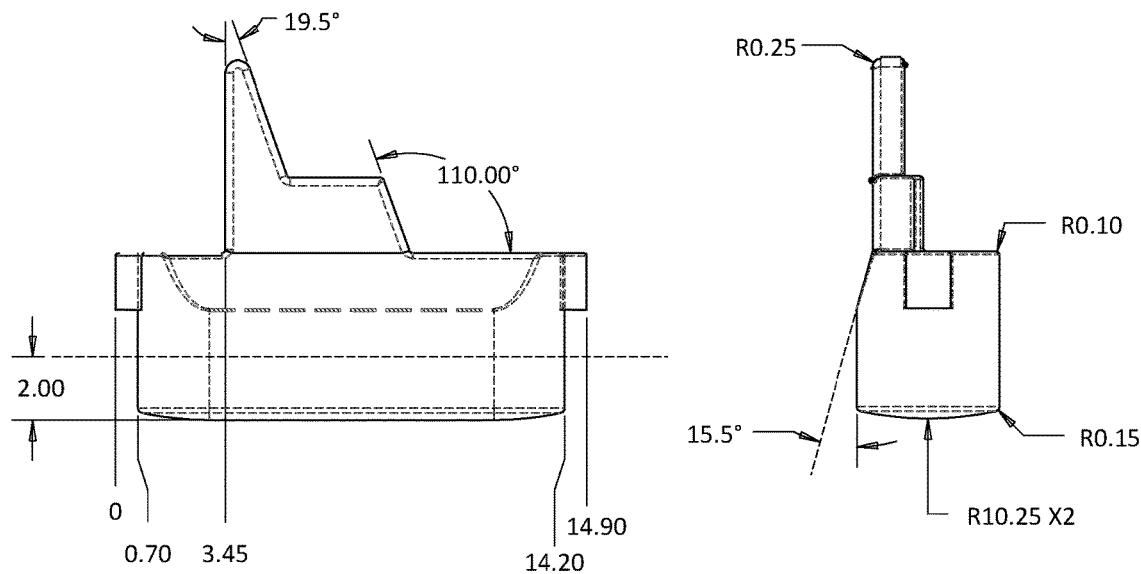
Figure 20G:

FIGS. 19A-19D schematically illustrate a shutter button mechanism assembly for a camera-enabled mobile device case in accordance with certain embodiments. FIG. 19A schematically illustrates an exploded perspective view including a mechanism attaching button and spring 1242, a shutter button 1244 and a friction slider for button mechanism 1246. The prongs of the mechanism attaching button and spring 1242 are adhered into slots of friction slider for button mechanism 1246. The shutter button 1244 fits around the mechanism attaching button and spring 1242 and is adhered into place. In the example of FIG. 19C, the button 1244 is not on the same plane as the liner since the liner is meant to decrease friction during button actuation.

FIGS. 20A-20G schematically illustrate a shutter button for a camera-enabled mobile device case in accordance with certain embodiments. The material may be polycarbonate. The color may be jet black. The finish may be polished/gloss from front surface to dashed line called out on FIGS. 20A-20G.

FIGS. 21A-21C schematically illustrate a mechanism attaching shutter button and spring for a camera-enabled mobile device case in accordance with certain embodiments. The dimensions are in millimeters. The material may be stainless steel.

FIGS. 22A-22C schematically illustrate a friction slider for a shutter button mechanism for a camera-enabled mobile device case in accordance with certain embodiments. The dimensions are in millimeters. The material may be cross-linked polyethylene. The color may be jet black. The finish detail is meant to act as anti-friction liner FIGS. 23-28 schematically illustrate examples of additional alternative shutter button mechanisms for camera-enabled mobile device cases in accordance with certain embodiments.

Figure 23:
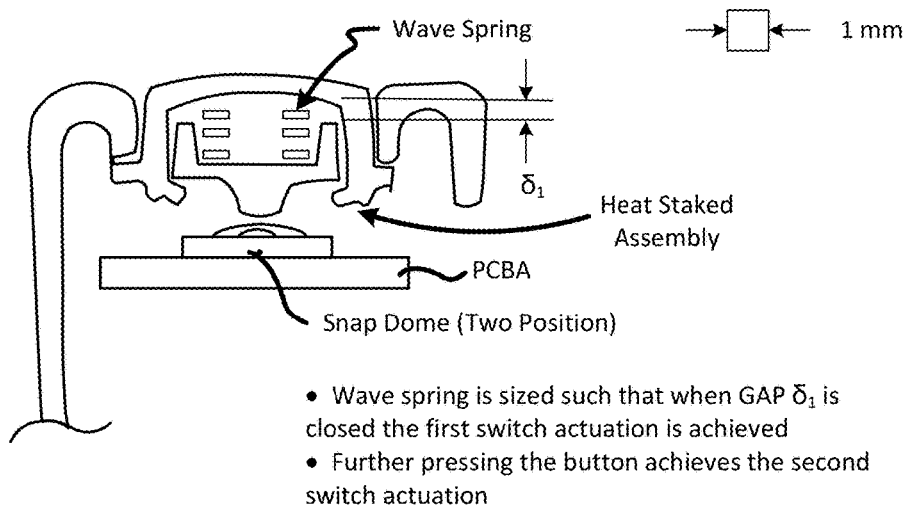
Figure 24:
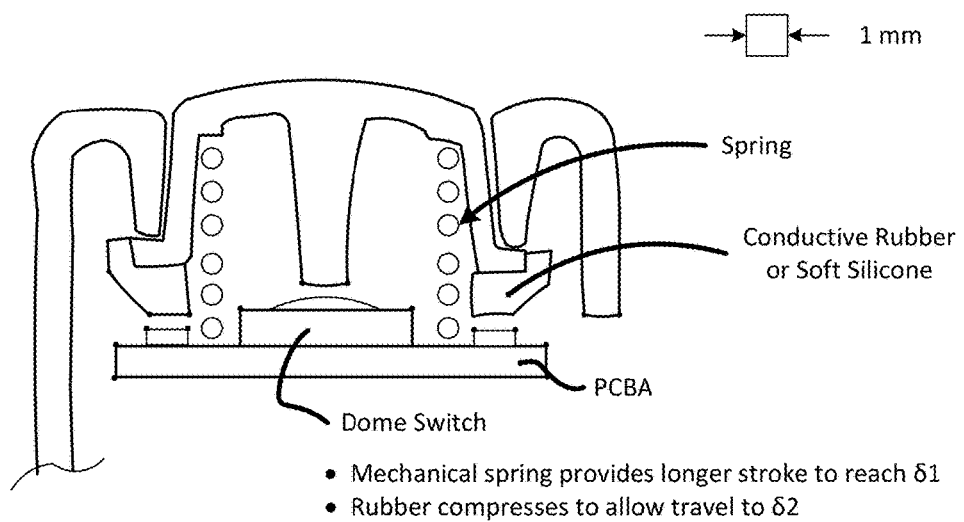

FIG. 23 schematically illustrates another half-press/full-press shutter button assembly including a wave spring assembly built into button, button has post that will actuate a 2 stage snap dome for half press and full press features. Spring designed to allow compression of spring to actuate half press, then further pressing will hit the second switch which will actuate the full press FIG. 24 schematically illustrates another half-press/full-press shutter button assembly including a spring that compresses controlled distance and actuates a snap dome for half press, conductive rubber on the bottom of the button will compress a controlled distance and will close a circuit to actuate the full press.

Figure 25:
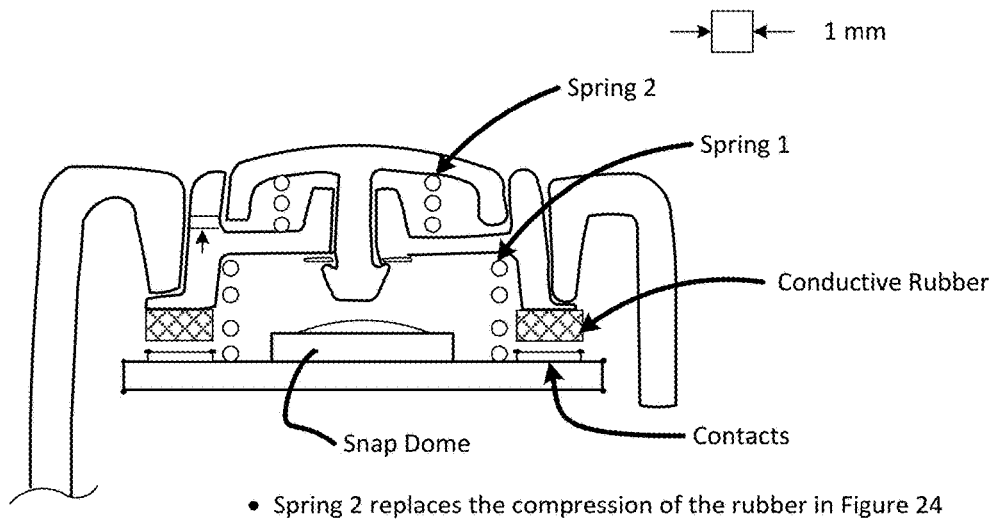

FIG. 25 schematically illustrates another half-press/full-press shutter button assembly including a spring that compresses a controlled distance and actuates a snap dome for half press, a second spring that will compress when half press is actuated and will ensure the first spring will not compress, second spring will actuate the full press function.

Figure 26:
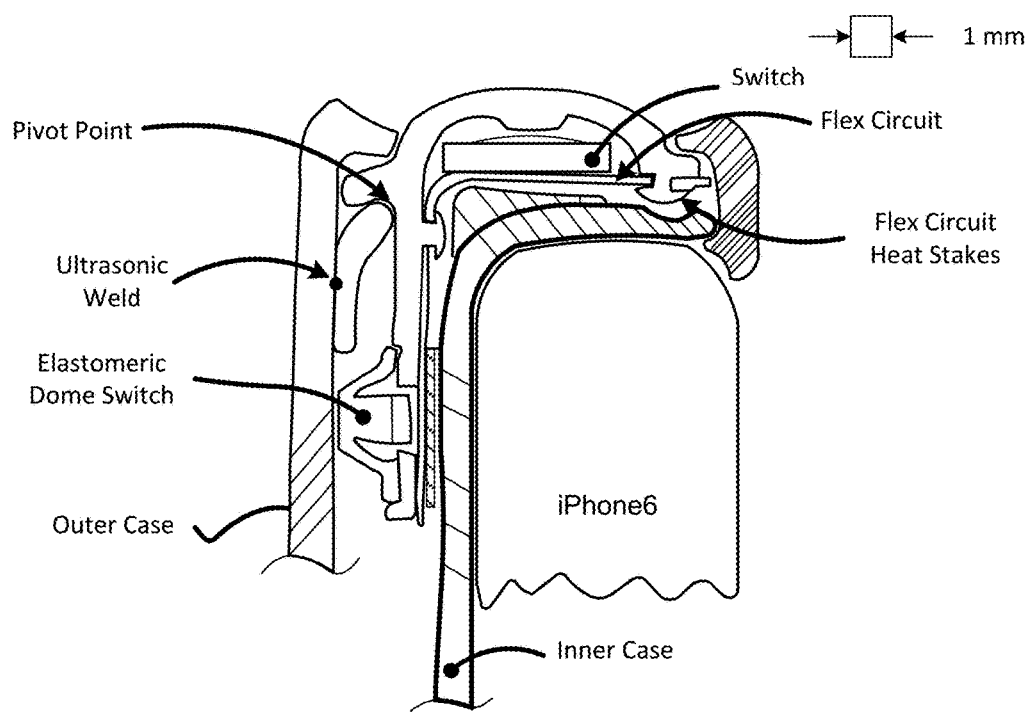

FIG. 26 schematically illustrates another half-press/full-press shutter button assembly including a button that compresses and slightly collapses an elastomeric dome switch that will close a circuit and actuates the half press function, then traveling another short distance will depress snap dome to actuate the full press function.

Figure 27:
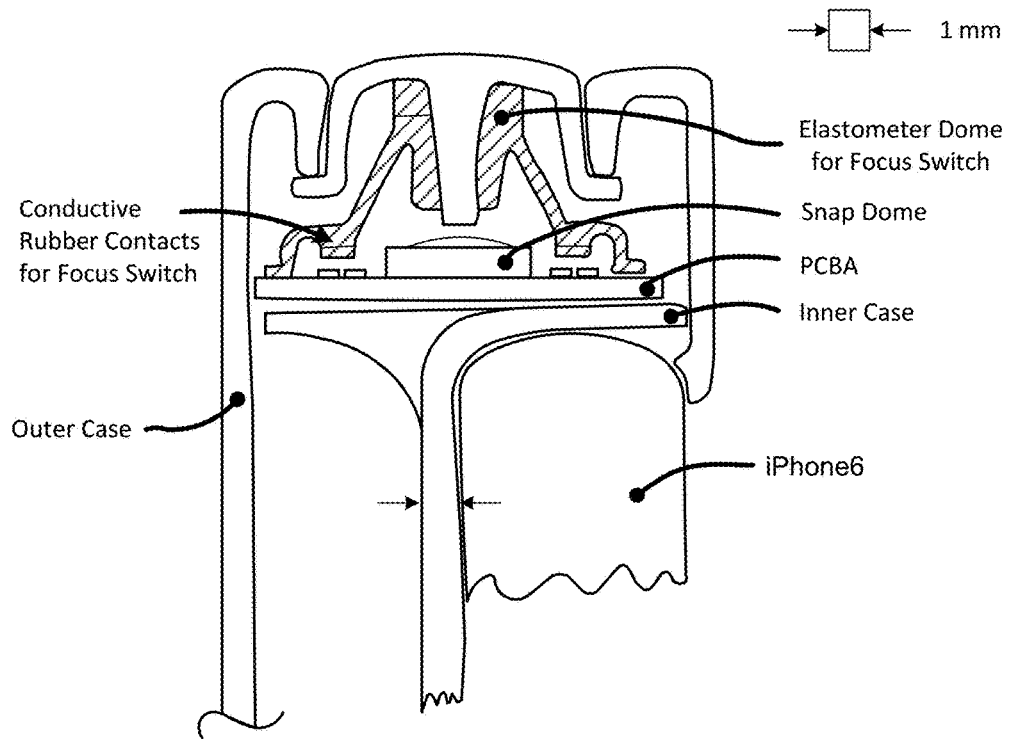

FIG. 27 schematically illustrates another half-press/full-press shutter button assembly including a similar idea as the previous example of FIG. 26, except the design is linear. Slight press of button will collapse elastomeric dome switch with conductive contacts that closes a circuit and actuates half press function, then slightly more travel to depress snap dome to actuate the full press function.

FIG. 28 schematically illustrates another half-press/full-press shutter button assembly including a custom designed two stage collapsible elastomeric dome switch with auxiliary spring to control force needed to depress to the half press function. First collapse with a conductive elastomer will depress and close a circuit to actuate the half press function, then slightly more pressure on button will create second collapse with a second conductive elastomer contact that will close a circuit and actuate the full press function.

Smart Case System for Mobile Photography

A smart case system for mobile photography is provided herein, including a case, an auxiliary lens and a software app. The case may include features described elsewhere herein including lens recognition electronics, a half-press/full-press shutter button feature, a lens attachment interface that permits stable mechanical coupling of an auxiliary lens to a mobile device that uses mechanical features to precisely align the auxiliary lens with an on-board camera module of the device. In addition, attachment locations are provided in certain embodiments for a wearable strap and tripod attachment.

A recognizable auxiliary lens attachment is also provided herein. The auxiliary lens attachment can be selected from multiple lens attachments that may be used to provide enhanced photography in different ways. For example, one auxiliary lens attachment may provide a wide field of view, while another may provide a more distant or closer focus plane than the on-board camera module of the mobile device can provide. An auxiliary lens attachment may be provided that includes a zoom feature or an autofocus or manual focus feature including one or more movable optics (using piezo, MEMS, or VCM, e.g.,) within a fixed lens barrel or coupled to a fixed lens barrel. The auxiliary lens attachment may include a single lens or a stack of two or more lenses.

Auxiliary lens attachments are provided in certain embodiments that are recognizable by a mobile device case. The auxiliary lenses and mobile device case are constructed with custom or standardized complementary lens recognition features. Several embodiments have been illustrated in examples elsewhere herein.

A software application is also provided herein which controls a processor on a PCB embedded within a mobile device case and receives data from a lens attachment interface that couples mechanically, electrically and/or wirelessly with an auxiliary lens attachment to provide a signal to be processed by the processor, such that based on this data, auxiliary lens specific user-selectable functions may be used to improve the mobile photography experience. In addition, certain automatic settings that depend on auxiliary lens type are performed in certain embodiments that enhance captured images by pre-capture settings or post-capture edits.

FIGS. 29-33 illustrate screen shots of graphics generated based on programming and data gathered by components of a camera-enabled mobile device case in accordance with certain embodiments. For example, FIG. 29 illustrates wide angle lens recognition, and FIGS. 30-31 illustrate touch screen lighting and exposure adjustment while the shutter button illustrated by the examples illustrated at FIGS. 10 and 17A-28 is half-pressed as in FIG. 32. FIG. 33 illustrates a full pressed shutter button for image capture in accordance with certain embodiments. Certain remote control feature may also be included, e.g., as set forth at WO2012096433, which is incorporated by reference.

Auxiliary Lens for Mobile Photography

Traditional mobile photo lenses provide ordinary picture quality for ordinary use. An advantageous auxiliary lens can be attached in accordance with various embodiments described by way of example herein to enhance the mobile photography experience. In certain embodiments, an auxiliary lens includes smart lens functionality.

Referring again to the example illustrated schematically at FIG. 1, a Bluetooth module may be embedded inside the lens 22. The main PCB illustrated schematically in FIG. 1 includes a Bluetooth smart radio 18. The lens 22 with Bluetooth module is advantageously configured as a smart lens capable of talking wirelessly to the case 2, e.g., to provide associated technical data that enhance the mobile photography experience. The lens 22 with Bluetooth module may also be configured to talk wirelessly to the mobile device and/or an external device.

In certain embodiments, an auxiliary lens 22 may include a microbayonet mount. The microbayonet mount may include a thin element that extends in the plane approximately normal to the optical path of the lens 22. The shape of the microbayonet mount may be selected in accordance with the shape of the cavity defined in the lens attachment interface 6 that is coupled to or integral with the case 2. Examples of lens attachment interfaces in accordance with certain embodiments are provided in FIG. 10 as element 202, and in FIGS. 11A-11G, 13A-13C, and 14.

The shape of the cavity defined in the lens attachment interface may include any regular or irregular polygon or combination of curved and straight edges that permits the microbayonet element of the auxiliary lens (see, e.g., FIG. 8, elements 96 and 98 and FIG. 9, elements 110 and 112, and FIGS. 11H-11T) to penetrate the plane of the cavity defined in the lens attachment interface 6, and then to stably couple the lens 22 to the lens attachment interface 6 upon rotation or translation of the penetrated microbayonet element of the lens 22.

In another example, the microbayonet element may have an elliptical or rectangular shape. A corresponding lens attachment interface cavity may have a slightly larger elliptical or rectangular shape. The sizes and shapes of these two features are such that the microbayonet can penetrate the cavity to attach or detach when the elliptical or rectangular shapes are aligned, while the microbayonet cannot cross the plane of the cavity when the elliptical or rectangular shapes are relatively rotated by an angular amount within a range between some minimum angle and 90 degrees. In general, the shapes can be various, including an "x" shape, wherein the rotation by 45 degrees would be optimal to secure the attachment.

The microbayonets, 96, 98 and 110, 112 of FIGS. 8 and 9, respectively, include a rectangular shape overlapping a circular shape at its center, wherein the long edge of the rectangle is greater than the diameter of the circle and the short edge of the rectangle is lesser than the diameter of the circle. The microbayonets 96, 98 and 110, 112 of FIGS. 8 and 9, respectively, are hollow, or alternatively transparent with antireflection coatings, in the circular region which serves as an aperture that permits light to travel along the optical path towards the image sensor of the mobile device. Thus, an auxiliary lens may have a microbayonet feature that has tabs of any of a variety of oblong shapes that protrude from a hollow or transparent center which accommodates the optical path of the camera.

In several embodiments illustrated at FIGS. 10 and 11A-11C, the lens attachment interface has a barbell shape that includes a pair of circular regions connected by a thin middle region. One of the circular regions of the lens attachment interface 6 may serve both to couple with the lens 22 in accordance with the microbayonet embodiment and as an aperture to accommodate light traveling along the optical path from the object to be imaged through the auxiliary lens, the aperture, the built-in lens of the camera module and ultimate to the image sensor. The other circular region defined in the lens attachment interface 6, or mount plate as it may also be referred to, provides room for a microphone and/or flash that are provided on the back of an iPhone, Android, Samsung or other camera-enabled smartphone device.

FIGS. 11D-11G schematically illustrate another example embodiment of a lens attachment interface 6 or mount plate, e.g., a microbayonet mount, that is embedded into the lens case 2 to provide secure attachment of an auxiliary lens 22 to the case 2 that is itself stably coupled around a mobile camera-enabled device. FIG. 11D schematically illustrates a lens attachment interface 220 that is integral with or stably attachable to a mobile phone case. The lens attachment interface 220 or mount plate 220 of FIG. 11D defines a first cavity 222 and a second cavity 224. The first cavity 222 accommodates both the coupling of an auxiliary lens 22 having a microbayonet feature (see FIGS. 8 and 9) and an unencumbered optical path of the camera module. The second cavity 224 accommodates a flash and/or microphone that may be built into the mobile device.

The first and second cavities 222 and 224 can be shaped and positioned to accommodate the locations of the image sensor and flash/microphone features wherever they may be placed on the mobile device. For example, embodiments provided herein at FIGS. 10, 11A-11G and 12A-12D, among others, illustrate features that match iPhone features. However, LG Android devices typically have the image sensor and flash centered at one long end of the device and a microphone nearer the bottom of the device, while a Samsung device typically has the image sensor and flash approximately centered on the device. Regardless of where the image sensor and flash are located, the features of the described embodiments can be modified to accommodate the location, size and shape of the camera module of a particular device without significantly changing the general characteristics and advantages of the functional case, auxiliary lens and lens attachment interface coupling feature, half-press/full-press shutter button which may also vary in location, size and shape depending on the mobile device with which the case is coupled around, and the functional software applications set forth in embodiments described herein.

A macro auxiliary lens may include a 10× to 20× macro lens that enables close-focus high resolution mobile photography. Other auxiliary lenses may include a super wide angle auxiliary lens, a fisheye auxiliary lens, a zooming auxiliary lens and/or a lens described in US2014/0071547, which is incorporated by reference.

FIGS. 11H-11T schematically illustrate examples of an auxiliary lens holder in accordance with certain embodiments that is particularly suited for coupling at a bayonet lend attachment interface as described with reference to FIGS. 11A-11G.

Functional Features of Smart Case for Mobile Photography

A smart in accordance with certain embodiments includes several functional features. Enhanced lighting performance may be provided by, e.g., one or more white LEDs or other light sources embedded into the smart case to illuminate an object or a scene to be imaged. The ability to created optimum illumination geometries for mobile photography beyond the simple mobile flash is an advantageous feature of a smart case in accordance with certain embodiments.

Attachment of an auxiliary lens and/or other optical, electrical, wireless communication and mechanical features provide many advantages. For example, the case may include a Bluetooth radio that can be coupled in communication with various third party accessories including display devices, remote control devices and other processor-based devices. The design of the smart case enables the attachment of additional accessories that enhance the mobile photography experience.

Stabilization is also provided. The embodiments described herein detail a smart case with the ability to provide image stabilization, particularly for macro and extreme telephoto lenses, that may be attached stably to a mobile device using an advantageous case and lens attachment interface as described with reference to several examples herein.

Additional power is also provided in certain embodiments. FIGS. 34A-34E schematically illustrate a battery door for a camera-enabled mobile device case in accordance with certain embodiments, and FIG. 41 illustrates a coin cell battery. In the example of FIGS. 34A-34E, the dimensions are in millimeters. The material may be TPU/TPE shore 60-75 A, and the hardness allows living hinge to work and hold battery in place. The color may be jet black and the finish may be mold tech finish no. 11005. The example of FIGS. 34A-34E includes a 0.5-1.0 mm thick foam layer to help push battery against battery contact. The additional power provided by a battery installed in the case may be used to power the processor and PCB and lens sensor of the case, and in some embodiments to power the mobile device itself when, e.g., the mobile device is low on battery power or is out of battery power. Additional Memory is also provided in certain embodiments as a component included PCB of the case.

A customizable camera grip may be molded directly into a smart case in accordance with certain embodiments. For example, a smart case in accordance with certain embodiments allows for changing a grip face plate material to many custom options. This enables one-handed photography, and is ergonomically advantageous feature for many image capture purposes including capturing "selfies" when a one handed grip provides the flexibility of selectably greater distances and angles for image capture, and is particularly advantageous for pictures of two or more persons who wish to have one arm around another person or simply be close to another person without an out-stretched arm inhibiting that closeness.

FIGS. 36A-36D schematically illustrate a custom grip case for a camera-enabled mobile device case in accordance with certain embodiments. The dimensions are in millimeters. The material of the replaceable custom grip plate may include leather, cork, canvas, metal, wood, plastic or rubber.

FIGS. 37A-37C schematically illustrate an inner cushion/lining of a camera-enabled mobile device case in accordance with certain embodiments. The dimensions are in millimeters and the material of the inner lining may include microfiber material, cork, felt or another fabric/textile.

FIGS. 38A-38G schematically illustrate a camera-enabled mobile device case configured to couple with a lens in accordance with certain embodiments. Various ergonomic alternatives are illustrated including a recess for auxiliary lens attachment, a grip feature that is particularly advantageous for one-handed photography that is preferred for capturing selfies. In the example of FIGS. 38A-38G, a case is schematically illustrated with components 1252 stacked on the camera side while the other side balances with the grip 1254. A recess 1256 for a lens 1258 is schematically illustrated in FIG. 38E that allows for better integration. A grip texture 1260 is also schematically illustrated.

FIGS. 39A-39C schematically illustrate a camera-enabled mobile device case configured to couple with a lens in accordance with certain embodiments. The example of FIGS. 39A-39C schematically illustrates in perspective, front and side views, respectively, mass configurations of a case battery board. FIG. 38A schematically illustrates locations for a battery 1262 and significant mass 1263, and a sensor coil 1264 and a camera and mount assembly 1266. In certain embodiments, components such as a battery and perhaps one or more other heavy components are arranged at the grip end of the smart case which perhaps ease of handling for one-handed picture taking. This feature permit ease of handling by reducing the torque that a single-handed camera grip has to counter to stabilize the camera against gravity, e.g., when taking a selfie. A difference in torque can be very large between mounting case components on the camera module end rather than on the grip end. Components mounted on the grip end may exert virtually no torque because the moment arm may be reduced to zero or nearly zero or even negative if the grip is actually closer to the camera module and attached auxiliary lens than the heavy components that are arranged at the very opposite end of the case. This balancing of the weight of components in the case with the weight of the attached auxiliary lens and lens attachment interface can provide an enhanced one-handed picture taking experience.

Camera Strap Attachment

FIGS. 15I and 35A-35E schematically illustrate a camera strap attachment for a camera-enabled mobile device case in accordance with certain embodiments. In the example of FIGS. 35A-35E the dimensions are in millimeters and the material may be aluminum 6061. Color and finish may include matte black anodize, matte silver anodize, polished black anodize and/or polished silver anodize. Sharp edges are broken and machined chamfer where called out on drawings. Dual attachment to a smart case enables use of traditional camera straps. This can be achieved using a metal or hard plastic strap attachment adhered to the case in final assembly or using a metal or hard plastic strap attachment co-molded into the case in alternative embodiments or as set forth at US2006/0124676, which is incorporated by reference.

Lens Cap

A custom lens cap is provided that works with auxiliary lenses on several types, shapes and sizes. In certain embodiments, a magnet is built-in to allow a lens cap to stick to the metal lens holder material. A magnetic material such as a metal or magnet may be assembled or molded into the case to allow a place for a removed lens cap to rest when the lens cap is not being used to cover the lens, e.g., when an image is being taken using the auxiliary lens.

FIGS. 15A-15K schematically illustrate certain mobile device cases and additional case features and accessories in accordance with certain embodiments. A tripod attachment is illustrated that includes a custom tripod attachment that is attachable and detachable and allows the mobile device case to be used on standard tripods with ¼-20 threaded insert. A magnet is built into the tripod attachment in certain embodiments that magnetically attaches and aligns the tripod attachment to metal built into case. A press fit attachment may be used in certain embodiments that creates an interference interface over an edge of the case to hold it tightly in place.

Capacitive Touch Slider for Image Control

FIGS. 40-42 schematically illustrate a capacitive touch slider for a camera-enabled mobile phone device case in accordance with certain embodiments. These Figures relate to a capacitive touch slider feature. The board that is shown rotated in the FIGS. 40-42 is at the opposite end of the phone from where the lens is. This feature is particularly advantageous for a picture taker who is using one hand to adjust precapture settings and to capture the picture, such as when a selfie is being captured, especially when two or more persons are included in the scene.

A capacitive touch slider is provided in certain embodiments on an ergonomic camera grip that allows via embedded firmware and application software to control image exposure, contrast, aperture, ISO, shutter speed, focus and/or image capture. The combination of the ergonomic camera grip with balanced components for reduced torque and the capacitive touch slider feature facilitate precapture setting adjustment while the mobile device with or without auxiliary lens attachment is balanced in position to capture a photo, particularly a selfie or overhead image or an image otherwise difficult to capture with two hands on the camera.

The capacitive slider in accordance with certain embodiments is designed to reject phone metal and antenna capacitive, radio frequency and magnetic field effects. The capacitive slider is mounted in accordance with certain embodiments at an ergonomic angle to ease use with one hand and finger. In use in one example, the capacitive slider may be operated by sliding a finger along the surface to change or select from a menu of software defined functions, while tapping the surface with the same finger may actuate a software defined function that is selected, and/or double tapping the surface may actuates a software defined function. The single tap may serve a similar role as a half-press of the shutter button described above, i.e., to adjust pre-capture settings before taking a picture, while the double tap may serve a similar role as a full-press of the shutter button described above, i.e., to capture the image.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the terms "system" or "assembly" does not imply that the components or functionality described or claimed as part of the assembly are all configured in a common package. Indeed, any or all of the various components of a system, e.g., a case and a lens attachment interface may be combined in a single package or separately maintained and may further be manufactured, assembled or distributed at or through multiple locations.

In addition, all references cited above and below herein, as well as the background, invention summary, abstract and brief description of the drawings, are all incorporated by reference into the detailed description of the preferred embodiments as disclosing alternative embodiments. Several embodiments of point action cameras have been described herein and schematically illustrated by way of example physical, electronic and optical architectures. Other point action camera embodiments and embodiments of features and components of point action cameras that may be included within alternative embodiments, may be described at one or a combination of U.S. Pat. Nos. 7,612,997, 8,244,299, 8,593,745, 8,843,177, US published patent applications nos. 2006/0124676, 2012/0282977, 2014/0071547, 2014/0226268, 2014/0071547, 2013/0063554, 2010/0253826, 2009/0299813, 2002/0000689, 2001/0121116, 2009/0089842, 2008/0276293, 2008/0271105, 2008/0271104, 2008/0172708 and/or European patent no. EP2613448.

We claim:

1. An auxiliary optical assembly for a mobile device that includes a miniature camera module, comprising:
   a removable lens assembly including a lens holder, a lens coupled to the lens holder, and a coupling interface;
   a mobile device case configured to securely couple around at least a portion of the periphery of said mobile device; and
   a lens attachment interface that is configured in accordance with said mobile device, and that is configured to stably couple to said mobile device, and that is configured in accordance with said coupling interface of said removable lens assembly to stably couple and align said removable lens along the optical path of the miniature camera module,
   wherein said mobile device case comprises a case processor and electrical circuitry embedded within the case that are configured to detect the presence of the removable lens coupled stably in said optical alignment with said miniature camera module; and
   wherein the mobile device case is configured to define therein a lens attachment aperture shaped both to permit light from an object to be captured as a digital image to travel along the optical path of the miniature camera module to a built-in image sensor of the miniature camera module of the mobile device, and to facilitate stable coupling of said removable lens assembly in optical alignment with said miniature camera module.

2. The auxiliary optical assembly of claim 1, wherein said lens attachment interface is configured for adhesive coupling to said mobile device.

3. The auxiliary optical assembly of claim 1, wherein said lens attachment interface is shaped in accordance with a shape of said mobile device.

4. The auxiliary optical assembly of claim 3, wherein said lens attachment interface is sized in accordance with a size of said mobile device.

5. The auxiliary optical assembly of claim 4, wherein said lens attachment interface defines an aperture that is coaxially configured in accordance with an optical path of a miniature camera module of said mobile device.

6. The auxiliary optical assembly of claim 1, wherein the coupling interface of the removable lens assembly comprises a bayonet tab, and wherein the lens attachment interface comprises a detent portion that at least partially defines a lens attachment cavity that is shaped in accordance with the bayonet tab of the removable lens assembly to stably couple and align the removable lens along the optical path of the miniature camera module of the mobile device.

7. The auxiliary optical assembly of claim 6, wherein the bayonet tab comprises an oblong shape, and the lens attachment interface including said detent defines an oblong cavity having a short dimension that is smaller than the long dimension of the bayonet tab such that the oblong cavity is penetrable by the bayonet tab at a first relative orientation while the bayonet tab stably couples within the oblong cavity in a second relative orientation.

8. The auxiliary optical assembly of claim 6, wherein the bayonet tab comprises a rectangular shape.

9. The auxiliary optical assembly of claim 6, wherein the lens attachment cavity is disposed in a first plane while the detent overlaps the rounded cavity in a second plane that is spaced-apart from the first plane along said optical path.

10. The auxiliary optical assembly of claim 9, wherein the lens attachment cavity includes a lens attachment portion and a flash portion adjacent to a lens attachment portion, to permit light from a mobile device flash to illuminate an object to be imaged.

11. The auxiliary optical assembly of claim 10, wherein the lens attachment portion of the lens attachment cavity is defined in a first plane that is spaced further from the an image sensor of the miniature camera module than a second plane within which the flash portion of the lens attachment cavity is defined.

12. The auxiliary optical assembly of claim 6, wherein the lens attachment interface defines a circular cavity in a first plane while the detent overlaps the circular cavity in a second plane that is spaced-apart from the first plane along said optical path.

13. The auxiliary optical assembly of claim 1, wherein the lens attachment interface is shaped in accordance with said mobile device case that is configured to be coupled around said mobile device and that accommodates the coupling of the removable lens at the lens attachment interface.

14. The auxiliary optical assembly of claim 13, wherein the case cavity is also shaped, at a flash portion adjacent to a lens attachment portion, to permit light from a mobile device flash to illuminate an object to be imaged.

15. The auxiliary optical assembly of claim 1, wherein the lens holder of the removable lens assembly defines a cavity around the optical path of the miniature camera module to permit light from an object being imaged to reach an image sensor of the miniature camera module.

16. The auxiliary optical assembly of claim 15, wherein the coupling interface of the removable lens assembly also defines a cavity around the optical path of the miniature camera module to permit light from an object being imaged to reach an image sensor of the miniature camera module.

17. The auxiliary optical assembly of claim 16, wherein the cavities of the coupling interface and lens holder are configured to be approximately coaxial with the optical paths of the miniature camera module and removable lens.

18. The auxiliary optical assembly of claim 1, wherein the lens attachment interface is configured in accordance with said lens attachment aperture defined in said mobile device case for coupling around the mobile device, said lens attachment interface defining an aperture that is configured to be coaxial with said lens attachment aperture and miniature camera module to permit light from an object to be captured as a digital image to travel along the optical path of the miniature camera module to the built-in image sensor of the mobile device, the lens attachment interface and lens attachment aperture being shaped for stably coupling with said coupling interface of said removable lens assembly.

19. The auxiliary optical assembly of claim 1, wherein the coupling interface of said removable lens assembly comprises a bayonet design for rotatable coupling with said lens attachment interface.

20. The auxiliary optical assembly of claim 1, wherein said mobile device case comprises a case shutter button mechanism configured for actuating said miniature camera module of said mobile camera system.

21. The auxiliary optical assembly of claim 1, wherein said mobile device case comprises said lens attachment interface integrated with said case.

22. The auxiliary optical assembly of claim 21, wherein said lens attachment interface comprises an interface detail co-molded into the material of the case.

23. The auxiliary optical assembly of claim 22, wherein said interface detail comprises stamped metal.

24. The auxiliary optical assembly of claim 22, wherein said interface detail comprises a micro-bayonet design.

25. The auxiliary optical assembly of claim 1, wherein said lens attachment interface comprises a mount plate that is configured to be adhesively or magnetically coupled to the back or inside of said mobile device.

26. The auxiliary optical assembly of claim 25, wherein said interface detail comprises stamped metal.

27. The auxiliary optical assembly of claim 25, wherein said interface detail comprises a micro-bayonet design.

* * * * *